(12) United States Patent
Josephson

(10) Patent No.: US 11,221,739 B2
(45) Date of Patent: *Jan. 11, 2022

(54) SELECTION ATTRACTIVE INTERFACES, SYSTEMS AND APPARATUSES INCLUDING SUCH INTERFACES, METHODS FOR MAKING AND USING SAME

(71) Applicant: Quantum Interface, LLC, Austin, TX (US)

(72) Inventor: Jonathan Josephson, Austin, TX (US)

(73) Assignee: QUANTUM INTERFACE, LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/156,532

(22) Filed: Jan. 23, 2021

(65) Prior Publication Data

US 2021/0286483 A1 Sep. 16, 2021

Related U.S. Application Data

(60) Continuation of application No. 16/702,266, filed on Dec. 3, 2019, now Pat. No. 10,901,578, which is a
(Continued)

(51) Int. Cl.
*G06F 3/0482* (2013.01)
*G06F 3/0485* (2013.01)
*G06F 3/0484* (2013.01)
*H04L 12/28* (2006.01)
*H04L 29/08* (2006.01)
(Continued)

(52) U.S. Cl.
CPC ............ *G06F 3/0482* (2013.01); *G06F 3/017* (2013.01); *G06F 3/0236* (2013.01); *G06F 3/0346* (2013.01); *G06F 3/0485* (2013.01); *G06F 3/04842* (2013.01); *G06F 3/04847* (2013.01); *G06F 3/04883* (2013.01); *H04L 12/282* (2013.01); *H04L 12/2803* (2013.01); *H04L 67/12* (2013.01); *H04L 67/18* (2013.01); *H04L 67/36* (2013.01); *H04W 4/021* (2013.01); *H04W 4/38* (2018.02); *G06F 2200/1637* (2013.01); *G08C 2201/32* (2013.01); *H04L 69/329* (2013.01); *H04L 2012/285* (2013.01)

(58) Field of Classification Search
CPC ........ G06F 3/017; G06F 1/1605; G06F 3/011; G06F 17/16; G06F 1/1616; G06F 1/1677; G06F 1/1681; G06F 1/1684; G06F 1/1694; G06F 30/17; G06F 3/03545; G06F 3/04162; G06F 3/1204; G06F 3/1226; G06F 3/1236; G06F 3/1285; G06F 3/1292; G06F 3/04845; G06F 3/0488

See application file for complete search history.

(56) References Cited

U.S. PATENT DOCUMENTS

2011/0310048 A1* 12/2011 B.R ..................... G06F 3/04186
 345/173
2012/0032979 A1* 2/2012 Blow .................. G06F 3/04817
 345/647

\* cited by examiner

*Primary Examiner* — Rayeez R Chowdhury
(74) *Attorney, Agent, or Firm* — Robert W. Strozier

(57) ABSTRACT

Systems, interfaces, and methods for implementing the systems and interfaces includes selection attractive movement as the selection protocol, where a selection object is used to discriminate between selectable objects and attract a target object toward the selection objects, where the direction and speed of the motion controls, discriminates, attracts, and activates the selected objects.

20 Claims, 83 Drawing Sheets

Related U.S. Application Data division of application No. 14/504,393, filed on Oct. 1, 2014, now Pat. No. 10,503,359.

(60) Provisional application No. 61/885,453, filed on Oct. 1, 2013, provisional application No. 61/893,850, filed on Oct. 21, 2013, provisional application No. 61/894,050, filed on Oct. 22, 2013, provisional application No. 61/945,907, filed on Feb. 28, 2014, provisional application No. 62/007,598, filed on Jun. 4, 2014.

(51) Int. Cl.
*G06F 3/0346* (2013.01)
*G06F 3/023* (2006.01)
*H04W 4/021* (2018.01)
*G06F 3/01* (2006.01)
*G06F 3/0488* (2013.01)
*H04W 4/38* (2018.01)

Activate by Motion within Sensor Zone

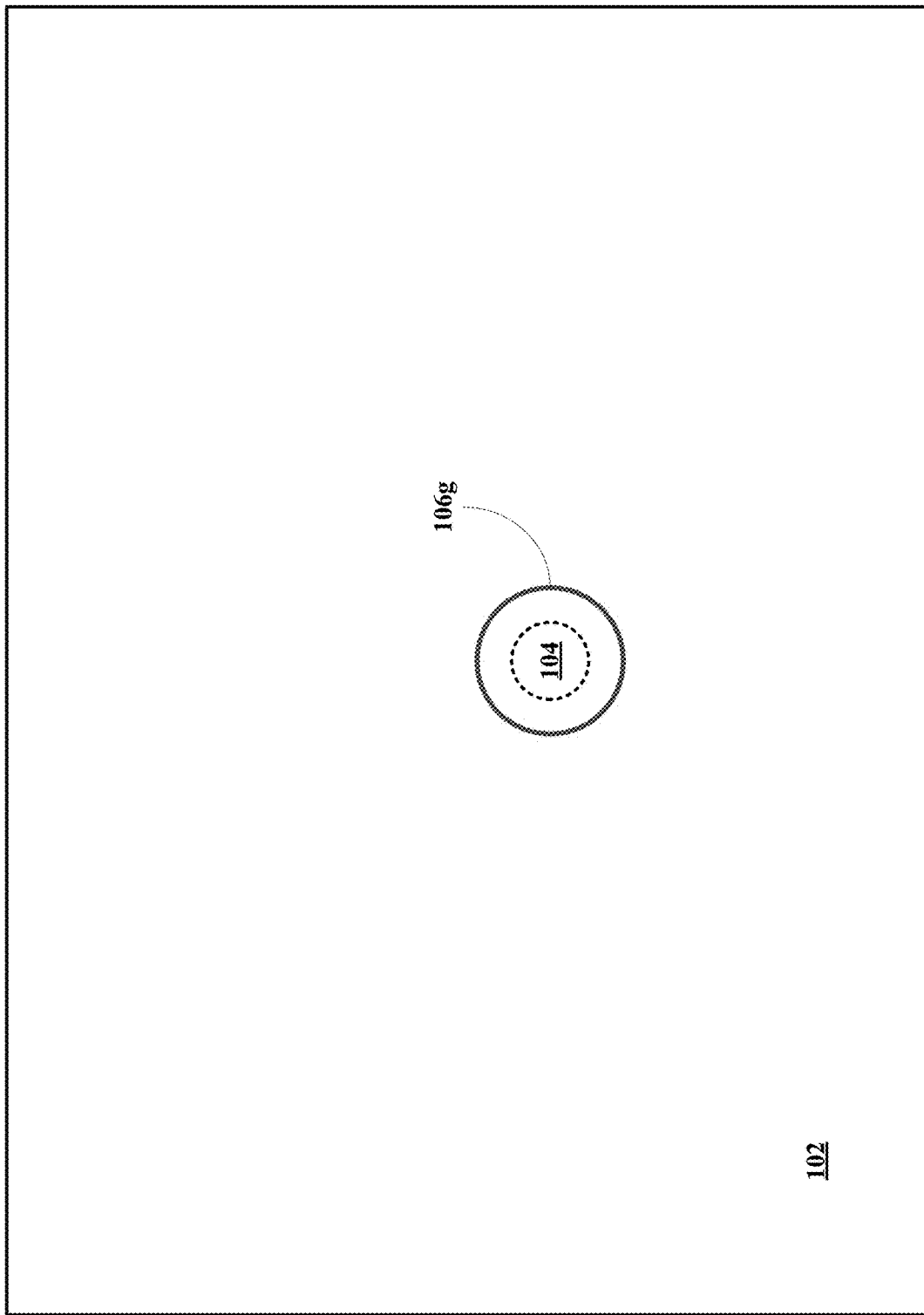

Activate by Motion within Sensor Zone

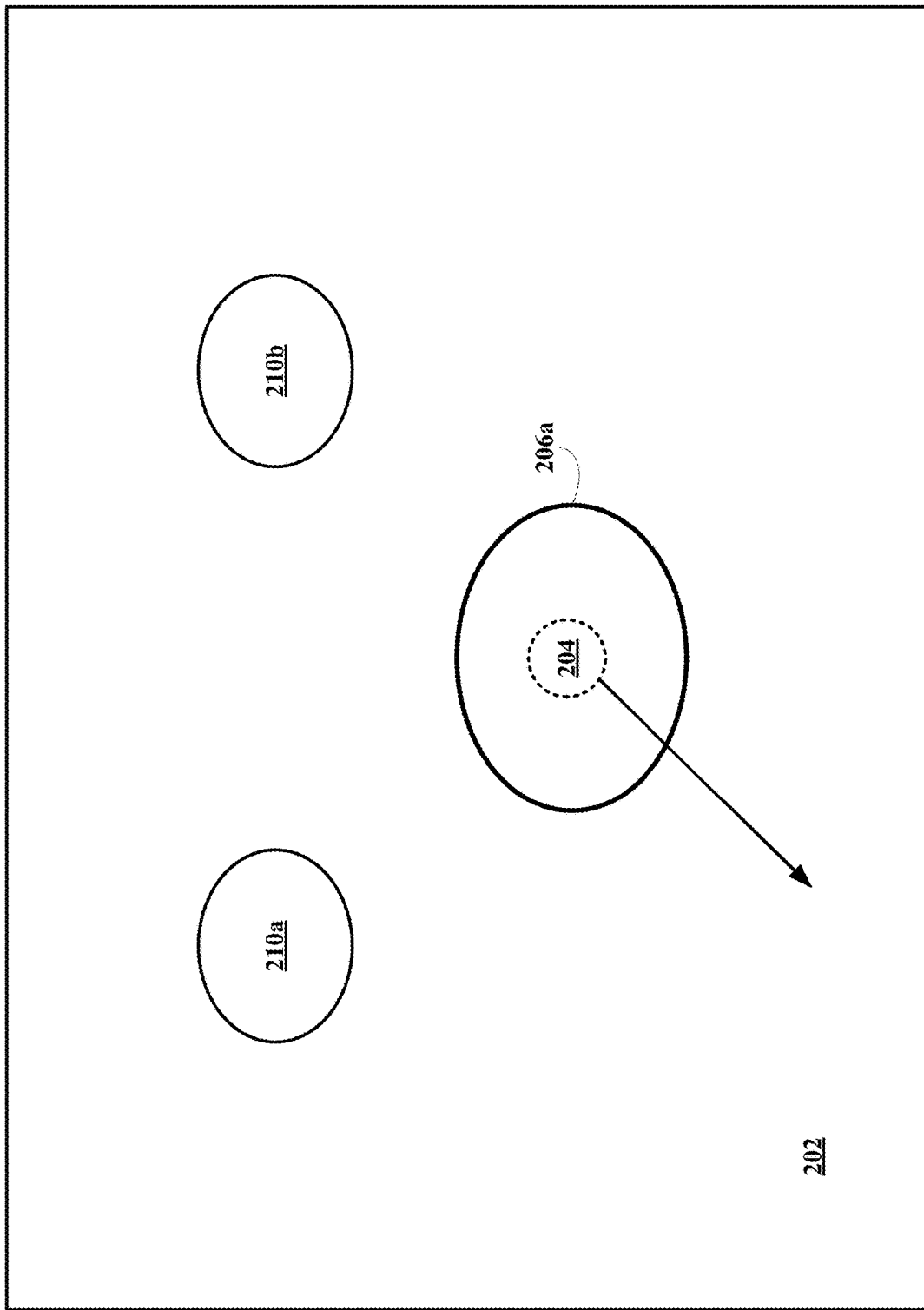

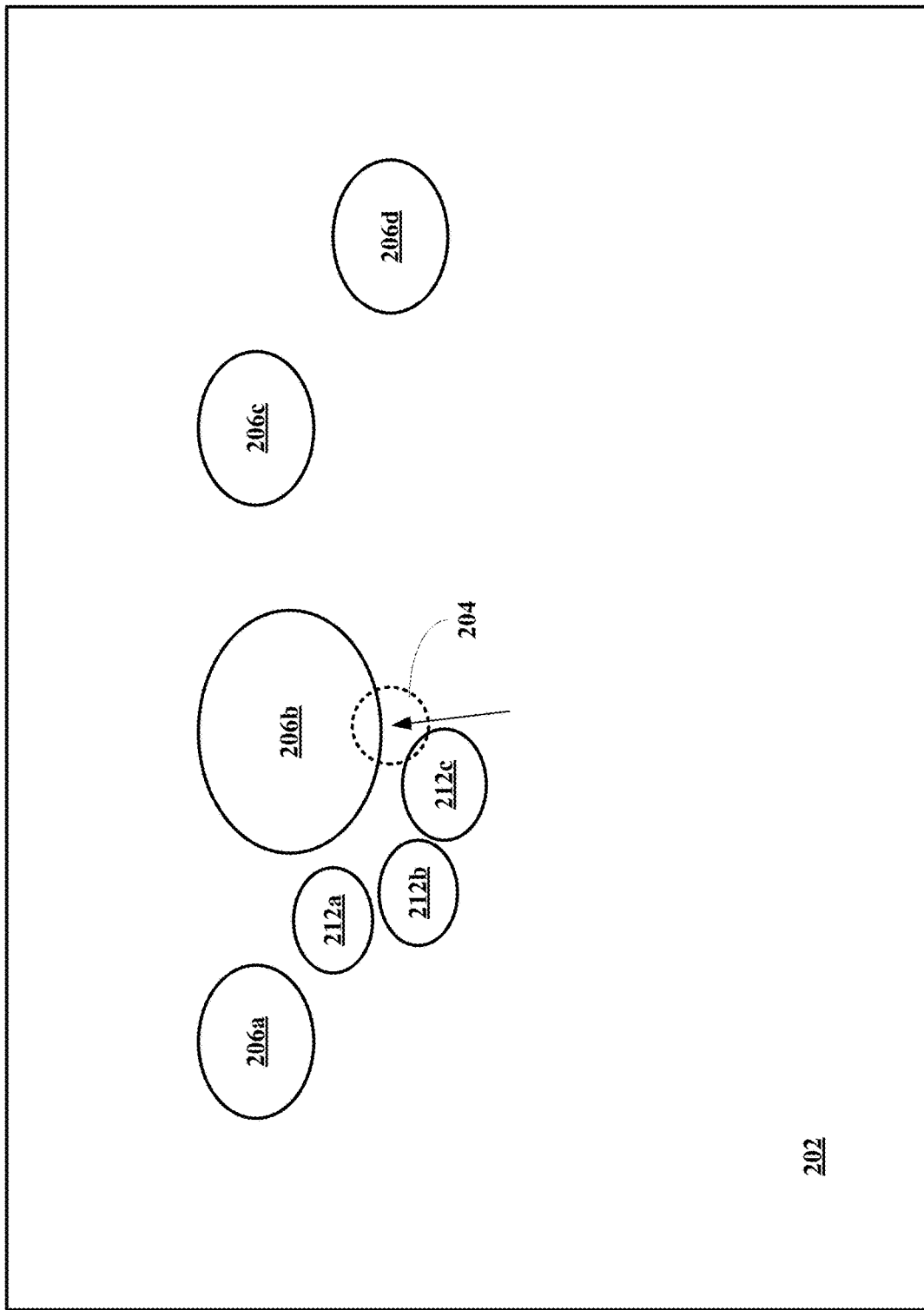

Activate by Motion within Sensor Zone

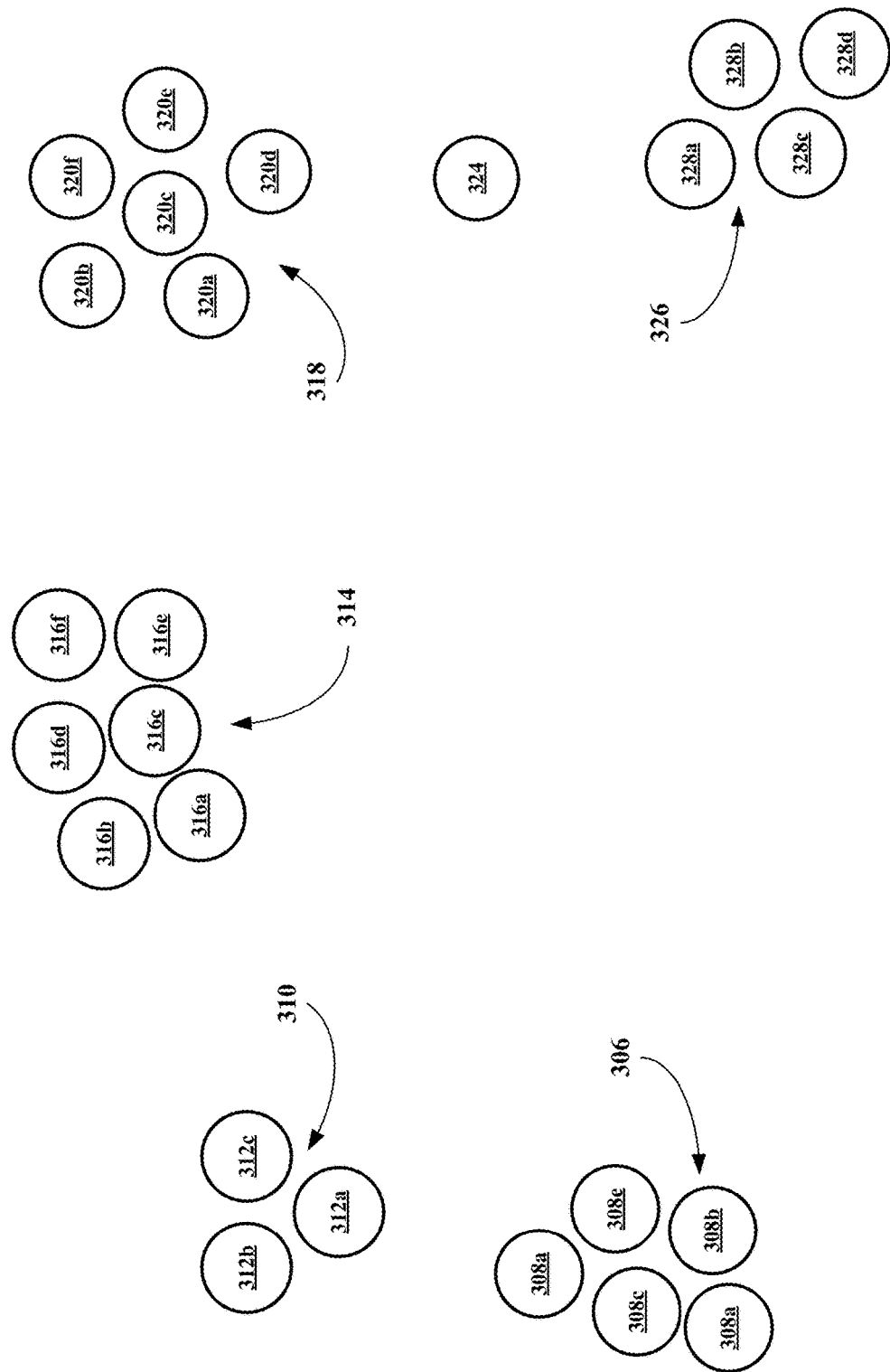

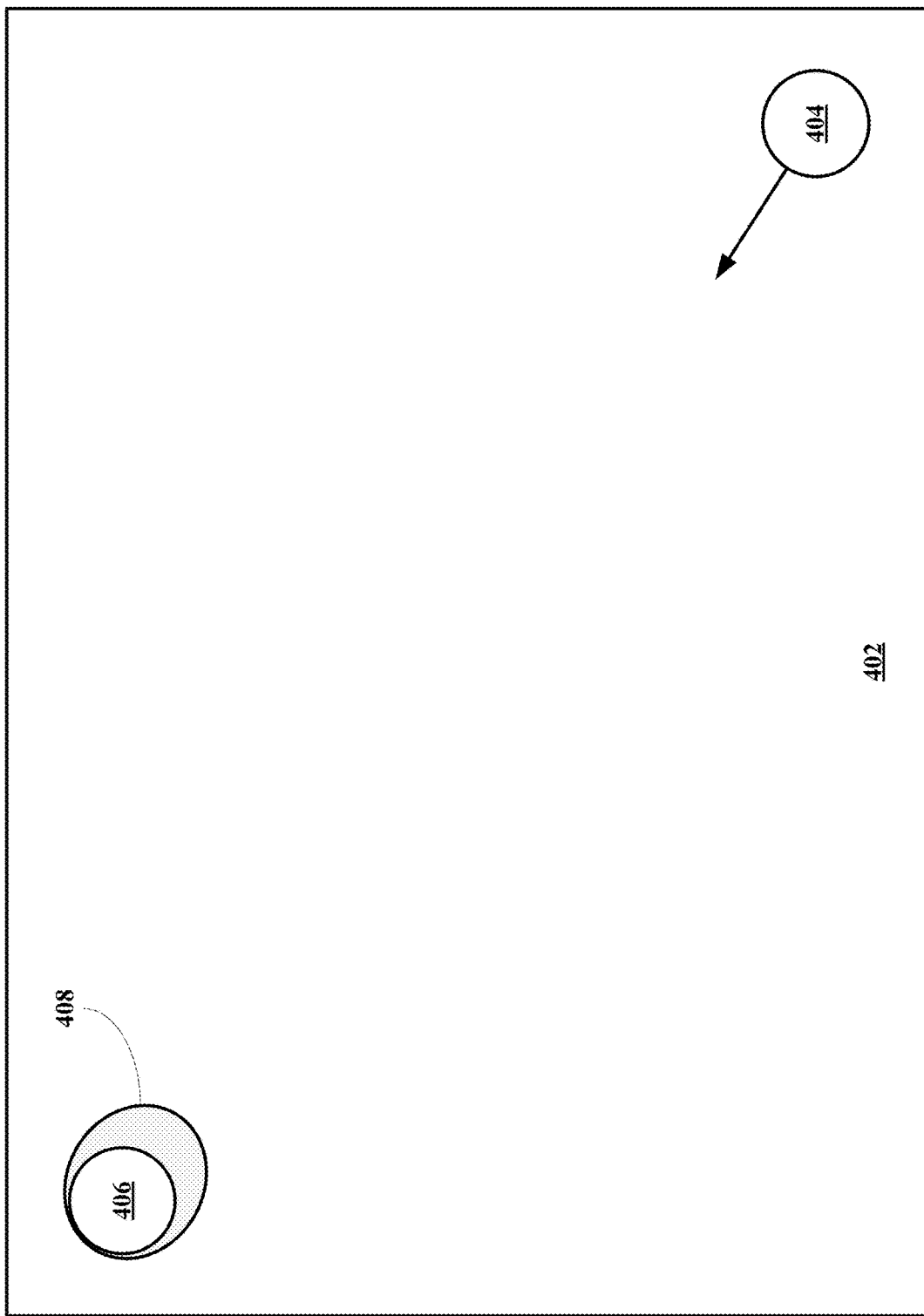

Activate by Motion within Sensor Zone

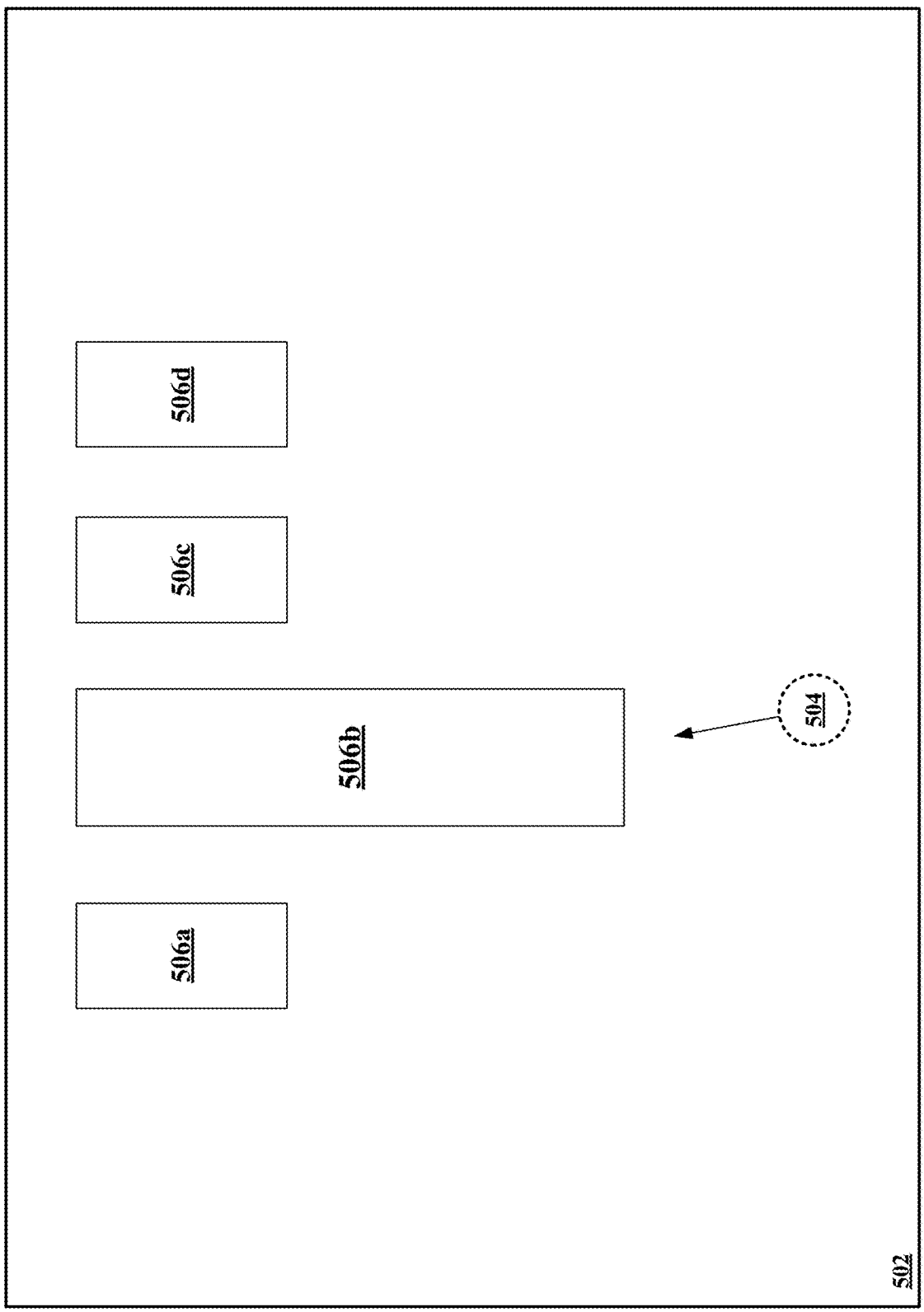

US 11,221,739 B2

SELECTION ATTRACTIVE INTERFACES, SYSTEMS AND APPARATUSES INCLUDING SUCH INTERFACES, METHODS FOR MAKING AND USING SAME

RELATED APPLICATIONS

This application is a continuation of U.S. patent application Ser. No. 16/702,266 filed Dec. 3, 2019 (3 Dec. 2019), now U.S. Pat. No. 10,901,578 issued Jan. 26, 2021 (26 Jan. 2021), which is a divisional of U.S. patent application Ser. No. 14/504,393 filed Oct. 1, 2014, now U.S. Pat. No. 10,503,359 issued Dec. 10, 2019 (10 Dec. 2019), which claims the benefit of and provisional priority of United Application Ser. No. 61/885,453 filed Oct. 1, 2013 (1 Oct. 2013), United Application Ser. No. 61/893,850 filed Oct. 21, 2013 (21 Oct. 2013), United Application Ser. No. 61/894,050 filed Oct. 22, 2013 (22 Oct. 2013), United Application Ser. No. 61/945,907 filed Feb. 28, 2014 (28 Feb. 2014), and United Application Ser. No. 62/007,598 filed Jun. 4, 2014 (4 Jun. 2014).

This application is also related to U.S. patent application Ser. No. 10/384,195 filed 7 Mar. 2003 (Mar. 7, 2003) (Mar. 7, 2003), now U.S. Pat. No. 7,831,932 issued 9 Nov. 2010 (Nov. 9, 2010)(Nov. 9, 2010), U.S. patent application Ser. No. 11/891,322 filed 9 Aug. 2007 (Aug. 9, 2007) (Aug. 9, 2007), now U.S. Pat. No. 7,861,188 issued 28 Dec. 2010 (Dec. 28, 2010)(Dec. 28, 2010), and U.S. patent application Ser. No. 12/978,690 filed 27 Dec. 2010 (Dec. 27, 2010)(Dec. 27, 2010), now U.S. Pat. No. 8,788,966 issued 22 Jul. 2014 (Jul. 22, 2014)(Jul. 22, 2014), and claim priority to and the benefit of U.S. patent application Ser. No. 13/677,627 filed 15 Nov. 2012 (Nov. 15, 2012)(Nov. 15, 2012), and U.S. patent application Ser. No. 13/677,642 filed 15 Nov. 2012 (Nov. 15, 2012)(Nov. 15, 2012).

BACKGROUND OF THE INVENTION

1. Field of the Invention

Embodiments of this invention relate to systems, interfaces, apparatuses including the interfaces, and methods for implementing the systems, apparatuses, and interfaces, where the systems and interfaces are selection attractive.

More particularly, embodiments of this invention relate to systems, interfaces, apparatuses including the interfaces, and methods for implementing the systems and interfaces, where selection attractive or manipulation systems and interfaces use movement of a selection object(s) to discriminate between displayed objects and attract a target object, objects or groups of objects, or fields of objects or object attributes toward, away or at angles to or from the selection object, where the direction and speed of motion controls discrimination and attraction. The selection object may be a group of objects or a field created by any kind of waveform as well.

2. Description of the Related Art

Selection interfaces are ubiquitous throughout computer software and user interface software. Most of these interfaces require motion and selection operations controlled by hard selection protocols such as tapping, clicking, double tapping, double clicking, keys strokes, gestures, or other so-called hard selection protocols.

In previous applications, the inventor and inventors have described motion based systems and interfaces that utilize motion and changes in motion direction to invoke command functions such as scrolling and simultaneously selection and activation commands. See for example U.S. Pat. Nos. 7,831,932 and 7,861,188, incorporated herein by operation of the closing paragraph of the specification.

More recently, the inventor has described motion based systems and interfaces that utilize velocity and/or acceleration as well as motion direction to invoke command functions such as scrolling and simultaneously selection and activation commands. See for example U.S. Provisional Patent Application Ser. No. 61/885,453 filed Oct. 1, 2013 (1 Oct. 2013).

While there are many systems and interfaces for permitting users to select and activate a target object(s) from lists and/or sublists of target object(s) using movement attributes, where the movement attributes act to discriminate and attract or manipulate or influence the target object(s) or attributes of target object(s). Multiple layers of objects may have attributes changes, where the attribute of one layer may be different or to a different degree than other layers, but they are all affected and relational in some way.

SUMMARY OF THE INVENTION

General Aspects Systems, Apparatuses, Interfaces, and Methods

Embodiments of this invention relate to systems, apparatuses, interfaces, and methods of this invention for implementing the systems, apparatuses, and/or interfaces are based on attractive or manipulative selection invoked solely and partially by motion sensed by motion sensors associated with the systems, apparatuses, and/or interfaces. The manipulative selection actions may be attractive, repulsive, or a relative affect due to other objects being moved in an attractive manner, a repulsive manner, or a combination thereof, or based upon an angle or proximity to a desired object or objects. The systems and apparatuses account for the manipulative effects based upon proximity, direction, speed and/or acceleration of the selection object toward a desired object or set of objects. The objects may comprise real or virtual objects, real world devices, software, software components, attributes, active areas of sensors, software, or fields of emf or other waveforms and may be remotely controlled. The motion of the selection object or objects may be a machine, an animal or body parts or parts, a human or body part or parts, or a real world object, field, or waveform under the control of a human, machine, an animal, or software program or system.

Apparatuses and Systems

Embodiments of this invention provide apparatuses or systems for selecting and activating virtual and/or real objects and/or attributes associated therewith. The apparatuses include at least one user interface. The interfaces include at least one (one or a plurality of) user feedback unit, at least one motion sensors having active sensing zones or active view fields, and at least one processing unit in communication with the user feedback units, and the motion sensors. The interfaces may also include at least one power supply, at least one battery backup, and communications software and hardware for remote control and/or remote monitoring. The motion sensors detect motion or movement within their active sensing zones, generate sensor output signals, and send or forward the output signals to the processing units. The processing units convert the output signals into command and control outputs. Of course, these components, user interfaces, user feedback units, motion sensors, and processing units, may all be combined in whole or part. The apparatus may also include at least one object, real or virtual, under the control of the apparatus via the processing units. The command and control outputs may include start commands, which activate the user interface, the user feedback units and may generate a user discernible selection or cursor object, by user discernible the inventor means that the selection or cursor object is capable of being sensed by one of the five senses of an animal or a human, e.g., visual, audio, audiovisual, tactile or touch, hot or cold, smell or odor, taste or flavor, or any combination thereof. However, the selection or cursor object may also be invisible and/or non-discernible—just a virtual element used internally in applying the sensed motion or movement.

Once activated, the user interfaces via the user feedback units may also display at least one selectable object. Alternatively, once activated, movement of the selection object will cause a selectable object or a group of selectable objects or a pre-selected selectable object or a group of pre-selected selectable objects to move toward the selection object, or to move at an angle to the selection object, or away from the selection object for the purpose of eventually choosing a particular selectable object or a particular group of selectable objects or selectable attributes associated with particular object(s) or controllable attributes associate with particular object(s). The pre-selected selectable object or the group of pre-selected selectable objects are the display object(s) that are most closely aligned with a direction of motion of the selection object. For examples, if the sensed initial motion or movement was in the +y direction, then the user interface would cause the user feedback unit(s) to evidence those selectable object that are associated with the +y direction and attract those in the specific direction toward the selection object.

Another aspect of the interfaces of this invention is that the faster the selection object moves toward the pre-selected selectable object or the group of pre-selected selectable objects, the faster the pre-selected selectable object or the group of preselected selectable objects move toward the selection object.

Another aspect of the interfaces of this invention is that as the pre-selected selectable object or the group of pre-selected selectable objects move toward the selection object, the pre-selected selectable object or the group of pre-selected selectable objects may also increase in size, change color, become highlighted, have other effects change, or mixtures or combinations thereof.

Another aspect of the interfaces of this invention is that each object that has at least one adjustable attribute includes an adjustable active areas associated with each adjustable attribute associated with the objects that become displayed as the selectable object is augmented by the motion. Moreover, as the selectable object becomes more certain of selection, the adjustable active areas may increase in size as the selection object moves toward the selectable object or "gravity" pulls the selectable object toward the selection object. The active area permits selection to be made prior to any actual contact with the object, and allows selection to be made merely by moving in the direction of the desired object. The active area may be thought of as a halo effect surrounding the object activated by motion toward the object.

Another aspect of the interfaces of this invention is that as motion continues, the motion will start to discriminate between members of a group of pre-selected objects until the motion results in the selection of a single displayed (discernible) object or a group of displayed (discernible) objects. As the motion continues, the display will begin to discriminate between objects that are aligned with the motion and objects that are not, emphasizing the selectable objects aligned with the motion (i.e., objects in the direction of motion) and de-emphasizing the non-selectable objects not aligned with the motion (i.e., objects away from the direction of motion), where the emphasis may be any change in object(s) properties, changes in object(s) positions, or a combination thereof and the de-emphasis may be any change in the object(s) properties, changes in object(s) positions, or combination thereof.

Another aspect of the interfaces of this invention is the display, movement, and positioning of sublist members or attributes associated with object(s) may be simultaneous and synchronous or asynchronous with the movement and display of the selectable object(s) or display object(s) being influenced by the motion of the selection object(s). Once the selection object and a selectable display object touch or the selection object and a selectable display object active area touch or the selection object and a selectable display object is predicted with a threshold degree of certainty, a triggering threshold event (this may be the distance of proximity or probability without ever touching), the selectable object(s) is selected and non-selected display object are removed from the display or fade away or become less prominent or change in such a way that they are recognizable as the non-selected object(s) and the selected object is centered within the display or at a predetermined position, is adjusted to a desired amount if an adjustable attribute, or is executed if the selected object(s) is an attribute or selection command, or any combination of these. If the object is an executable object such as taking a photo, turning on a device, etc., then the execution is simultaneous or acts in a predetermined way with selection. If the object has a submenu, sublist or list of attributes associated with the selected object, then the submenu members, sublist members or attributes may become displayed on the screen is a spaced apart or differentiated format either after selection or during the selection process, with their distribution becoming more defined as the selection becomes more and more certain. The same procedure used to select the selected object is then used to select a member of the submenu, sublist or attribute list. This same effect may occur with a combination of executable, submenu, sublist, and listing attributes. Thus, the interfaces have a gravity or attractive like action on displayed selectable objects. As the selection object moves, it attracts an object or objects in alignment with the direction of the selection object's motion pulling those object toward it, and may simultaneously repel other objects not aligned with the selection object's motion, causing them to move away or be identified as non-selected objects. As motion continues or a velocity or acceleration of the motion increase, the pull increases on the object(s) most aligned with the direction of motion, further accelerating the object toward the selection object until they touch, merge, or cause a triggering selection event, or a combination thereof. If two objects are along the same line or zone, and the closer of the two is attracted or selected as motion occurs toward the user, and motion continues in line, the first object may be treated like a non-wanted object and the second desired object is selected. If motion is stopped or slowed to a predetermined threshold amount at the first object, it is considered selected. If motion continues at the first object, it is considered not selected. The touch, merge or triggering event causes the processing unit to select and activate the object, active an object sublist or memu, or active an attribute for control, or a combination thereof Methods Embodiments of this invention provide methods for implementing the selection protocol using the user interfaces of this invention. The methods include selecting and activating selectable objects, selecting and activating members of a selectable list of virtual and/or real objects, selecting and activating selectable attributes associated with the objects, selecting and activating and adjusting selectable attributes, or combinations thereof, where the interfaces include at least one display or other user feedback unit, at least one motion sensor, and at least one processing unit in communication with the user feedback units and the motion sensors. The interfaces also may include power supplies, battery backups, and communications software and hardware for remote control and/or remote monitoring. The methods include sensing motion or movement sensed by the motion sensor(s), generating an output signal and sending the output signal to the processing unit. The methods also include converting the output signal into a command output via the processing unit. The command output may be a start command, which activates the feedback unit or activates the feedback unit and generates at least one selection or cursor object or activates the feedback unit and generates at least one selectable object or activates the feedback unit and generates at least one selection or cursor object and at least one selectable object. The selection object may be discernible or not (displayed or not). The motion may be generated by an animal or body part or parts, a human or body part or parts, a machine, or a real world object under control of an animal, a human, or a robot or robotic system, especially when the motion being sensed is within a 3D active sensing volume or zone. Once activated, the methods monitor sensed motion or movement within the active zone(s) of the motion sensor(s), which is used to move the selection object on or within the user feedback unit in accord with the motion properties (direction, velocity, acceleration, and changes of one or more of these properties) toward a selectable object or a group of selectable objects or a pre-selected object or a group of pre-selected objects. At the same time, the methods either move the non-selected objects away from the selection object(s), cause the non-selected object to fade, disappear or other change other properties of the non-selected objects, or combinations thereof. The pre-selected object or the group of pre-selected objects are the selectable object(s) that are most closely aligned with the direction of motion of the selection object.

Another aspect of the methods of this invention is that movement towards an executable area, such as a close/expand/maximize/minimize function area(s) or object(s) of a software window in an upper right corner may cause an executable function(s) to occur, such as causing the object(s) to expand or move apart so as to provide more space between them and to make it easier to select each individual object or a group of objects.

Another aspect of the methods of this invention include interfaces is that object selection or menu selection may be grouped together such that as movement is made towards a group of objects, the group of objects simultaneous rearrange themselves so as to make individual object selection or menu selection easier, including moving arcuately or to corners of a designated area so as to make discrimination of the desired selection easier.

Another aspect of the interface is that proximity to the selection object may cause the selectable objects most aligned with the properties of the sensed motion to expand, separate, or otherwise move in such a way so as to make object discrimination easier, which in turn may cause associated subobjects or submenus to be able to be selected by moving the subobjects or submenus towards the selection object. Additionally, they could be selected or activated by moving into an active area designated by distance, area or volume from or around such objects, thereby selecting the object functions, menus or subobjects or submenus. The movement or attribute change of the subobjects or submenus may occur synchronously or asynchronously with the movement of the primary object(s).

Another aspect of the interfaces is that the faster the selection object moves toward the pre-selected object or the group of preselected objects, the faster the pre-selected object or the group of preselected objects move toward the selection object(s), and/or the faster the unselected objects may move away from the selection object(s).

Another aspect of the interfaces is that as the pre-selected (meaning the objects that are most closely aligned with the properties of the motion) object or the group of pre-selected objects move toward the selection object, the pre-selected object or the group of pre-selected objects may either increase in size, change color, become highlighted, change some other effect, change some characteristic or attribute, or a combination thereof. These same, similar or opposite changes may occur to the unselected objects or unselected group of objects. Another aspect is that, based upon a user's previous choices, habits, motions or predicted motions, the attributes of the objects may be changes such that they move faster, increase in size or zone, or change in such a way that the object with the highest percentage of user intent is the easiest and most likely to be selected as shown in FIG. 4 and described in the associated text below.

Another aspect of the interfaces is that as motion continues, the motion will start to discriminate between members of the group of pre-selected object until the motion results in the selection of a single selectable or displayed object or a single group of selectable objects. Once the selection object and a selectable object active area touch or the selection object and a selectable display object is predicted with a threshold degree of certainty, a triggering threshold event (this may be the distance of proximity or probability without ever touching), the selectable object is selected and non-selected object are removed from the display or fade away or become less prominent or change in such a way that they are recognizable as non-selected object(s). Once selected, the selected object may become centered within the display or at a predetermined position within the display. If the selected object has a single adjustable attribute, then motion may adjust the attribute a desired or pre-defined amount. If the selected object is executable, then the selected object is invoked. If the selected object is an attribute or selection command, then the attribute may be adjusted by additional motion or the selection may invoke a command function. Of course, the systems may do all or any combination of these processes. If the object is an executable object such as taking a photo, turning on a device, etc., then the execution is simultaneous or acts in a predetermined way with the selection. If the object is a submenu, sublist or list of attributes associated with the selected object, then the submenu members, sublist members or attributes are displayed on the screen in a spaced apart format or appear as the selection becomes more certain and then persist once selection is certain or confirmed. The same procedure used to select the selected object is then used to select a member of the submenu, a member of the sublist or a particular attribute. Thus, the interfaces have a gravity like action on displayed selectable objects that move them toward the selection objection as certainty increases. As the selection object moves, it attracts an object or objects in alignment or relation with the properties of the sensed motions (direction, speed, acceleration, or changes in any of these primary properties) of the selection object pulling the object(s) meeting this criterion toward the selection object. Simultaneously, synchronously or asynchronously, submenus or subobjects may become visible if they were not so to begin with and may also move or change in relation to the movement or changes of the selected objects. Simultaneously, synchronously, or asynchronously, the non-selected objects may move or change away from the selection object(s). As motion continues, the pull increases on the object most aligned with the properties (e.g., direction) of motion or movement, further moving or accelerating the object toward the selection object until they touch, merge, or reach a triggering event—close enough to touch an active area or to predicted the selection to a threshold certainty. The touch, merge, or triggering event causes the processing unit to select and activate the object. The object(s) may also be defined as an area in between objects, giving a gate-like effect to provide selection of sub-menu or sub-objects that are aligned with the motion of the selection object and are located between, behind, or at the same angle but a different distance than this gate. Furthermore, a back object or area may be incorporated to undo or reverse effects or changes or motions that have occurred to objects, whether selectable or not.

BRIEF DESCRIPTION OF THE DRAWINGS

The invention can be better understood with reference to the following detailed description together with the appended illustrative drawings in which like elements are numbered the same:

FIGS. 1A-M depict a motion-based selection sequence using an attractive interface of this invention: (A) shows a display prior to activation by motion of a motion sensor in communication with the display; (B) depicts the display after activation to display a selection object and a plurality of selectable objects; (C) depicts the display after the selection object is moved toward a group of selectable objects; (D depicts the display after the group of selectable objects are pulled toward the selection object; E depicts the display showing further movement of the selection object causing a discrimination between the objects of the group, where the selection object touches one of the group members; F depicts the display showing the touched member and the selection object with the non-touched objects returned to their previous location; G depicts the display showing a merger of the selected object and the selection object repositioned to the center of the display; (H) depicts the display showing the selected object and the selection object and the elements associated with the selected object; (I) depicts the display after the selection object is moved toward a group of selectable subobjects, which have moved toward the selection object and increased in size; (J) depicts the display after the selection object is moved in a different direction directly toward another selectable subobject, which has moved toward the selection object and increased in size; (K) depicts the display after further motion of the selection object touches the selectable subobject; (L) depicts the display after merger of the selection object and the selected subobject, which is executed upon selection; and (M) depicts this display after merger and activation of the selected member of FIG. 1G.

FIG. 3A-I depict another motion-based selection sequence using an attractive interface of this invention: (A) depicts a display prior to activation by motion of a motion sensor in communication with the; (B) depicts the display after activation to display a top level of selectable object clusters distributed about a centroid in the display area; (C) depicts the objects within each cluster; (D) depicts the display showing a direction of motion detected by a motion sensor sensed by motion of a body or body part within an active zone of the motion sensor; (E) depicts the display showing prediction of the most probable cluster aligned with the direction of motion sensed by the motion sensor and the display of the cluster objects associated with the predicted cluster; (F) depicts the display showing a dispersal of the cluster objects for enhanced discrimination and showing an augmented direction of motion detected by the motion sensor sensed by motion of a body part within the active zone of the motion sensor; (G) depicts the display showing an attraction of the object discriminated by the last portion displayed in a more spaced apart configuration; (H) depicts the display showing a further augmentation of the direction of motion detected by a motion sensor sensed by motion of a body or body part within the active zone of the motion sensor permitting full discrimination of the cluster objects; and (I) depicts the display showing the centering of the selected and activation of the selected cluster object.

FIGS. 4A-D depict a motion based selection sequence including an objection and a selectable object as motion toward the selectable object increases causing an active area to form in front of the selectable object and increasing in scope as the selection object move closer to the selectable object until selection is within a threshold certainty.

DEFINITIONS USED IN THE INVENTION

Figure 1B:
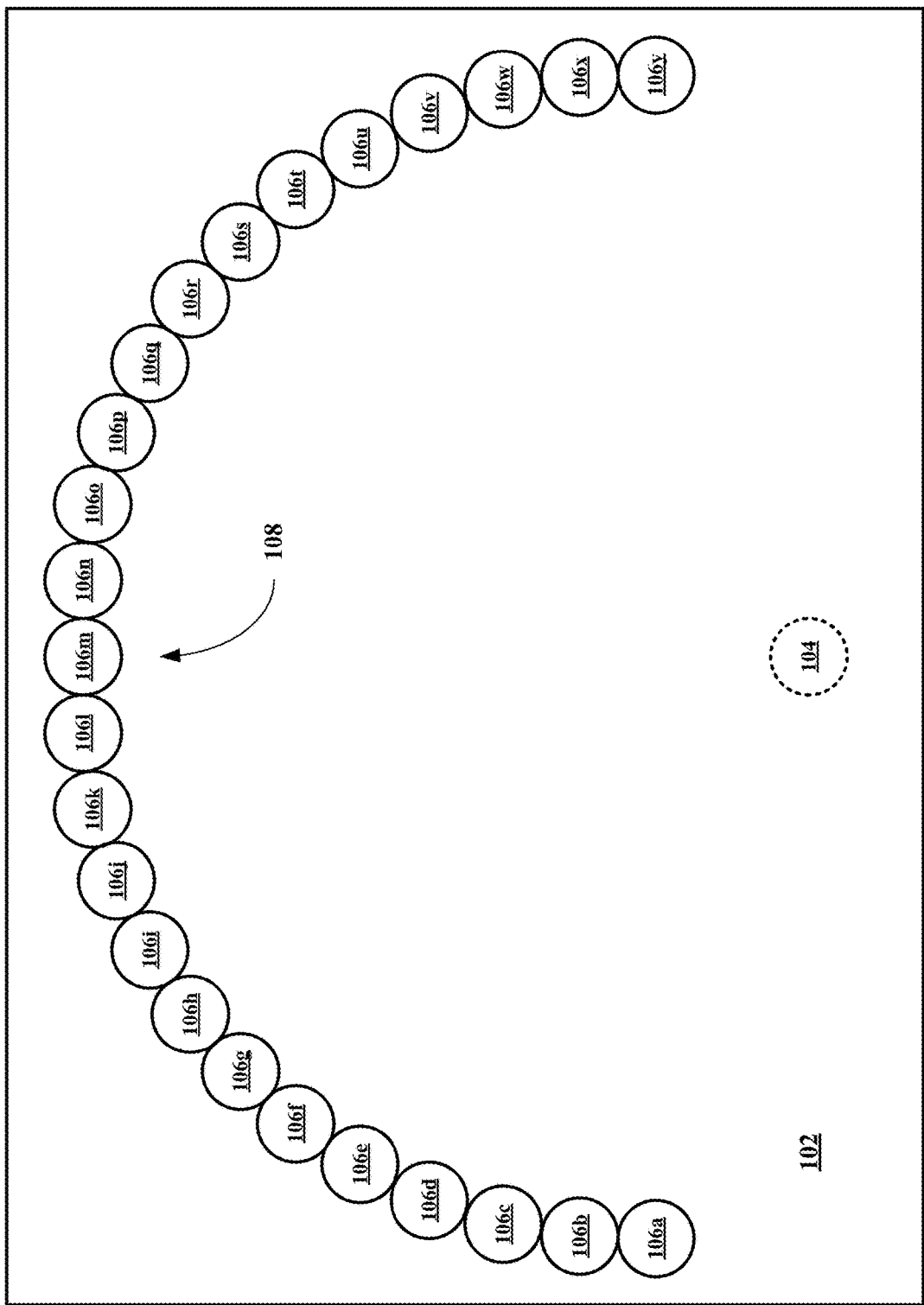

The term "at least one" means one or more or one or a plurality, additionally, these three terms may be used interchangeably within this application. For example, at least one device means one or more devices or one device and a plurality of devices.

The term "one or a plurality" means one item or a plurality of items.

The term "about" means that a value of a given quantity is within ±20% of the stated value. In other embodiments, the value is within ±15% of the stated value. In other embodiments, the value is within ±10% of the stated value. In other embodiments, the value is within ±5% of the stated value. In other embodiments, the value is within ±2.5% of the stated value. In other embodiments, the value is within ±1% of the stated value.

The term "substantially" means that a value of a given quantity is within ±10% of the stated value. In other embodiments, the value is within ±5% of the stated value. In other embodiments, the value is within ±2.5% of the stated value. In other embodiments, the value is within ±1% of the stated value.

The term "motion" and "movement" are often used interchangeably and mean motion or movement that is capable of being detected by a motion sensor within an active zone of the sensor. Thus, if the sensor is a forward viewing sensor and is capable of sensing motion within a forward extending conical active zone, then movement of anything within that active zone that meets certain threshold detection criteria, will result in a motion sensor output, where the output may include at least direction, velocity, and/or acceleration. Of course, the sensors do not need to have threshold detection criteria, but may simply generate output anytime motion or any kind is detected. The processing units can then determine whether the motion is an actionable motion or movement and a non-actionable motion or movement.

The term "motion sensor" or "motion sensing component" means any sensor or component capable of sensing motion of any kind by anything with an active zone—area or volume, regardless of whether the sensor's or component's primary function is motion sensing.

The term "real object" or "real world object" means any real world device or article that is capable of being controlled by a processing unit. Real objects include objects or articles that have real world presence including physical, mechanical, electro-mechanical, magnetic, electro-magnetic, electrical, or electronic devices or any other real world device that can be controlled by a processing unit.

The term "virtual object" means any construct generated in a virtual world or by a computer and displayed by a display device and that are capable of being controlled by a processing unit. Virtual objects include objects that have no real world presence, but are still controllable by a processing unit. These objects include elements within a software system, product or program such as icons, list elements, menu elements, generated graphic objects, 2D and 3D graphic images or objects, generated real world objects such as generated people, generated animals, generated devices, generated plants, generated landscapes and landscape objects, generate seascapes and seascape objects, generated skyscapes or skyscape objects, or any other generated real world or imaginary objects.

The term "entity" means a human or an animal or robot or robotic system (autonomous or non-autonomous.

The term "entity object" means a human or a part of a human (fingers, hands, toes, feet, arms, legs, eyes, head, body, etc.), an animal or a port of an animal (fingers, hands, toes, feet, arms, legs, eyes, head, body, etc.), or a real world object under the control of a human or an animal or a robot and include such articles as pointers, sticks, or any other real world object that can be directly or indirectly controlled by a human or animal or a robot.

DETAILED DESCRIPTION OF THE INVENTION

The inventor has found that selection attractive or manipulative apparatuses, systems, and/or interfaces may be constructed that use motion or movement within an active sensor zone of a motion sensor translated to motion or movement of a selection object on or within a user feedback device: 1) to discriminate between selectable objects based on the motion, 2) to attract target selectable objects towards the selection object based on properties of the sensed motion including direction, speed, acceleration, or changes thereof, and 3) to select and simultaneously activate a particular or target selectable object or a specific group of selectable objects or controllable area or an attribute or attributes upon "contact" of the selection object with the target selectable object(s), where contact means that: 1) the selection object actually touches or moves inside the target selectable object, 2) touches or moves inside an active zone (area or volume) surrounding the target selectable object, 3) the selection object and the target selectable object merge, 4) a triggering event occurs based on a close approach to the target selectable object or its associated active zone or 5) a triggering event based on a predicted selection meeting a threshold certainty. The touch, merge, or triggering event causes the processing unit to select and activate the object, select and active object attribute lists, select, activate and adjustments of an adjustable attribute. The objects may represent real and/or virtual objects including: 1) real world devices under the control of the apparatuses, systems, or interfaces, 2) real world device attributes and real world device controllable attributes, 3) software including software products, software systems, software components, software objects, software attributes, active areas of sensors, 4) generated emf fields, Rf fields, microwave fields, or other generated fields, 5) electromagnetic waveforms, sonic waveforms, ultrasonic waveforms, and/or 6) mixture and combinations thereof. The apparatuses, systems and interfaces of this invention may also include remote control units in wired or wireless communication therewith. The inventor has also found that a velocity (speed and direction) of motion or movement can be used by the apparatuses, systems, or interfaces to pull or attract one or a group of selectable objects toward a selection object and increasing speed may be used to increase a rate of the attraction of the objects, while decreasing motion speed may be used to slower a rate of attraction of the objects. The inventors have also found that as the attracted object move toward the selection object, they may be augmented in some way such as changed size, changed color, changed shape, changed line thickness of the form of the object, highlighted, changed to blinking, or combinations thereof. Simultaneously, synchronously or asynchronously, submenus or subobjects may also move or change in relation to the movements or changes of the selected objects. Simultaneously, synchronously or asynchronously, the non-selected objects may move away from the selection object (s). It should be noted that whenever a word object is used, it also includes the meaning of objects, and these objects may be simultaneously performing separate, simultaneous, and/or combined command functions or used by the processing units to issue combinational functions.

in certain embodiments, as the selection object moves toward a target object, the target object will get bigger as it moves toward the selection object. It is important to conceptualize the effect we are looking for. The effect may be analogized to the effects of gravity on objects in space. Two objects in space are attracted to each other by gravity proportional to the product of their masses and inversely proportional to the square of the distance between the objects. As the objects move toward each other, the gravitational force increases pulling them toward each other faster and faster. The rate of attraction increases as the distance decreases, and they become larger as they get closer. Contrarily, if the objects are close and one is moved away, the gravitational force decreases and the objects get smaller. In the present invention, motion of the selection object away from a selectable object may act as a rest, returning the display back to the original selection screen or back to the last selection screen much like a "back" or "undo" event. Thus, if the user feedback unit (e.g., display) is one level down from the top display, then movement away from any selectable object, would restore the display back to the main level. If the display was at some sublevel, then movement away from selectable objects in this sublevel would move up a sublevel. Thus, motion away from selectable objects acts to drill up, while motion toward selectable objects that have sublevels results in a drill down operation. Of course, if the selectable object is directly activatable, then motion toward it selects and activates it. Thus, if the object is an executable routine such as taking a picture, then contact with the selection object, contact with its active area, or triggered by a predictive threshold certainty selection selects and simultaneously activates the object. Once the interface is activated, the selection object and a default menu of items may be activated on or within the user feedback unit. If the direction of motion towards the selectable object or proximity to the active area around the selectable object is such that the probability of selection is increased, the default menu of items may appear or move into a selectable position, or take the place of the initial object before the object is actually selected such that by moving into the active area or by moving in a direction such that a commit to the object occurs, and simultaneously causes the subobjects or submenus to move into a position ready to be selected by just moving in their direction to cause selection or activation or both, or by moving in their direction until reaching an active area in proximity to the objects such that selection, activation or a combination of the two occurs. The selection object and the selectable objects (menu objects) are each assigned a mass equivalent or gravitational value of 1. The difference between what happens as the selection object moves in the display area towards a selectable object in the present interface, as opposed to real life, is that the selectable objects only feel the gravitation effect from the selection object and not from the other selectable objects. Thus, in the present invention, the selectable object is an attractor, while the selectable objects are non-interactive, or possibly even repulsive to each other. So as the selection object is moved in response to motion by a user within the motion sensors active zone—such as motion of a finger in the active zone—the processing unit maps the motion and generates corresponding movement or motion of the selection object towards selectable objects in the general direction of the motion. The processing unit then determines the projected direction of motion and based on the projected direction of motion, allows the gravitational field or attractive force of the selection object to be felt by the predicted selectable object or objects that are most closely aligned with the direction of motion. These objects may also include submenus or subobjects that move in relation to the movement of the selected object(s). This effect would be much like a field moving and expanding or fields interacting with fields, where the objects inside the field(s) would spread apart and move such that unique angles from the selection object become present so movement towards a selectable object or group of objects can be discerned from movement towards a different object or group of objects, or continued motion in the direction of the second or more of objects in a line would cause the objects to not be selected that had been touched or had close proximity, but rather the selection would be made when the motion stops, or the last object in the direction of motion is reached, and it would be selected. The processing unit causes the display to move those object toward the selectable object. The manner in which the selectable object moves may be to move at a constant velocity towards a selection object or to accelerate toward the selection object with the magnitude of the acceleration increasing as the movement focuses in on the selectable object. The distance moved by the person and the speed or acceleration may further compound the rate of attraction or movement of the selectable object towards the selection object. In certain situations, a negative attractive force or gravitational effect may be used when it is more desired that the selected objects move away from the user. Such motion of the objects would be opposite of that described above as attractive. As motion continues, the processing unit is able to better discriminate between competing selectable objects and the one or ones more closely aligned are pulled closer and separated, while others recede back to their original positions or are removed or fade. If the motion is directly toward a particular selectable object with a certainty above a threshold value, which has a certainty of greater than 50%, then the selection and selectable objects merge and the selectable object is simultaneously selected and activated. Alternatively, the selectable object may be selected prior to merging with the selection object if the direction, speed and/or acceleration of the selection object is such that the probability of the selectable object is enough to cause selection, or if the movement is such that proximity to the activation area surrounding the selectable object is such that the threshold for selection, activation or both occurs. Motion continues until the processing unit is able to determine that a selectable object has a selection threshold of greater than 50%, meaning that it more likely than not the correct target object has been selected. In certain embodiments, the selection threshold will be at least 60%. In other embodiments, the selection threshold will be at least 70%. In other embodiments, the selection threshold will be at least 80%. In yet other embodiments, the selection threshold will be at least 90%.

in certain embodiments, the selection object will actually appear on the display screen, while in other embodiments, the selection object will exist only virtually in the processor software. For example, for motion sensors that require physical contact for activation such as touch screens, the selection object may be displayed and/or virtual, with motion on the screen used to determine which selectable objects from a default collection of selectable objects will be moved toward a perceived or predefined location of a virtual section object or toward the selection object in the case of a displayed selection object, while a virtual object simply exists in software such as at a center of the display or a default position to which selectable object are attracted, when the motion aligns with their locations on the default selection. In the case of motion sensors that have active zones such as cameras, IR sensors, sonic sensors, or other sensors capable of detecting motion within an active zone and creating an output representing that motion to a processing unit that is capable of determining direction, speed and/or acceleration properties of the sensed or detected motion, the selection object is generally virtual and motion of one or more body parts of a user is used to attract a selectable object or a group of selectable objects to the location of the selection object and predictive software is used to narrow the group of selectable objects and zero in on a particular selectable object, objects, objects and attributes, and/or attributes. In certain embodiments, the interface is activated from a sleep condition by movement of a user or user body part in to the active zone of the motion sensor or sensors associated with the interface. Once activated, the feedback unit such as a display associated with the interface displays or evidences in a user discernible manner a default set of selectable objects or a top level set of selectable objects. The selectable objects may be clustered in related groups of similar objects or evenly distributed about a centroid of attraction if no selection object is generated on the display or in or on another type of feedback unit. If one motion sensor is sensitive to eye motion, then motion of the eyes will be used to attract and discriminate between potential target objects on the feedback unit such as a display screen. If the interface is an eye only interface, then eye motion is used to attract and discriminate selectable objects to the centroid, with selection and activation occurring when a selection threshold is exceeded—greater than 50% confidence that one selectable object is more closely aligned with the direction of motion than all other objects. The speed and/or acceleration of the motion along with the direction are further used to enhance discrimination by pulling potential target objects toward the centroid quicker and increasing their size and/or increasing their relative separation. Proximity to the selectable object may also be used to confirm the selection. Alternatively, if the interface is an eye and other body part interface, then eye motion will act as the primary motion driver, with motion of the other body part acting as a confirmation of eye movement selections. Thus, if eye motion has narrowed the selectable objects to a group, motion of the other body part may be used by the processing unit to further discriminate and/or select/activate a particular object or if a particular object meets the threshold and is merging with the centroid, then motion of the object body part may be used to confirm or reject the selection regardless of the threshold confidence. In other embodiments, the motion sensor and processing unit may have a set of predetermined actions that are invoked by a given structure of a body part or a given combined motion of two or more body parts. For example, upon activation, if the motion sensor is capable of analyzing images, a hand holding up different number of figures from zero, a fist, to five, an open hand may cause the processing unit to display different base menus. For example, a fist may cause the processing unit to display the top level menu, while a single finger may cause the processing unit to display a particular submenu. Once a particular set of selectable objects is displayed, then motion attracts the target object, which is simultaneously selected and activated. In other embodiments, confirmation may include a noised generated by the uses such as a word, a vocal noise, a predefined vocal noise, a clap, a snap, or other audio controlled sound generated by the user; in other embodiments, confirmation may be visual, audio or haptic effects or a combination of such effects.

Embodiments of this invention provide methods and systems implementing the methods comprising the steps of sensing circular movement via a motion sensor, where the circular movement is sufficient to activate a scroll wheel, scrolling through a list associated with the scroll wheel, where movement close to the center causes a faster scroll, while movement further from the center causes a slower scroll and simultaneously faster circular movement causes a faster scroll while slower circular movement causes slower scroll. When the user stops the circular motion, even for a very brief time, the list becomes static so that the user may move to a particular object, hold over a particular object, or change motion direction at or near a particular object. The whole wheel or a partial amount of the wheel may be displayed, or just and arc may be displayed where scrolling moves up and down the arc. These actions cause the processing unit to select the particular object, to simultaneously select and activate the particular object, or to simultaneously select, activate, and control an attribute of the object. By beginning the circular motion again, anywhere on the screen, scrolling recommences immediately. Of course, scrolling could be through a list of values, or actually be controlling values as well.

Embodiments of the present invention also provide methods and systems implementing the methods including the steps of displaying an arcuate menu layouts of selectable objects on a display field, sensing movement toward an object pulling the object toward the center based on a direction, a speed and/or an acceleration of the movement, as the selected object moves toward the center, displaying subobjects appear distributed in an arcuate spaced apart configuration about the selected object. The apparatus, system and methods can repeat the sensing and displaying operations.

Embodiments of this invention relate to methods and systems for implementing the methods comprising the steps of predicting an object's selection based on the properties of the sensed movement, where the properties includes direction, speed, acceleration, changes thereof, or combinations thereof. For example, faster speed may increase predictability, while slower speed may decrease predictability or visa versa. Alternatively, moving averages may be used to extrapolate the desired object desired. Along with this is the "gravitational", "electric" and/or "magnetic" attractive or repulsive effects utilized by the methods and systems, whereby the selectable objects move towards the user or selection object and accelerates towards the user or selection object as the user or selection object and selectable objects come closer together. This may also occur by the user beginning motion towards a particular selectable object, the particular selectable object begins to accelerate towards the user or the selection object, and the user and the selection object stops moving, but the particular selectable object continues to accelerate towards the user or selection object. In the certain embodiments, the opposite effect occurs as the user or selection objects moves away—starting close to each other, the particular selectable object moves away quickly, but slows down its rate of repulsion as distance is increased, making a very smooth look. In different uses, the particular selectable object might accelerate away or return immediately to it's original or predetermined position. In any of these circumstances, a dynamic interaction is occurring between the user or selection object and the particular selectable object(s), where selecting and controlling, and deselecting and controlling can occur, including selecting and controlling or deselecting and controlling associated submenus or subobjects and/or associated attributes, adjustable or invocable.

Embodiments of this invention relate to methods and systems for implementing the methods comprising the steps of detecting at least one bio-kinetic characteristic of a user such as a fingerprint, fingerprints, a palm print, retinal print, size, shape, and texture of fingers, palm, eye(s), hand(s), face, etc. or at least one EMF, acoustic, thermal or optical characteristic detectable by sonic sensors, thermal sensors, optical sensors, capacitive sensors, resistive sensors, or other sensor capable of detecting EMF fields or other characteristics, or combinations thereof emanating from a user, including specific movements and measurements of movements of body parts such as fingers or eyes that provide unique markers for each individual, determining an identity of the user from the bio-kinetic characteristics, and sensing movement as set forth herein. In this way, the existing sensor for motion may also recognize the user uniquely. This recognition may be further enhanced by using two or more body parts or bio-kinetic characteristics (e.g., two fingers), and even further by body parts performing a particular task such as being squeezed together, when the user enters in a sensor field. Other bio-kinetic and/or biometric characteristics may also be used for unique user identification such as skin characteristics and ratio to joint length and spacing. Further examples include the relationship between the finger(s), hands or other body parts and the interference pattern created by the body parts creates a unique constant and may be used as a unique digital signature. For instance, a finger in a 3D acoustic or EMF field would create unique null and peak points or a unique null and peak pattern, so the "noise" of interacting with a field may actually help to create unique identifiers. This may be further discriminated by moving a certain distance, where the motion may be uniquely identified by small tremors, variations, or the like, further magnified by interference patterns in the noise. This type of unique identification is most apparent when using a touchless sensor or array of touchless sensors, where interference patterns (for example using acoustic sensors) may be present due to the size and shape of the hands or fingers, or the like. Further uniqueness may be determined by including motion as another unique variable, which may help in security verification.

Embodiments of this invention relate to methods and systems for implementing the methods comprising the steps of sensing movement of a first body part such as an eye, etc., tracking the first body part movement until is pauses on an object, preliminarily selecting the object, sensing movement of a second body part such as finger, hand, foot, etc., confirming the preliminary selection and selecting the object. The selection may then cause the processing unit to invoke one of the command and control functions including issuing a scroll function, a simultaneous select and scroll function, a simultaneous select and activate function, a simultaneous select, activate, and attribute adjustment function, or a combination thereof, and controlling attributes by further movement of the first or second body parts or activating the objects if the object is subject to direct activation. These selection procedures may be expanded to the eye moving to an object (scrolling through a list or over a list), the finger or hand moving in a direction to confirm the selection and selecting an object or a group of objects or an attribute or a group of attributes. In certain embodiments, if object configuration is predetermined such that an object in the middle of several objects, then the eye may move somewhere else, but hand motion continues to scroll or control attributes or combinations thereof, independent of the eyes. Hand and eyes may work together or independently, or a combination in and out of the two. Thus, movements may be compound, sequential, simultaneous, partially compound, compound in part, or combinations thereof.

Embodiments of this invention relate to methods and systems for implementing the methods comprising the steps of capturing a movement of a user during a selection procedure or a plurality of selection procedures to produce a raw movement dataset. The methods and systems also include the step of reducing the raw movement dataset to produce a refined movement dataset, where the refinement may include reducing the movement to a plurality of linked vectors, to a fit curve, to a spline fit curve, to any other curve fitting format having reduced storage size, or to any other fitting format. The methods and systems also include the step of storing the refined movement dataset. The methods and systems also include the step of analyzing the refined movement dataset to produce a predictive tool for improving the prediction of a users selection procedure using the motion based system or to produce a forensic tool for identifying the past behavior of the user or to process a training tools for training the user interface to improve user interaction with the interface.

Embodiments of this invention relate to methods and systems for implementing the methods comprising the steps of sensing movement of a plurality of body parts simultaneously or substantially simultaneously and converting the sensed movement into control functions for simultaneously controlling an object or a plurality of objects. The methods and systems also include controlling an attribute or a plurality of attributes, or activating an object or a plurality of objects, or any combination thereof. For example, placing a hand on a top of a domed surface for controlling a UAV, sensing movement of the hand on the dome, where a direction of movement correlates with a direction of flight, sensing changes in the movement on the top of the domed surface, where the changes correlate with changes in direction, speed, or acceleration of functions, and simultaneously sensing movement of one or more fingers, where movement of the fingers may control other features of the UAV such as pitch, yaw, roll, camera focusing, missile firing, etc. with an independent finger(s) movement, while the hand is controlling the UAV, either through remaining stationary (continuing last known command) or while the hand is moving, accelerating, or changing direction of acceleration. In certain embodiments where the display device is flexible device such as a flexible screen or flexible dome, the movement may also include deforming the surface of the flexible device, changing a pressure on the surface, or similar surface deformations. These deformations may be used in conjunction with the other motions.

Embodiments of this invention relate to methods and systems for implementing the methods comprising the steps of populating a display field with displayed primary objects and hidden secondary objects, where the primary objects include menus, programs, devices, etc. and secondary objects include submenus, attributes, preferences, etc. The methods and systems also include sensing movement, highlighting one or more primary objects most closely aligned with a direction of the movement, predicting a primary object based on the movement, and simultaneously: (a) selecting the primary object, (b) displaying secondary objects most closely aligned with the direction of motion in a spaced apart configuration, (c) pulling the primary and secondary objects toward a center of the display field or to a pre-determined area of the display field, and (d) removing, fading, or making inactive the unselected primary and secondary objects until making active again.

Alternately, zones in between primary and/or secondary objects may act as activating areas or subroutines that would act the same as the objects. For instance, if someone were to move in between two objects in 3D space, objects in the background could be rotated to the front and the front objects could be rotated towards the back, or to a different level.

Embodiments of this invention relate to methods and systems for implementing the methods comprising the steps of populating a display field with displayed primary objects and offset active fields associated with the displayed primary objects, where the primary objects include menus, object lists, alphabetic characters, numeric characters, symbol characters, other text based characters. The methods and systems also include sensing movement, highlighting one or more primary objects most closely aligned with a direction of the movement, predicting a primary object based on the movement, and simultaneously: (a) selecting the primary object, (b) displaying secondary (tertiary or deeper) objects most closely aligned with the direction of motion in a spaced apart configuration, (c) pulling the primary and secondary or deeper objects toward a center of the display field or to a pre-determined area of the display field, and/or (d) removing, making inactive, or fading or otherwise indicating non-selection status of the unselected primary, secondary, and deeper level objects.

Embodiments of this invention relate to methods and systems for implementing the methods comprising the steps of sensing movement of an eye and simultaneously moving elements of a list within a fixed window or viewing pane of a display field or a display or an active object hidden or visible through elements arranged in a 2D or 3D matrix within the display field, where eye movement anywhere, in any direction in a display field regardless of the arrangement of elements such as icons moves through the set of selectable objects. Of course the window may be moved with the movement of the eye to accomplish the same scrolling through a set of lists or objects, or a different result may occur by the use of both eye position in relation to a display or volume (perspective), as other motions occur, simultaneously or sequentially. Thus, scrolling does not have to be in a linear fashion, the intent is to select an object and/or attribute and/or other selectable items regardless of the manner of motion—linear, arcuate, angular, circular, spiral, random, or the like. Once an object of interest is to be selected, then selection is accomplished either by movement of the eye in a different direction, holding the eye in place for a period of time over an object, movement of a different body part, or any other movement or movement type that affects the selection of an object or audio event, facial posture, or biometric or bio-kinetic event.

Embodiments of this invention relate to methods and systems for implementing the methods comprising the steps of sensing movement of an eye, selecting an object, an object attribute or both by moving the eye in a pre-described change of direction such that the change of direction would be known and be different than a random eye movement, or a movement associated with the scroll (scroll being defined by moving the eye all over the screen or volume of objects with the intent to choose).

Embodiments of this invention relate to methods and systems for implementing the methods comprising the steps of sensing eye movement via a motion sensor, selecting an object displayed in a display field when the eye pauses at an object for a dwell time sufficient for the motion sensor to detect the pause and simultaneously activating the selected object, repeating the sensing and selecting until the object is either activatable or an attribute capable of direct control. In certain embodiments, the methods also comprise predicting the object to be selected from characteristics of the movement and/or characteristics of the manner in which the user moves. In other embodiments, eye tracking—using gaze instead of motion for selection/control via eye focusing (dwell time or gaze time) on an object and a body motion (finger, hand, etc.) scrolls through an associated attribute list associated with the object, or selects a submenu associated with the object. Eye gaze selects a submenu object and body motion confirms selection (selection does not occur without body motion), so body motion actually affects object selection.

In other embodiments, eye tracking—using motion for selection/control—eye movement is used to select a first word in a sentence of a word document. Selection is confirmed by body motion of a finger (e.g., right finger) which holds the position. Eye movement is then tracked to the last word in the sentence and another finger (e.g., the left finger) confirms selection. Selected sentence is highlighted due to second motion defining the boundary of selection. The same effect may be had by moving the same finger towards the second eye position (the end of the sentence or word). Movement of one of the fingers towards the side of the monitor (movement is in different direction than the confirmation move) sends a command to delete the sentence. Alternatively, movement of eye to a different location, followed by both fingers moving generally towards that location results in the sentence being copied to the location at which the eyes stopped. This may also be used in combination with a gesture or with combinations of motions and gestures such as eye movement and other body movements concurrently—multiple inputs at once such as UAV controls described below.

In other embodiments, looking at the center of picture or article and then moving one finger away from center of picture or center of body enlarges the picture or article (zoom in). Moving finger towards center of picture makes picture smaller (zoom out). What is important to understand here is that an eye gaze point, a direction of gaze, or a motion of the eye provides a reference point for body motion and location to be compared. For instance, moving a body part (say a finger) a certain distance away from the center of a picture in a touch or touchless, 2D or 3D environment (area or volume as well), may provide a different view. For example, if the eye(s) were looking at a central point in an area, one view would appear, while if the eye(s) were looking at an edge point in an area, a different view would appear. The relative distance of the motion would change, and the relative direction may change as well, and even a dynamic change involving both eye(s) and finger, could provide yet another change of motion. For example, by looking at the end of a stick and using the finger to move the other end of it, the pivot point would be the end the eyes were looking at. By looking at the middle of the stick, then using the finger to rotate the end, the stick would pivot around the middle. Each of these movement may be used to control different attributes of a picture, screen, display, window, or volume of a 3D projection, etc. What now takes two fingers may be replaced by one due to the eye(s) acting as the missing finger.

These concepts are useable to manipulate the view of pictures, images, 3D data or higher dimensional data, 3D renderings, 3D building renderings, 3D plant and facility renderings, or any other type of 3D or higher dimensional pictures, images, or renderings. These manipulations of displays, pictures, screens, etc. may also be performed without the coincidental use of the eye, but rather by using the motion of a finger or object under the control or a user, such as by moving from one lower corner of a bezel, screen, or frame (virtual or real) diagonally to the opposite upper corner to control one attribute, such as zooming in, while moving from one upper corner diagonally to the other lower corner would perform a different function, for example zooming out. This motion may be performed as a gesture, where the attribute change might occur in at predefined levels, or may be controlled variably so the zoom in/out function may be a function of time, space, and/or distance. By moving from one side or edge to another, the same predefined level of change, or variable change may occur on the display, picture, frame, or the like. For example, a TV screen displaying a picture and zoom-in may be performed by moving from a bottom left corner of the frame or bezel, or an identifiable region (even off the screen) to an upper right potion. As the user moves, the picture is magnified (zoom-in). By starting in an upper right corner and moving toward a lower left, the system causes the picture to be reduced in size (zoom-out) in a relational manner to the distance or speed the user moves. If the user makes a quick diagonally downward movement from one upper corner to the other lower corner, the picture may be reduced by 50% (for example). This eliminates the need for using two fingers that is currently popular as a pinch/zoom function.

By the user moving from a right side of the frame or bezel or predefined location towards a left side, an aspect ratio of the picture may be changed so as to make the picture tall and skinny By moving from a top edge toward a bottom edge, the picture may cause the picture to appear short and wide. By moving two fingers from one upper corner diagonally towards a lower corner, or from side to side, a "cropping" function may be used to select certain aspects of the picture.

By taking one finger and placing it near the edge of a picture, frame, or bezel, but not so near as to be identified as desiring to use a size or crop control, and moving in a rotational or circular direction, the picture could be rotated variably, or if done in a quick gestural motion, the picture might rotate a predefined amount, for instance 90 degrees left or right, depending on the direction of the motion.

By moving within a central area of a picture, the picture may be moved "panned" variably by a desired amount or panned a preset amount, say 50% of the frame, by making a gestural motion in the direction of desired panning. Likewise, these same motions may be used in a 3D environment for simple manipulation of object attributes. These are not specific motions using predefined pivot points as is currently used in CAD programs, but is rather a way of using the body (eyes or fingers for example) in broad areas. These same motions may be applied to any display, projected display or other similar device. In a mobile device, where many icons (objects) exist on one screen, where the icons include folders of "nested" objects, by moving from one lower corner of the device or screen diagonally toward an upper corner, the display may zoom in, meaning the objects would appear magnified, but fewer would be displayed. By moving from an upper right corner diagonally downward, the icons would become smaller, and more could be seen on the same display. Moving in a circular motion near an edge of the display may cause rotation of the icons, providing scrolling through lists and pages of icons. Moving from one edge to an opposite edge would change the aspect ratio of the displayed objects, making the screen of icons appear shorter and wider, or taller and and skinny, based on the direction moved.

In other embodiments, looking at a menu object then moving a finger away from object or center of body opens up sub menus. If the object represents a software program such as excel, moving away opens up spreadsheet fully or variably depending on how much movement is made (expanding spreadsheet window).

In other embodiments, instead of being a program accessed through an icon, the program may occupy part of a 3D space that the user interacts with or a field coupled to the program acting as a sensor for the program through which the user to interacts with the program. In other embodiments, if object represents a software program such as Excel and several (say 4) spreadsheets are open at once, movement away from the object shows 4 spread sheet icons. The effect is much like pulling curtain away from a window to reveal the software programs that are opened. The software programs might be represented as "dynamic fields", each program with its own color, say red for excel, blue for word, etc. The objects or aspects or attributes of each field may be manipulated by using motion. For instance, if a center of the field is considered to be an origin of a volumetric space about the objects or value, moving at an exterior of the field cause a compound effect on the volume as a whole due to having a greater x value, a greater y value, or a great z value—say the maximum value of the field is 5 (x, y, or z), moving at a 5 point would be a multiplier effect of 5 compared to moving at a value of 1 (x, y, or z). The inverse may also be used, where moving at a greater distance from the origin may provide less of an effect on part or the whole of the field and corresponding values. Changes in color, shape, size, density, audio characteristics, or any combination of these and other forms of representation of values could occur, which may also help the user or users to understand the effects of motion on the fields. These may be preview panes of the spreadsheets or any other icons representing these. Moving back through each icon or moving the finger through each icon or preview pane, then moving away from the icon or center of the body selects the open programs and expands them equally on the desktop, or layers them on top of each other, etc.

In other embodiments, four Word Documents (or any program or web pages) are open at once. Movement from bottom right of the screen to top left reveals the document at bottom right of page, effect looks like pulling curtain back. Moving from top right to bottom left reveals a different document. Moving from across the top, and circling back across the bottom opens all, each in its quadrant, then moving through the desired documents and creating circle through the objects links them all together and merges the documents into one document. As another example, the user opens three spreadsheets and dynamically combines or separates the spreadsheets merely via motions or movements, variably per amount and direction of the motion or movement. Again, the software or virtual objects are dynamic fields, where moving in one area of the field may have a different result than moving in another area, and the combining or moving through the fields causes a combining of the software programs, and may be done dynamically. Furthermore, using the eyes to help identify specific points in the fields (2D or 3D) would aid in defining the appropriate layer or area of the software program (field) to be manipulated or interacted with. Dynamic layers within these fields may be represented and interacted with spatially in this manner. Some or all the objects may be affected proportionately or in some manner by the movement of one or more other objects in or near the field. Of course, the eyes may work in the same manner as a body part, or in combination with other objects or body parts.

In other embodiments, the eye selects (acts like a cursor hovering over an object and object may or may not respond, such as changing color to identify it has been selected), then a motion or gesture of eye or a different body part confirms and disengages the eyes for further processing.

In other embodiments, the eye selects or tracks and a motion or movement or gesture of second body part causes a change in an attribute of the tracked object—such as popping or destroying the object, zooming, changing the color of the object, etc. finger is still in control of the object.

In other embodiments, eye selects, and when body motion and eye motion are used, working simultaneously or sequentially, a different result occurs compared to when eye motion is independent of body motion, e.g., eye(s) tracks a bubble, finger moves to zoom, movement of the finger selects the bubble and now eye movement will rotate the bubble based upon the point of gaze or change an attribute of the bubble, or the eye may gaze and select and/or control a different object while the finger continues selection and/or control of the first object or a sequential combination could occur, such as first pointing with the finger, then gazing at a section of the bubble may produce a different result than looking first and then moving a finger; again a further difference may occur by using eyes, then a finger, then two fingers than would occur by using the same body parts in a different order.

Other embodiments of this invention relate to methods and systems for implementing the methods comprising the steps of: controlling helicopter with one hand on a domed interface, where several fingers and hand all move together and move separately. In this way, the whole movement of the hand controls the movement of the helicopter in yaw, pitch and roll, while the fingers may also move simultaneously to control cameras, artillery, or other controls or attributes, or both. This is movement of multiple inputs simultaneously congruently or independently.

Note—we have not discussed the perspective of the user as gravitational effects and object selections are made in 3D space. For instance, as we move in 3D space towards subobjects, using our previously submitted gravitational and predictive effects, each selection may change the entire perspective of the user so the next choices are in the center of view or in the best perspective. This may include rotational aspects of perspective, the goal being to keep the required movement of the user small and as centered as possible in the interface real estate. This is really showing the aspect of the user, and is relative. Since we are saying the objects and fields may be moved, or saying the user may move around the field, it is really a relative.

Other embodiments of this invention relate to methods and systems for implementing the methods comprising the steps of sensing movement of a button or knob with motion controls associated therewith, either on top of or in 3D, 3 space, on sides (whatever the shape), predicting which gestures are called by direction and speed of motion (maybe amendment to gravitational/predictive application). By definition, a gesture has a pose-movement-pose then lookup table, then command if values equal values in lookup table. We can start with a pose, and predict the gesture by beginning to move in the direction of the final pose. As we continue to move, we would be scrolling through a list of predicted gestures until we can find the most probable desired gesture, causing the command of the gesture to be triggered before the gesture is completed. Predicted gestures could be dynamically shown in a list of choices and represented by objects or text or colors or by some other means in a display. As we continue to move, predicted end results of gestures would be dynamically displayed and located in such a place that once the correct one appears, movement towards that object, representing the correct gesture, would select and activate the gestural command. In this way, a gesture could be predicted and executed before the totality of the gesture is completed, increasing speed and providing more variables for the user.

For example, in a keyboard application, current software use shapes of gestures to predict words. Google uses zones of letters (a group of letters), and combinations of zones (gestures) to predict words. We would use the same gesture-based system, except we be able to predict which zone the user is moving towards based upon direction of motion, meaning we would not have to actually move into the zone to finish the gesture, but moving towards the zone would bring up choice bubbles, and moving towards the bubble would select that bubble.

In another example, instead of using a gesture such as "a pinch" gesture to select something in a touchless environment, movement towards making that gesture would actually trigger the same command. So instead of having to actually touch the finger to the thumb, just moving the finger towards the thumb would cause the same effect to occur. Most helpful in combination gestures where a finger pointing gesture is followed by a pinching gesture to then move a virtual object. By predicting the gesture, after the point gesture, the beginning movement of the pinch gesture would be faster than having to finalize the pinching motion.

Other embodiments of this invention relate to methods and systems for implementing the methods comprising the steps of: sensing movement via a motion sensor within a display field displaying a list of letters from an alphabet, predicting a letter or a group of letters based on the motion, if movement is aligned with a single letter, simultaneously select the letter or simultaneously moving the group of letter forward until a discrimination between letters in the group is predictively certain and simultaneously select the letter, sensing a change in a direction of motion, predicting a second letter or a second group of letter based on the motion, if movement is aligned with a single letter, simultaneously select the letter or simultaneously moving the group of letter forward until a discrimination between letters in the group is predictively certain and simultaneously select the letter, either after the first letter selection or the second letter selection or both, display a list of potential words beginning with either the first letter or the second letter, selecting a word from the word list by movement of a second body part simultaneously selected the word and resetting the original letter display, and repeating the steps until a message is completed.

Thus, the current design selects a letter simply by changing a direction of movement at or near a letter. A faster process would be to use movement toward a letter, then changing a direction of movement before reaching the letter and moving towards a next letter and changing direction of movement again before getting to the next letter would better predict words, and might change the first letter selection. Selection bubbles would appear and be changing while moving, so speed and direction would be used to predict the word, not necessarily having to move over the exact letter or very close to it, though moving over the exact letter would be a positive selection of that letter and this effect could be better verified by a slight pausing or slowing down of movement. (Of course, this could be combined with current button like actions or lift-off events (touch-up events), and more than one finger or hand may be used, both simultaneously or sequentially to provide the spelling and typing actions.) This is most effective in a touchless environment where relative motion can be leveraged to predict words on a keyboard rather than the actual distance required to move from key to key. The distance from a projected keyboard and movement of finger uses angles of motion to predict letters. Predictive word bubbles can be selected with a Z movement. B) Move below the letters of a keyboard to select, or shape the letter buttons in such a way that they extend downward (like a tear drop) so actual letters can be seen while selecting instead of covering the letters (the touch or active zones are offset from the actual keys. This can also be used with predictive motions to create a very fast keyboard where relative motions are used to predict keys and words while more easily being able to see the key letters. Bubbles could also appear above or besides the keys, or around them, including in a arcuate or radial fashion to further select predicted results by moving towards the suggested words.

Other embodiments of this invention relate to methods and systems for implementing the methods comprising the steps of: maintaining all software applications in an instant on configuration—on, but inactive, resident, but not active, so that once selected the application which is merely dormant, is fully activate instantaneously (or may be described as a different focus of the object), sensing movement via a motion sensor with a display field including application objects distributed on the display in a spaced apart configuration, preferably, in a maximally spaced apart configuration so that the movement results in a fast predict selection of an application object, pulling an application object or a group of application objects toward a center of the display field, if movement is aligned with a single application, simultaneously select and instant on the application, or continue monitoring the movement until a discrimination between application objects is predictively certain and simultaneously selecting and activating the application object.

Thus, the industry must begin to start looking at everything as always on and what is on is always interactive, and may have different levels of interactivity. For instance, software should be an interactive field. Excel and word should be interactive fields where motion through them can combine or select areas, which correspond to cells and texts being intertwined with the motion. Excel sheets should be part of the same 3D field, not separate pages, and should have depth so their aspects can be combined in volume. The software desktop experience needs a depth where the desktop is the cover of a volume, and rolling back the desktop from different corners reveals different programs that are active and have different colors, such as word being revealed when moving from bottom right to top left and being a blue field, excel being revealed when moving from top left to bottom right and being red; moving right to left lifts desktop cover and reveals all applications in volume, each application with its own field and color in 3D space.

Other embodiments of this invention relate to methods and systems of this invention, where the active screen area includes a delete or backspace region. When the user moves the active object (cursor) toward the delete or backspace region, then the selected objects will be released one at a time or in groups or completely depending on attributes of movement toward the delete of backspace region. Thus, if the movement is slow and steady, then the selected objects are released one at a time. If the movement is fast, then multiple selected objects are released. Thus, the delete or backspace region is variable. For example, if the active display region represents a cell phone dialing pad (with the number distributed in any desired configuration from a traditional grid configuration to a arcuate configuration about the active object, or in any other desirable configuration), when by moving the active object toward the delete or backspace region, numbers will be removed from the number, which may be displayed in a number display region of the display. Alternatively, touching the backspace region would back up one letter; moving from right to left in the backspace region would delete (backspace) a corresponding amount of letters based on the distance (and/or speed) of the movement, The deletion could occur when the motion is stopped, paused, or a lift off event is detected. Alternatively, a swiping motion (jerk, or fast acceleration) could result in the deletion (backspace) the entire word. All these may or may not require a lift off event, but the motion dictates the amount deleted or released objects such as letters, numbers, or other types of objects. The same is true with the delete key, except the direction would be forward instead of backwards. Lastly, the same could be true in a radial menu (or linear or spatial), where the initial direction of motion towards an object or on an object, or in a zone associated with an object, that has a variable attribute. The motion associated with or towards that object would provide immediate control.

Other embodiments of this invention relate to methods and systems of this invention, where eye movement is used to select and body part movement is used to confirm or activate the selection. Thus, eye movement is used as the selective movement, while the object remains in the selected state, then the body part movement confirms the selection and activates the selected object. Thus, specifically stated the eye or eyes look in a different direction or area, and the last selected object would remain selected until a different object is selected by motion of the eyes or body, or until a time-out deselects the object. An object may be also selected by an eye gaze, and this selection would continue even when the eye or eyes are no longer looking at the object. The object would remain selected unless a different selectable object is looked at, or unless a timeout deselects the object occurs.

In all of the embodiments set forth above, the motion or movement may also comprise lift off event, where a finger or other body part or parts are in direct contract with a touch sensitive feedback device such as a touch screen, then the acceptable forms of motion or movement will comprise touching the screen, moving on or across the screen, lifting off from the screen (lift off events), holding still on the screen at a particular location, holding still after first contact, holding still after scroll commencement, holding still after attribute adjustment to continue an particular adjustment, holding still for different periods of time, moving fast or slow, moving fast or slow or different periods of time, accelerating or decelerating, accelerating or decelerating for different periods of time, changing direction, changing speed, changing velocity, changing acceleration, changing direction for different periods of time, changing speed for different periods of time, changing velocity for different periods of time, changing acceleration for different periods of time, or any combinations of these motions may be used by the systems and methods to invoke command and control over real world or virtual world controllable objects using on the motion only. Of course, if certain objects that are invoked by the motion sensitive processing of the systems and methods of this invention require hard select protocols—mouse clicks, finger touches, etc., the invoked object's internal function will not be augmented by the systems or methods of this invention unless the invoked object permits or supports system integration.

The systems and methods are disclosed herein where command functions for selection and/or control of real and/or virtual objects may be generated based on a change in velocity at constant direction, a change in direction at constant velocity, a change in both direction and velocity, a change in a rate of velocity, or a change in a rate of acceleration. Once detected by an detector or sensor, these changes may be used by a processing unit to issue commands for controlling real and/or virtual objects. A selection or combination scroll, selection, and attribute selection may occur upon the first movement. Such motion may be associated with doors opening and closing in any direction, golf swings, virtual or real world games, light moving ahead of a runner, but staying with a walker, or any other motion having compound properties such as direction, velocity, acceleration, and changes in any one or all of these primary properties; thus, direction, velocity, and acceleration may be considered primary motion properties, while changes in these primary properties may be considered secondary motion properties. The system may then be capable of differentially handling of primary and secondary motion properties. Thus, the primary properties may cause primary functions to be issued, while secondary properties may cause primary function to be issued, but may also cause the modification of primary function and/or secondary functions to be issued. For example, if a primary function comprises a predetermined selection format, the secondary motion properties may expand or contract the selection format.

In another example of this primary/secondary format for causing the system to generate command functions may involve an object display. Thus, by moving the object in a direction away from the user's eyes, the state of the display may change, such as from a graphic to a combination graphic and text, to a text display only, while moving side to side or moving a finger or eyes from side to side could scroll the displayed objects or change the font or graphic size, while moving the head to a different position in space might reveal or control attributes or submenus of the object. Thus, these changes in motions may be discrete, compounded, or include changes in velocity, acceleration and rates of these changes to provide different results for the user. These examples illustrate two concepts: 1) the ability to have compound motions which provide different results that the motions separately or sequentially, and (2) the ability to change states or attributes, such as graphics to text solely or in combination with single or compound motions, or with multiple inputs, such as verbal, touch, facial expressions, or bio-kinetically, all working together to give different results, or to provide the same results in different ways.

It must be recognized that the present invention while based on the use of sensed velocity, acceleration, and changes and rates of changes in these properties to effect control of real world objects and/or virtual objects, the present invention may also use other properties of the sensed motion in combination with sensed velocity, acceleration, and changes in these properties to effect control of real world and/or virtual objects, where the other properties include direction and change in direction of motion, where the motion has a constant velocity. For example, if the motion sensor(s) senses velocity, acceleration, changes in velocity, changes in acceleration, and/or combinations thereof that is used for primary control of the objects via motion of a primary sensed human, animal, part thereof, real world object under the control of a human or animal, or robots under control of the human or animal, then sensing motion of a second body part may be used to confirm primary selection protocols or may be used to fine tune the selected command and control function. Thus, if the selection is for a group of objects, then the secondary motion properties may be used to differentially control object attributes to achieve a desired final state of the objects.

For example, suppose the apparatuses of this invention control lighting in a building. There are banks of lights on or in all four walls (recessed or mounted) and on or in the ceiling (recessed or mounted). The user has already selected and activated lights from a selection menu using motion to activate the apparatus and motion to select and activate the lights from a list of selectable menu items such as sound system, lights, cameras, video system, etc. Now that lights has been selected from the menu, movement to the right would select and activate the lights on the right wall. Movement straight down would turn all of the lights of the right wall down—dim the lights. Movement straight up would turn all of the lights on the right wall up—brighten. The velocity of the movement down or up would control the rate that the lights were dimmed or brighten. Stopping movement would stop the adjustment or removing the body, body part or object under the user control within the motion sensing area would stop the adjustment.

For even more sophisticated control using motion properties, the user may move within the motion sensor active area to map out a downward concave arc, which would cause the lights on the right wall to dim proportionally to the arc distance from the lights. Thus, the right lights would be more dimmed in the center of the wall and less dimmed toward the ends of the wall.

Alternatively, if the movement was convex downward, then the light would dim with the center being dimmed the least and the ends the most. Concave up and convex up would cause differential brightening of the lights in accord with the nature of the curve.

Now, the apparatus may also use the velocity of the movement of the mapping out the concave or convex movement to further change the dimming or brightening of the lights. Using velocity, starting off slowly and increasing speed in a downward motion would cause the lights on the wall to be dimmed more as the motion moved down. Thus, the lights at one end of the wall would be dimmed less than the lights at the other end of the wall.

Now, suppose that the motion is a S-shape, then the light would be dimmed or brightened in a S-shaped configuration. Again, velocity may be used to change the amount of dimming or brightening in different lights simply by changing the velocity of movement. Thus, by slowing the movement, those lights would be dimmed or brightened less than when the movement is speed up. By changing the rate of velocity—acceleration—further refinements of the lighting configuration may be obtained.

Now suppose that all the lights in the room have been selected, then circular or spiral motion would permit the user to adjust all of the lights, with direction, velocity and acceleration properties being used to dim and/or brighten all the lights in accord with the movement relative to the lights in the room. For the ceiling lights, the circular motion may move up or down in the z direction to affect the luminosity of the ceiling lights. Thus, through the sensing of motion or movement within an active sensor zone—area and especially volume, a user can use simple or complex motion to differentially control large numbers of devices simultaneously.

This differential control through the use of sensed complex motion permits a user to nearly instantaneously change lighting configurations, sound configurations, TV configurations, or any configuration of systems having a plurality of devices being simultaneously controlled or of a single system having a plurality of objects or attributes capable of simultaneous control. For examples, in a computer game including large numbers of virtual objects such as troops, tanks, airplanes, etc., sensed complex motion would permit the user to quickly deploy, redeploy, rearrangement, manipulated and generally quickly reconfigure all controllable objects and/or attributes by simply conforming the movement of the objects to the movement of the user sensed by the motion detector. This same differential device and/or object control would find utility in military and law enforcement, where command personnel by motion or movement within a sensing zone of a motion sensor quickly deploy, redeploy, rearrangement, manipulated and generally quickly reconfigure all assets to address a rapidly changing situation.

Embodiments of systems of this invention include a motion sensor or sensor array, where each sensor includes an active zone and where each sensor senses movement, movement direction, movement velocity, and/or movement acceleration, and/or changes in movement direction, changes in movement velocity, and/or changes in movement acceleration, and/or changes in a rate of a change in direction, changes in a rate of a change in velocity and/or changes in a rate of a change in acceleration within the active zone by one or a plurality of body parts or objects and produces an output signal. The systems also include at least one processing unit including communication software and hardware, where the processing units convert the output signal or signals from the motion sensor or sensors into command and control functions, and one or a plurality of real objects and/or virtual objects in communication with the processing units. The command and control functions comprise at least (1) a scroll function or a plurality of scroll functions, (2) a select function or a plurality of select functions, (3) an attribute function or plurality of attribute functions, (4) an attribute control function or a plurality of attribute control functions, or (5) a simultaneous control function. The simultaneous control function includes (a) a select function or a plurality of select functions and a scroll function or a plurality of scroll functions, (b) a select function or a plurality of select functions and an activate function or a plurality of activate functions, and (c) a select function or a plurality of select functions and an attribute control function or a plurality of attribute control functions. The processing unit or units (1) processes a scroll function or a plurality of scroll functions, (2) selects and processes a scroll function or a plurality of scroll functions, (3) selects and activates an object or a plurality of objects in communication with the processing unit, or (4) selects and activates an attribute or a plurality of attributes associated with an object or a plurality of objects in communication with the processing unit or units, or any combination thereof. The objects comprise electrical devices, electrical systems, sensors, hardware devices, hardware systems, environmental devices and systems, energy and energy distribution devices and systems, software systems, software programs, software objects, or combinations thereof. The attributes comprise adjustable attributes associated with the devices, systems, programs and/or objects. In certain embodiments, the sensor(s) is(are) capable of discerning a change in movement, velocity and/or acceleration of ±5%. In other embodiments, the sensor(s) is(are) capable of discerning a change in movement, velocity and/or acceleration of ±10°. In other embodiments, the system further comprising a remote control unit or remote control system in communication with the processing unit to provide remote control of the processing unit and all real and/or virtual objects under the control of the processing unit. In other embodiments, the motion sensor is selected from the group consisting of digital cameras, optical scanners, optical roller ball devices, touch pads, inductive pads, capacitive pads, holographic devices, laser tracking devices, thermal devices, touch or touchless sensors, acoustic devices, and any other device capable of sensing motion, arrays of such devices, and mixtures and combinations thereof. In other embodiments, the objects include environmental controls, lighting devices, cameras, ovens, dishwashers, stoves, sound systems, display systems, alarm systems, control systems, medical devices, robots, robotic control systems, hot and cold water supply devices, air conditioning systems, heating systems, ventilation systems, air handling systems, computers and computer systems, chemical or manufacturing plant control systems, computer operating systems and other software systems, remote control systems, mobile devices, electrical systems, sensors, hardware devices, hardware systems, environmental devices and systems, energy and energy distribution devices and systems, software programs or objects or mixtures and combinations thereof.

Embodiments of methods of this invention for controlling objects include the step of sensing movement, movement direction, movement velocity, and/or movement acceleration, and/or changes in movement direction, changes in movement velocity, and/or changes in movement acceleration, and/or changes in a rate of a change in direction, changes in a rate of a change in velocity and/or changes in a rate of a change in acceleration within the active zone by one or a plurality of body parts or objects within an active sensing zone of a motion sensor or within active sensing zones of an array of motion sensors. The methods also include the step of producing an output signal or a plurality of output signals from the sensor or sensors and converting the output signal or signals into a command function or a plurality of command functions. The command and control functions comprise at least (1) a scroll function or a plurality of scroll functions, (2) a select function or a plurality of select functions, (3) an attribute function or plurality of attribute functions, (4) an attribute control function or a plurality of attribute control functions, or (5) a simultaneous control function. The simultaneous control function includes (a) a select function or a plurality of select functions and a scroll function or a plurality of scroll functions, (b) a select function or a plurality of select functions and an activate function or a plurality of activate functions, and (c) a select function or a plurality of select functions and an attribute control function or a plurality of attribute control functions. In certain embodiments, the objects comprise electrical devices, electrical systems, sensors, hardware devices, hardware systems, environmental devices and systems, energy and energy distribution devices and systems, software systems, software programs, software objects, or combinations thereof. In other embodiments, the attributes comprise adjustable attributes associated with the devices, systems, programs and/or objects. In other embodiments, the timed hold is brief or the brief cessation of movement causing the attribute to be adjusted to a preset level, causing a selection to be made, causing a scroll function to be implemented, or a combination thereof. In other embodiments, the timed hold is continued causing the attribute to undergo a high value/low value cycle that ends when the hold is removed. In other embodiments, the timed hold causes an attribute value to change so that (1) if the attribute is at its maximum value, the timed hold causes the attribute value to decrease at a predetermined rate, until the timed hold is removed, (2) if the attribute value is at its minimum value, then the timed hold causes the attribute value to increase at a predetermined rate, until the timed hold is removed, (3) if the attribute value is not the maximum or minimum value, then the timed hold causes randomly selects the rate and direction of attribute value change or changes the attribute to allow maximum control, or (4) the timed hold causes a continuous change in the attribute value or scroll function in a direction of the initial motion until the timed hold is removed. In other embodiments, the motion sensor is selected from the group consisting of sensors of any kind including digital cameras, optical scanners, optical roller ball devices, touch pads, inductive pads, capacitive pads, holographic devices, laser tracking devices, thermal devices, touch or touchless sensors, acoustic devices, and any other device capable of sensing motion or changes in any waveform due to motion or arrays of such devices, and mixtures and combinations thereof. In other embodiments, the objects include lighting devices, cameras, ovens, dishwashers, stoves, sound systems, display systems, alarm systems, control systems, medical devices, robots, robotic control systems, hot and cold water supply devices, air conditioning systems, heating systems, ventilation systems, air handling systems, computers and computer systems, chemical plant control systems, computer operating systems and other software systems, remote control systems, sensors, or mixtures and combinations thereof.

The all of these scenarios set forth above are designed to illustrate the control of a large number of devices using properties and/or characteristics of the sensed motion including, without limitation, relative distance of the motion for each object (real like a person in a room using his/her hand as the object for which motion is being sensed or virtual representations of the objects in a virtual or rendered room on a display apparatus), direction of motion, speed of motion, acceleration of motion, changes an any of these properties, rates of changes in any of these properties, or mixtures and combinations thereof to control a single controllable attribute of the object such as lights. However, the systems, apparatuses, and methods of this invention are also capable of using motion properties and/or characteristics to control two, three, or more attributes of an object. Additionally, the systems, apparatuses, and methods of this invention are also capable of using motion properties and/or characteristics from a plurality of moving objects within a motion sensing zone to control different attributes of a collection of objects. For example, if the lights in the above figures are capable of color as well as brighten, then the motion properties and/or characteristic may be used to simultaneously change color and intensity of the lights or one sensed motion could control intensity, while another sensed motion could control color. For example, if an artist wanted to paint a picture on a computer generated canvas, then motion properties and/or characteristic would allow the artist to control the pixel properties of each pixel on the display using the properties of the sensed motion from one, two, three, etc. sensed motions. Thus, the the systems, apparatuses, and methods of this invention are capable of converting the motion properties associated with each and every object being controlled based on the instantaneous properties values as the motion traverse the object in real space or virtual space.

The systems, apparatuses and methods of this invention activate upon motion being sensed by one or more motion sensors. This sensed motion then activates the systems and apparatuses causing the systems and apparatuses to process the motion and its properties activating a selection object and a plurality of selectable objects. Once activated, the motion properties cause movement of the selection object accordingly, which will cause a pre-selected object or a group of pre-selected objects, to move toward the selection object, where the pre-selected object or the group of preselected objects are the selectable object(s) that are most closely aligned with the direction of motion, which may be evidenced by the user feedback units by corresponding motion of the selection object. Another aspect of the systems or apparatuses of this invention is that the faster the selection object moves toward the pre-selected object or the group of preselected objects, the faster the pre-selected object or the group of preselected objects move toward the selection object. Another aspect of the systems or apparatuses of this invention is that as the pre-selected object or the group of pre-selected objects move toward the selection object, the pre-selected object or the group of pre-selected objects may increase in size, change color, become highlighted, provide other forms of feedback, or a combination thereof. Another aspect of the systems or apparatuses of this invention is that movement away from the objects or groups of objects may result in the objects moving away at a greater or accelerated speed from the selection object(s). Another aspect of the systems or apparatuses of this invention is that as motion continues, the motion will start to discriminate between members of the group of pre-selected object(s) until the motion results in the selection of a single selectable object or a coupled group of selectable objects. Once the selection object and the target selectable object touch, active areas surrounding the objection touch, a threshold distance between the object is achieved, or a probability of selection exceeds an activation threshold, the target object is selected and non-selected display objects are removed from the display, change color or shape, or fade away or any such attribute so as to recognize them as not selected. The systems or apparatuses of this invention may center the selected object in a center of the user feedback unit or center the selected object at or near a location where the motion was first sensed. The selected object may be in a corner of a display—on the side the thumb is on when using a phone, and the next level menu is displayed slightly further away, from the selected object, possibly arcuately, so the next motion is close to the first, usually working the user back and forth in the general area of the center of the display. If the object is an executable object such as taking a photo, turning on a device, etc., then the execution is simultaneous with selection. If the object is a submenu, sublist or list of attributes associated with the selected object, then the submenu members, sublist members or attributes are displayed on the screen in a spaced apart format. The same procedure used to select the selected object is then used to select a member of the submenu, sublist or attribute list. Thus, the interfaces have a gravity like or anti-gravity like action on display objects. As the selection object(s) moves, it attracts an object or objects in alignment with the direction of the selection object's motion pulling those object(s) toward it and may simultaneously or sequentially repel non-selected items away or indicate non-selection in any other manner so as to discriminate between selected and non-selected objects As motion continues, the pull increases on the object most aligned with the direction of motion, further accelerating the object toward the selection object until they touch or merge or reach a threshold distance determined as an activation threshold. The touch or merge or threshold value being reached causes the processing unit to select and activate the object(s). Additionally, the sensed motion may be one or more motions detected by one or more movements within the active zones of the motion sensor(s) giving rise to multiple sensed motions and multiple command function that may be invoked simultaneously or sequentially. The sensors may be arrayed to form sensor arrays. If the object is an executable object such as taking a photo, turning on a device, etc., then the execution is simultaneous with selection. If the object is a submenu, sublist or list of attributes associated with the selected object, then the submenu members, sublist members or attributes are displayed on the screen is a spaced apart format. The same procedure used to select the selected object is then used to select a member of the submenu, sublist or attribute list. Thus, the interfaces have a gravity like action on display objects. As the selection object moves, it attracts an object or objects in alignment with the direction of the selection object's motion pulling those object toward it. As motion continues, the pull increases on the object most aligned with the direction of motion, further accelerating the object toward the selection object until they touch or merge or reach a threshold distance determined as an activation threshold to make a selection. The touch, merge or threshold event causes the processing unit to select and activate the object.

The sensed motion may result not only in activation of the systems or apparatuses of this invention, but may be result in select, attribute control, activation, actuation, scroll or combination thereof.

Different haptic (tactile) or audio or other feedback may be used to indicate different choices to the user, and these may be variable in intensity as motions are made. For example, if the user moving through radial zones different objects may produce different buzzes or sounds, and the intensity or pitch may change while moving in that zone to indicate whether the object is in front of or behind the user.

Compound motions may also be used so as to provide different control function than the motions made separately or sequentially. This includes combination attributes and changes of both state and attribute, such as tilting the device to see graphics, graphics and text or text, along with changing scale based on the state of the objects, while providing other controls simultaneously or independently, such as scrolling, zooming in/out, or selecting while changing state. These features may also be used to control chemicals being added to a vessel, while simultaneously controlling the amount. These features may also be used to change between Windows 8 and Windows 7 with a tilt while moving icons or scrolling through programs at the same time.

Audible or other communication medium may be used to confirm object selection or in conjunction with motion so as to provide desired commands (multimodal) or to provide the same control commands in different ways.

The present systems, apparatuses, and methods may also include artificial intelligence components that learn from user motion characteristics, environment characteristics (e.g., motion sensor types, processing unit types, or other environment properties), controllable object environment, etc. to improve or anticipate object selection responses.

Embodiments of this invention further relate to systems for selecting and activating virtual or real objects and their controllable attributes including at least one motion sensor having an active sensing zone, at least one processing unit, at least one power supply unit, and one object or a plurality of objects under the control of the processing units. The sensors, processing units, and power supply units are in electrical communication with each other. The motion sensors sense motion including motion properties within the active zones, generate at least one output signal, and send the output signals to the processing units. The processing units convert the output signals into at least one command function. The command functions include (1) a start function, (2) a scroll function, (3) a select function, (4) an attribute function, (5) an attribute control function, (6) a simultaneous control function including: (a) a select and scroll function, (b) a select, scroll and activate function, (c) a select, scroll, activate, and attribute control function, (d) a select and activate function, (e) a select and attribute control function, (f) a select, active, and attribute control function, or (g) combinations thereof, or (7) combinations thereof. The start functions activate at least one selection or cursor object and a plurality of selectable objects upon first sensing motion by the motion sensors and selectable objects aligned with the motion direction move toward the selection object or become differentiated from non-aligned selectable objects and motion continues until a target selectable object or a plurality of target selectable objects are discriminated from non-target selectable objects resulting in activation of the target object or objects. The motion properties include a touch, a lift off, a direction, a velocity, an acceleration, a change in direction, a change in velocity, a change in acceleration, a rate of change of direction, a rate of change of velocity, a rate of change of acceleration, stops, holds, timed holds, or mixtures and combinations thereof. The objects comprise real world objects, virtual objects and mixtures or combinations thereof, where the real world objects include physical, mechanical, electro-mechanical, magnetic, electro-magnetic, electrical, or electronic devices or any other real world device that can be controlled by a processing unit and the virtual objects include any construct generated in a virtual world or by a computer and displayed by a display device and that are capable of being controlled by a processing unit. The attributes comprise activatable, executable and/or adjustable attributes associated with the objects. The changes in motion properties are changes discernible by the motion sensors and/or the processing units.

In certain embodiments, the start functions further activate the user feedback units and the selection objects and the selectable objects are discernible via the motion sensors in response to movement of an animal, human, robot, robotic system, part or parts thereof, or combinations thereof within the motion sensor active zones. In other embodiments, the system further includes at least on user feedback unit, at least one battery backup unit, communication hardware and software, at least one remote control unit, or mixtures and combinations thereof, where the sensors, processing units, power supply units, the user feedback units, the battery backup units, the remote control units are in electrical communication with each other. In other embodiments, faster motion causes a faster movement of the target object or objects toward the selection object or causes a greater differentiation of the target object or object from the non-target object or objects. In other embodiments, if the activated objects or objects have subobjects and/or attributes associated therewith, then as the objects move toward the selection object, the subobjects and/or attributes appear and become more discernible as object selection becomes more certain. In other embodiments, once the target object or objects have been selected, then further motion within the active zones of the motion sensors causes selectable subobjects or selectable attributes aligned with the motion direction to move towards the selection object(s) or become differentiated from non-aligned selectable subobjects or selectable attributes and motion continues until a target selectable subobject or attribute or a plurality of target selectable objects and/or attributes are discriminated from non-target selectable subobjects and/or attributes resulting in activation of the target subobject, attribute, subobjects, or attributes. In other embodiments, the motion sensor is selected from the group consisting of digital cameras, optical scanners, optical roller ball devices, touch pads, inductive pads, capacitive pads, holographic devices, laser tracking devices, thermal devices, acoustic devices, any other device capable of sensing motion, arrays of motion sensors, and mixtures or combinations thereof. In other embodiments, the objects include lighting devices, cameras, ovens, dishwashers, stoves, sound systems, display systems, alarm systems, control systems, medical devices, robots, robotic control systems, hot and cold water supply devices, air conditioning systems, heating systems, ventilation systems, air handling systems, computers and computer systems, chemical plant control systems, computer operating systems, systems, graphics systems, business software systems, word processor systems, internet browsers, accounting systems, military systems, control systems, other software systems, programs, routines, objects and/or elements, remote control systems, or mixtures and combinations thereof. In other embodiments, if the timed hold is brief, then the processing unit causes an attribute to be adjusted to a preset level. In other embodiments, if the timed hold is continued, then the processing unit causes an attribute to undergo a high value/low value cycle that ends when the hold is removed. In other embodiments, the timed hold causes an attribute value to change so that (1) if the attribute is at its maximum value, the timed hold causes the attribute value to decrease at a predetermined rate, until the timed hold is removed, (2) if the attribute value is at its minimum value, then the timed hold causes the attribute value to increase at a predetermined rate, until the timed hold is removed, (3) if the attribute value is not the maximum or minimum value, then the timed hold causes randomly selects the rate and direction of attribute value change or changes the attribute to allow maximum control, or (4) the timed hold causes a continuous change in the attribute value in a direction of the initial motion until the timed hold is removed. In other embodiments, the motion sensors sense a second motion including second motion properties within the active zones, generate at least one output signal, and send the output signals to the processing units, and the processing units convert the output signals into a confirmation command confirming the selection or at least one second command function for controlling different objects or different object attributes. In other embodiments, the motion sensors sense motions including motion properties of two or more animals, humans, robots, or parts thereof, or objects under the control of humans, animals, and/or robots within the active zones, generate output signals corresponding to the motions, and send the output signals to the processing units, and the processing units convert the output signals into command function or confirmation commands or combinations thereof implemented simultaneously or sequentially, where the start functions activate a plurality of selection or cursor objects and a plurality of selectable objects upon first sensing motion by the motion sensor and selectable objects aligned with the motion directions move toward the selection objects or become differentiated from non-aligned selectable objects and the motions continue until target selectable objects or pluralities of target selectable objects are discriminated from non-target selectable objects resulting in activation of the target objects and the confirmation commands confirm the selections.

Embodiments of this invention further relates to methods for controlling objects include sensing motion including motion properties within an active sensing zone of at least one motion sensor, where the motion properties include a direction, a velocity, an acceleration, a change in direction, a change in velocity, a change in acceleration, a rate of change of direction, a rate of change of velocity, a rate of change of acceleration, stops, holds, timed holds, or mixtures and combinations thereof and producing an output signal or a plurality of output signals corresponding to the sensed motion. The methods also include converting the output signal or signals via a processing unit in communication with the motion sensors into a command function or a plurality of command functions. The command functions include (1) a start function, (2) a scroll function, (3) a select function, (4) an attribute function, (5) an attribute control function, (6) a simultaneous control function including: (a) a select and scroll function, (b) a select, scroll and activate function, (c) a select, scroll, activate, and attribute control function, (d) a select and activate function, (e) a select and attribute control function, (f) a select, active, and attribute control function, or (g) combinations thereof, or (7) combinations thereof. The methods also include processing the command function or the command functions simultaneously or sequentially, where the start functions activate at least one selection or cursor object and a plurality of selectable objects upon first sensing motion by the motion sensor and selectable objects aligned with the motion direction move toward the selection object or become differentiated from non-aligned selectable objects and motion continues until a target selectable object or a plurality of target selectable objects are discriminated from non-target selectable objects resulting in activation of the target object or objects, where the motion properties include a touch, a lift off, a direction, a velocity, an acceleration, a change in direction, a change in velocity, a change in acceleration, a rate of change of direction, a rate of change of velocity, a rate of change of acceleration, stops, holds, timed holds, or mixtures and combinations thereof. The objects comprise real world objects, virtual objects or mixtures and combinations thereof, where the real world objects include physical, mechanical, electro-mechanical, magnetic, electro-magnetic, electrical, or electronic devices or any other real world device that can be controlled by a processing unit and the virtual objects include any construct generated in a virtual world or by a computer and displayed by a display device and that are capable of being controlled by a processing unit. The attributes comprise activatable, executable and/or adjustable attributes associated with the objects. The changes in motion properties are changes discernible by the motion sensors and/or the processing units.

In certain embodiments, the motion sensor is selected from the group consisting of digital cameras, optical scanners, optical roller ball devices, touch pads, inductive pads, capacitive pads, holographic devices, laser tracking devices, thermal devices, acoustic devices, any other device capable of sensing motion, arrays of motion sensors, and mixtures or combinations thereof. In other embodiments, the objects include lighting devices, cameras, ovens, dishwashers, stoves, sound systems, display systems, alarm systems, control systems, medical devices, robots, robotic control systems, hot and cold water supply devices, air conditioning systems, heating systems, ventilation systems, air handling systems, computers and computer systems, chemical plant control systems, computer operating systems, systems, graphics systems, business software systems, word processor systems, internet browsers, accounting systems, military systems, control systems, other software systems, programs, routines, objects and/or elements, remote control systems, or mixtures and combinations thereof. In other embodiments, if the timed hold is brief, then the processing unit causes an attribute to be adjusted to a preset level. In other embodiments, if the timed hold is continued, then the processing unit causes an attribute to undergo a high value/low value cycle that ends when the hold is removed. In other embodiments, the timed hold causes an attribute value to change so that (1) if the attribute is at its maximum value, the timed hold causes the attribute value to decrease at a predetermined rate, until the timed hold is removed, (2) if the attribute value is at its minimum value, then the timed hold causes the attribute value to increase at a predetermined rate, until the timed hold is removed, (3) if the attribute value is not the maximum or minium value, then the timed hold causes randomly selects the rate and direction of attribute value change or changes the attribute to allow maximum control, or (4) the timed hold causes a continuous change in the attribute value in a direction of the initial motion until the timed hold is removed. In other embodiments, the methods include sensing second motion including second motion properties within the active sensing zone of the motion sensors, producing a second output signal or a plurality of second output signals corresponding to the second sensed motion, converting the second output signal or signals via the processing units in communication with the motion sensors into a second command function or a plurality of second command functions, and confirming the selection based on the second output signals, or processing the second command function or the second command functions and moving selectable objects aligned with the second motion direction toward the selection object or become differentiated from non-aligned selectable objects and motion continues until a second target selectable object or a plurality of second target selectable objects are discriminated from non-target second selectable objects resulting in activation of the second target object or objects, where the motion properties include a touch, a lift off, a direction, a velocity, an acceleration, a change in direction, a change in velocity, a change in acceleration, a rate of change of direction, a rate of change of velocity, a rate of change of acceleration, stops, holds, timed holds, or mixtures and combinations thereof. In other embodiments, the methods include sensing motions including motion properties of two or more animals, humans, robots, or parts thereof within the active zones of the motion sensors, producing output signals corresponding to the motions, converting the output signals into command function or confirmation commands or combinations thereof, where the start functions activate a plurality of selection or cursor objects and a plurality of selectable objects upon first sensing motion by the motion sensor and selectable objects aligned with the motion directions move toward the selection objects or become differentiated from non-aligned selectable objects and the motions continue until target selectable objects or pluralities of target selectable objects are discriminated from non-target selectable objects resulting in activation of the target objects and the confirmation commands confirm the selections.

Suitable Components for Use in the Invention

The motion sensors may also be used in conjunction with displays, keyboards, touch pads, touchless pads, sensors of any type, or other devices associated with a computer, a notebook computer or a drawing tablet or any mobile or stationary device. The motion sensors may be optical sensors, acoustic sensors, thermal sensors, optoacoustic sensors, any other sensor or combination of sensors that senses movement or changes in movement, or mixtures or combinations thereof. The sensors may be digital, analog or a combination of digital and analog. For camera systems, the systems may sense motion within a zone, area or volume in front of the lens. Optical sensors may operate in any region of the electromagnetic spectrum including, without limitation, RF, microwave, near IR, IR, far IR, visible, UV or mixtures or combinations thereof. Acoustic sensor may operate over the entire sonic range which includes the human audio range, animal audio ranges, or combinations thereof. EMF sensors may be used and operate in any region of a discernable wavelength or magnitude where motion can be discerned. Moreover, LCD screen(s) may be incorporated to identify which devices are chosen or the temperature setting, etc. Moreover, the interface may project a virtual control surface and sense motion within the projected image and invoke actions based on the sensed motion. The motion sensor associated with the interfaces of this invention can also be acoustic motion sensor using any acceptable region of the sound spectrum. A volume of a liquid or gas, where a user's body part or object under the control of a user may be immersed, may be used, where sensors associated with the liquid or gas can discern motion. Any sensor being able to discern differences in transverse, longitudinal, pulse, compression or any other waveform could be used to discern motion and any sensor measuring gravitational, magnetic, electro-magnetic, or electrical changes relating to motion or contact while moving (resistive and capacitive screens) could be used. Of course, the interfaces can include mixtures or combinations of any known or yet to be invented motion sensors.

Suitable electrical devices, hardware devices and/or appliances capable of being controlled by the control systems and/or switches of this invention, include, without limitation, any electrical and/or hardware device or appliance having attributes which can be controlled by a switch, a joy stick or similar type controller, or software program(s) and/or object(s) and/or objects and attributes, and/or attributes. Exemplary examples of such attributes include, without limitation, ON, OFF, intensity and/or amplitude, impedance, capacitance, inductance, software attributes, lists or submenus of software programs or objects, virtual and/or real objects in a display, mobile device or gaming system, or any other controllable electrical and/or electro-mechanical function and/or attribute of the device. Exemplary examples of electrical devices and/or appliances include, without limitation, environmental controls, building systems and controls, lighting devices such as indoor and/or outdoor lights or light fixtures, cameras, ovens (conventional, convection, microwave, and/or etc.), dishwashers, stoves, sound systems, mobile devices, display systems (TVs, VCRs, DVDs, cable boxes, satellite boxes, and/or etc.), alarm systems, control systems, energy management systems, medical devices, robots, robotic control systems, UAV, equipment and machinery control systems, hot and cold water supply devices, air conditioning system, heating systems, ventilation systems, air handling systems, security systems, computers and computer systems, chemical plant control systems, manufacturing plant control systems, satellite control systems, computer operating systems and other software systems, objects or programs, remote control systems, or the like or mixtures or combinations thereof.

Suitable systems that are amenable to control by the interface of this invention include, without limitation, any analog or digital processing unit or units having single or a plurality of software products installed thereon and where each software product has one or more adjustable attributes associated therewith, or singular software programs or systems with one or more adjustable attributes, menus, lists or other functions or display outputs. Exemplary examples of such software products include, without limitation, operating systems, graphics systems, business software systems, word processor systems, business systems, online merchandising, online merchandising systems, purchasing and business transaction systems, Kioks and educational or informational systems, databases, software programs and applications, internet browsers, accounting systems, inventory systems, inventory display systems, military systems, control systems, or the like, or mixtures or combinations thereof.

Suitable digital processing units (DPUs) include, without limitation, any digital processing unit capable of accepting input from a singular or plurality of devices or objects and converting at least some of the input into output designed to select and/or control attributes of one or more of the devices or objects. Exemplary examples of such DPUs include, without limitation, microprocessor, microcontrollers, or the like manufactured by Intel, Motorola, Ericsson, HP, Samsung, Hitachi, NRC, Applied Materials, AMD, Cyrix, Sun Microsystem, Philips, National Semiconductor, Via Electonics, Qualcomm, or any other manufacture of microprocessors or microcontrollers.

Suitable analog processing units (APUs) include, without limitation, any analog processing unit capable of accepting input from a singular or a plurality of devices or objects and converting at least some of the input into output designed to control attributes of one or more of the devices or objects. Such analog devices are available from manufacturers such as Analog Devices Inc.

Suitable motion sensing apparatus include, without limitation, motion sensors of any form such as digital cameras, optical scanners, optical roller ball devices, touch pads, inductive pads, capacitive pads, holographic devices, laser tracking devices, thermal devices, EMF sensors, wave form sensors, any other device capable of sensing motion, changes in EMF, changes in wave form, or the like or arrays of such devices or mixtures or combinations thereof.

DETAILED DESCRIPTION OF THE DRAWINGS

First Method and System Embodiments

Referring now to FIG. 1A, a display, generally 100, is shown to include a display area 102. The display area 102 is in a dormant state or a sleep state or an inactivate state. This state is changed only by movement of any body part within an active zone of a motion sensor or sensors. For motion sensors that are not touch activated such as camera, IR sensors, ultra sonic sensors, or any other type of motion sensor that is capable of detecting motion with in an active zone, motion may be any movement within the active zone of a user, a given user body part or a combination of user body parts or an object acting on behalf of or under the user's control. In the case of a touch screen, motion will be contact with and motion on the touch screen, i.e., touching, sliding, etc. or other active area of a device or object.

Figure 1C:
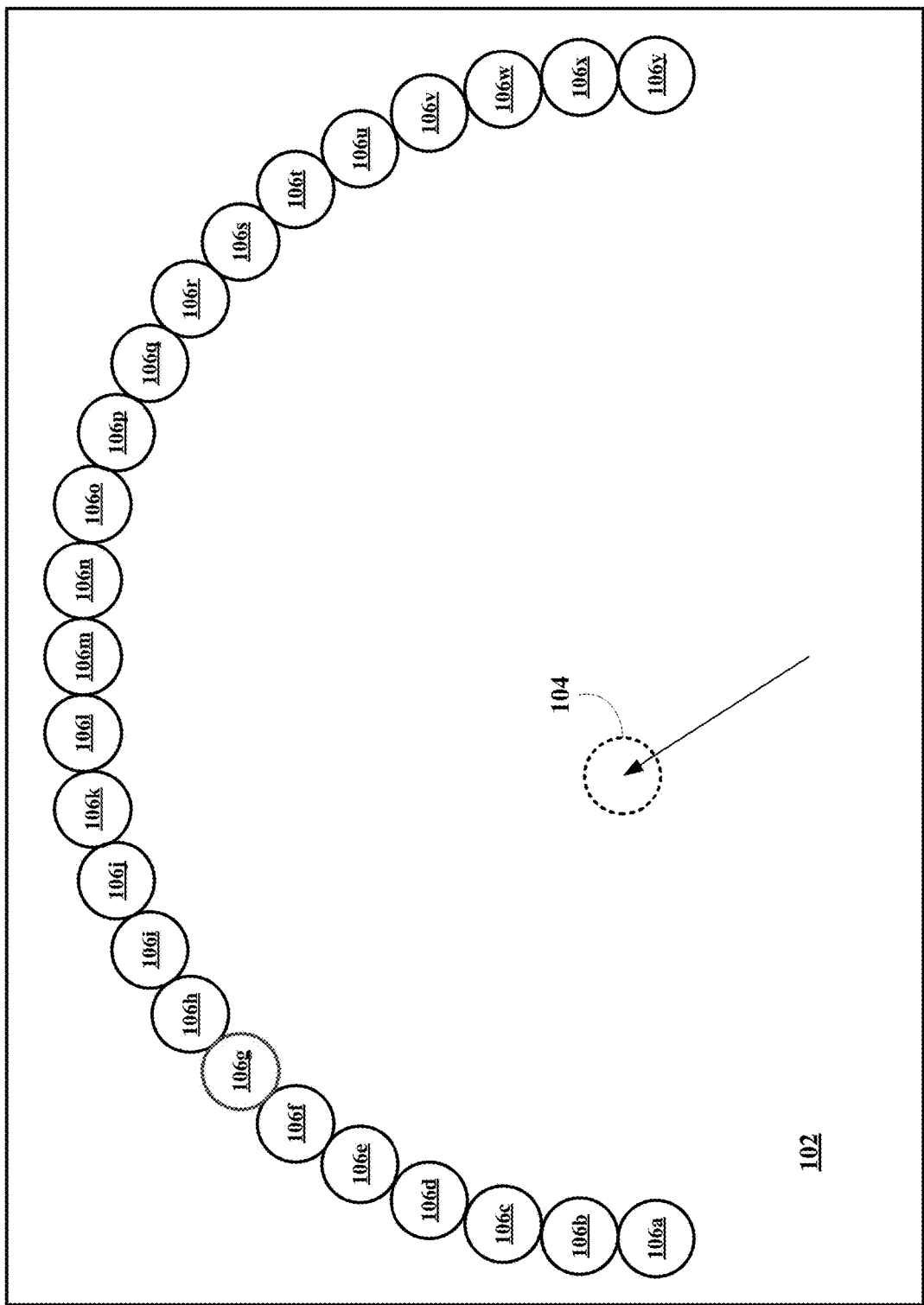
Figure 1D:
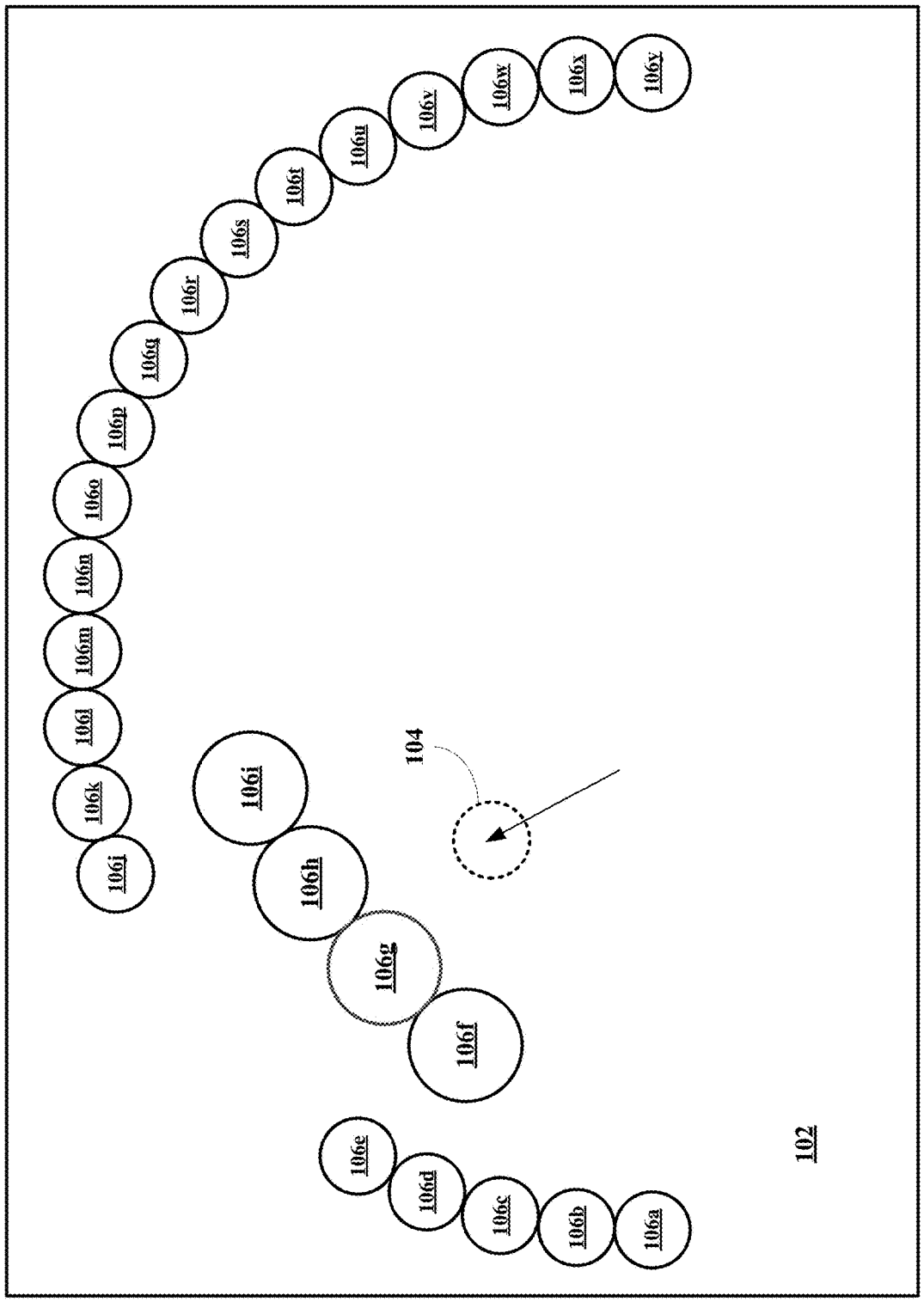
Figure 1E:
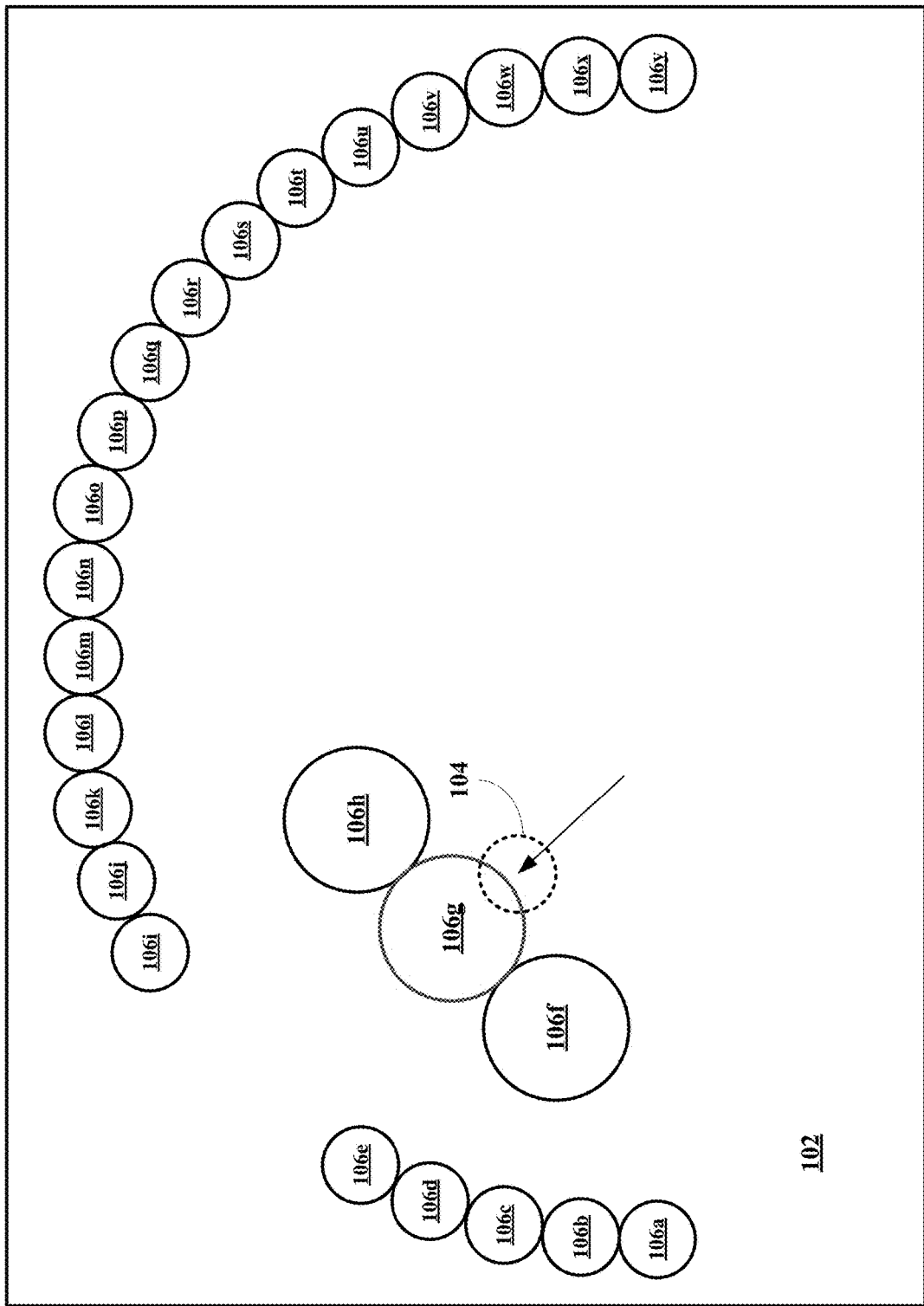
Figure 1F:
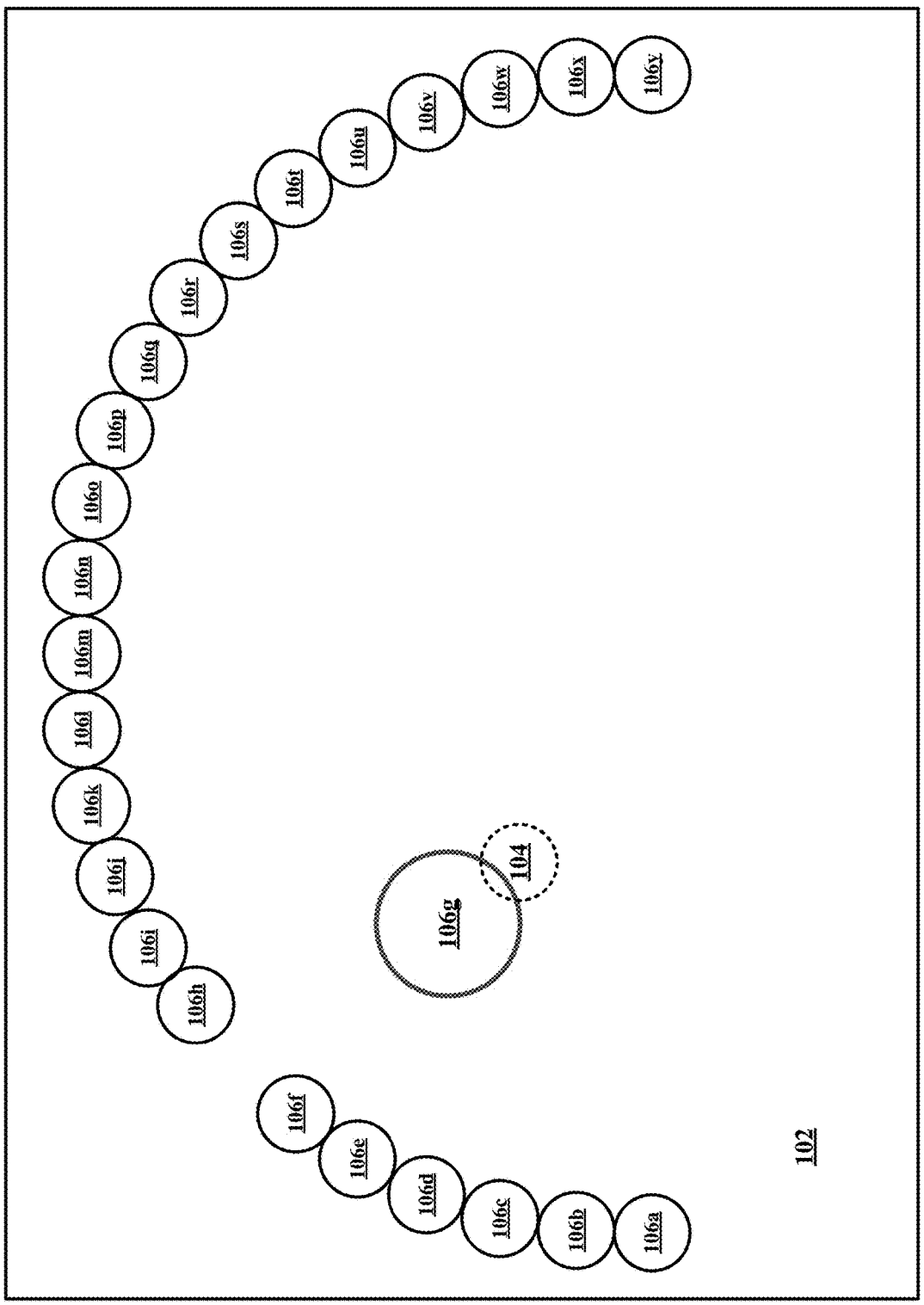
Figure 1H:
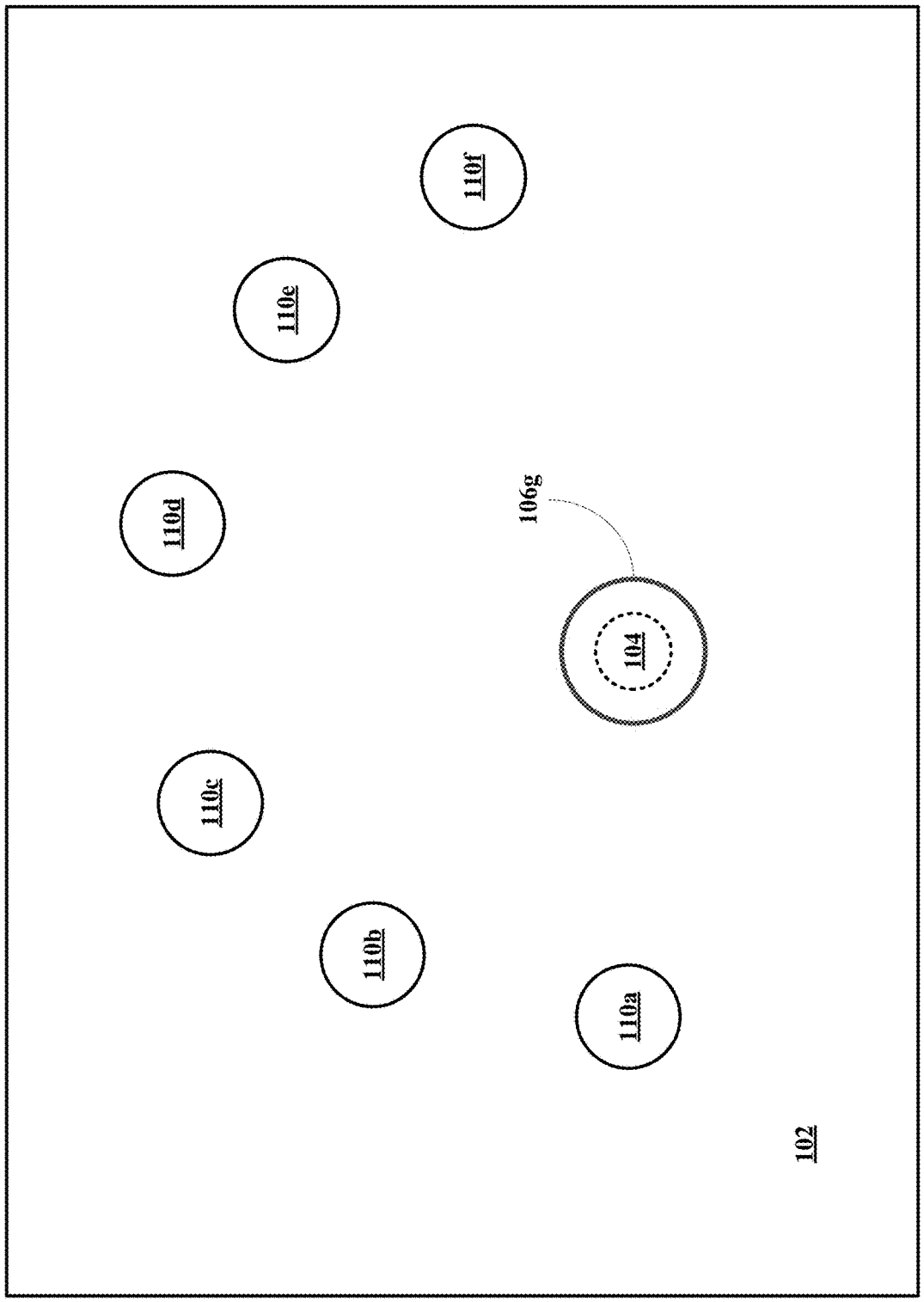

Referring now to FIG. 1B, once activated, the display area 102 displays a selection object 104 and a plurality of selectable objects 106a-y distributed about the selection object in an arc 108. Looking at FIG. 1C, the selection object 104 is moved upward and to the left. This motion will cause selectable objects 106 most aligned with the direction of motion to be drawn towards the selection object. Looking at FIG. 1D, four potential selection objects 106f-i move toward the selection object and increase in size. The faster the motion toward the potential selection object, the faster they may move toward the selection object and the faster they may increase in size. The motion presently is directed in a direction that is not conducive to determining the exact object to be selected. Looking at FIG. 1E, as motion continues, the possible selectable objects are resolved and objects such as object 106*i* is returned to its previous position. By moving the selection object 104 toward the selectable object 106*g* and bringing the selection object 104 into contact or into a threshold event with the selectable object 106*g*, the other objects 106*f* and 106*h* return to their original positions and 106*g* is highlighted in some way here shown in thicker lines as shown in FIG. 1F. Once the selection object 104 comes in contact or into a threshold event with the selectable object 106*g*, the selection object 104 merges into the selectable object 106*g*, all other selectable objects 106 are removed from the display area 102 and the merged selection object 104 and selected object 106*g* may be centered in the display area 102 as shown in FIG. 1G. If the selected object 106*g* includes subobjects, then the display area 102 will simultaneously center the selected object 106*g* and display the subobjects 110*a-f* distributed about the merged selection object 104 and selected object 106*g* as shown in FIG. 1H.

Figure 1I:
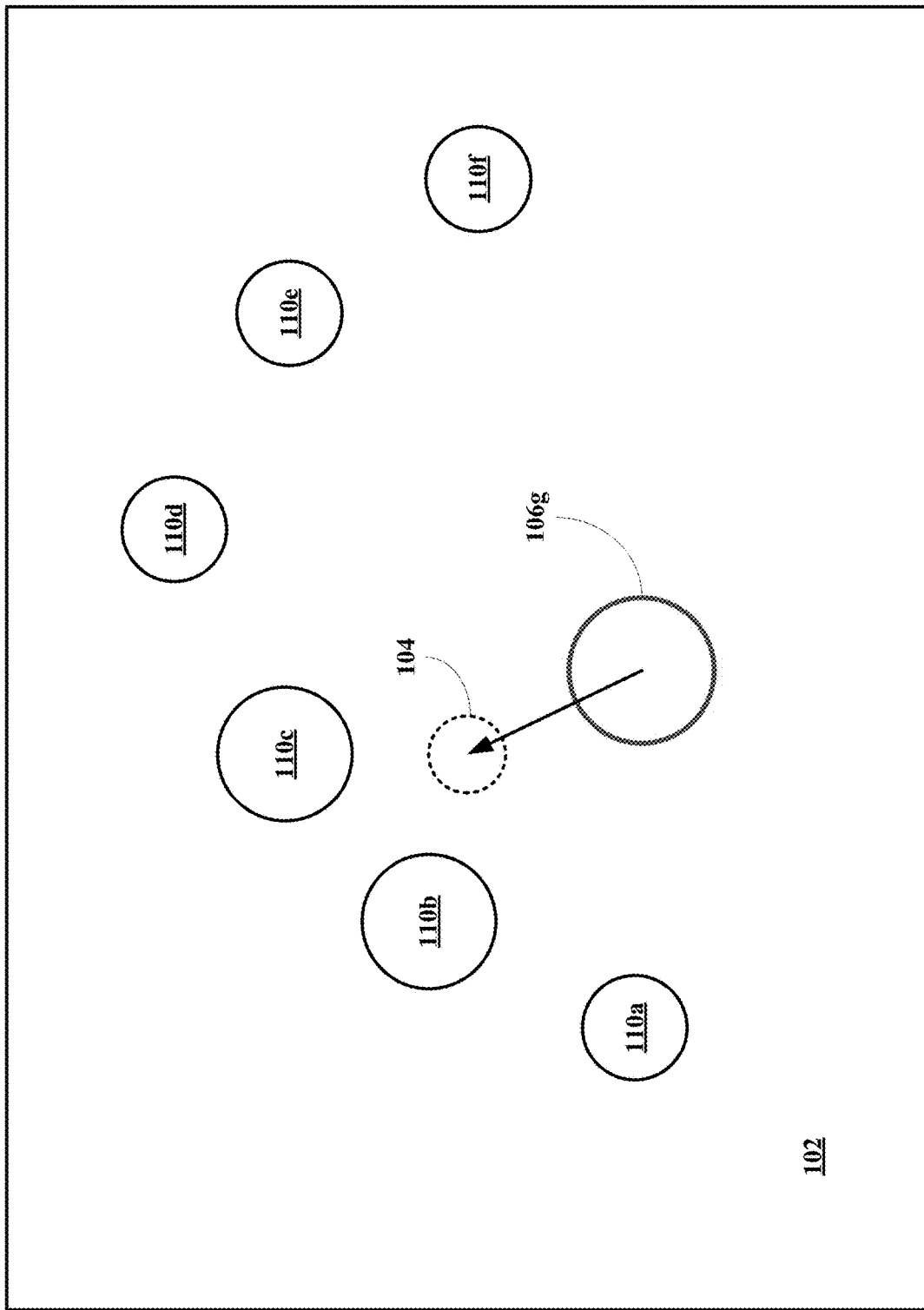
Figure 1J:
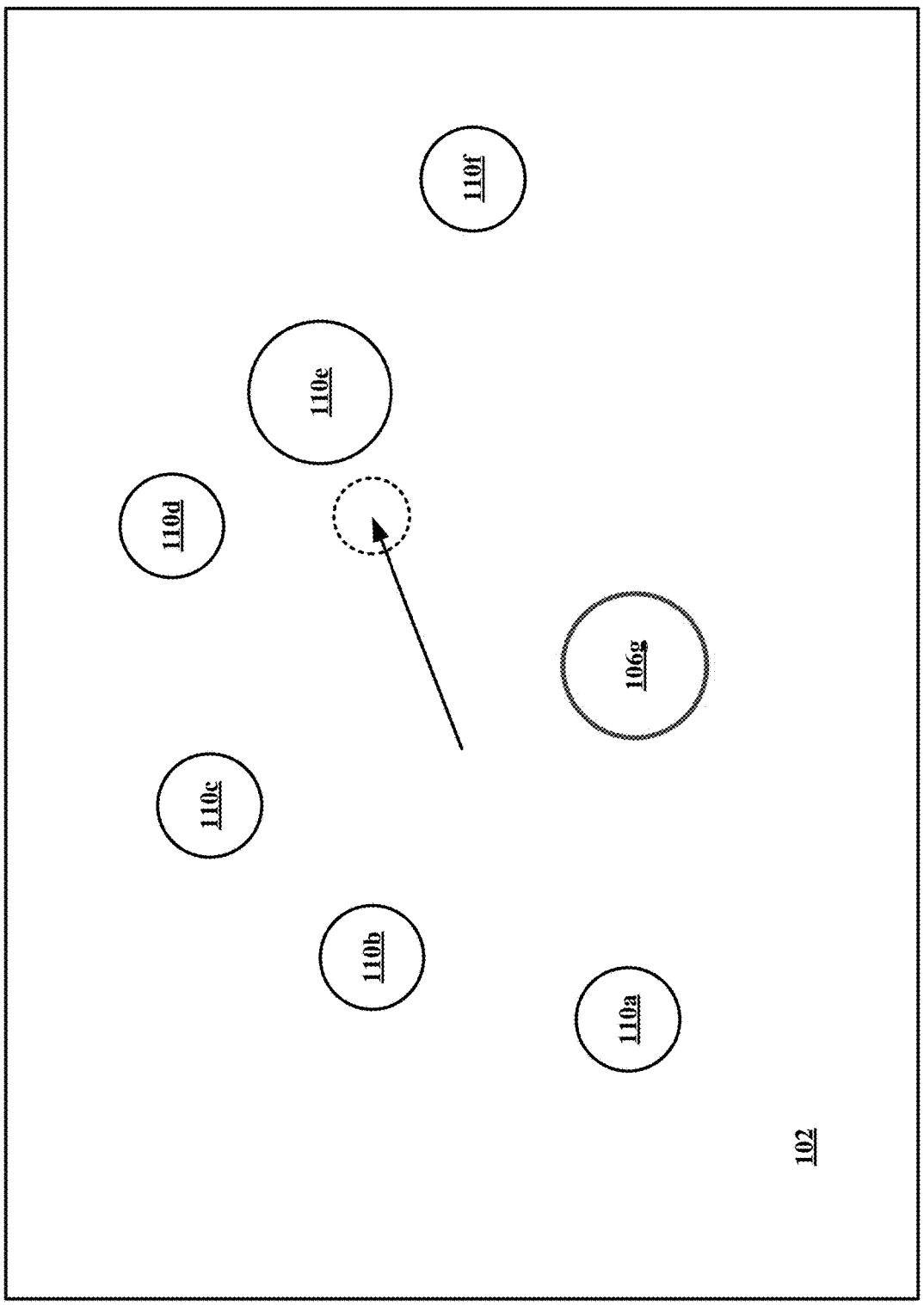
Figure 1K:
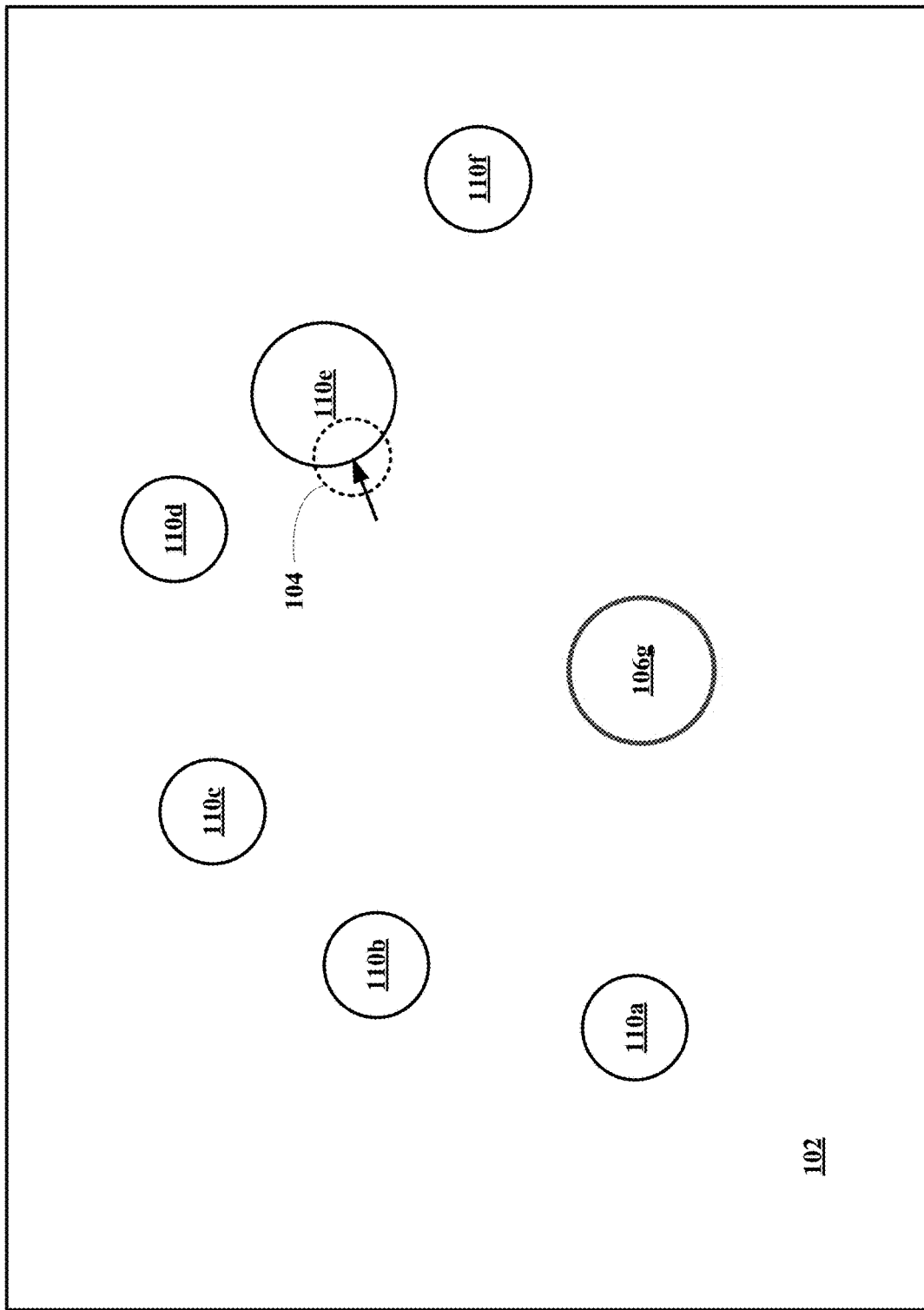
Figure 1L:
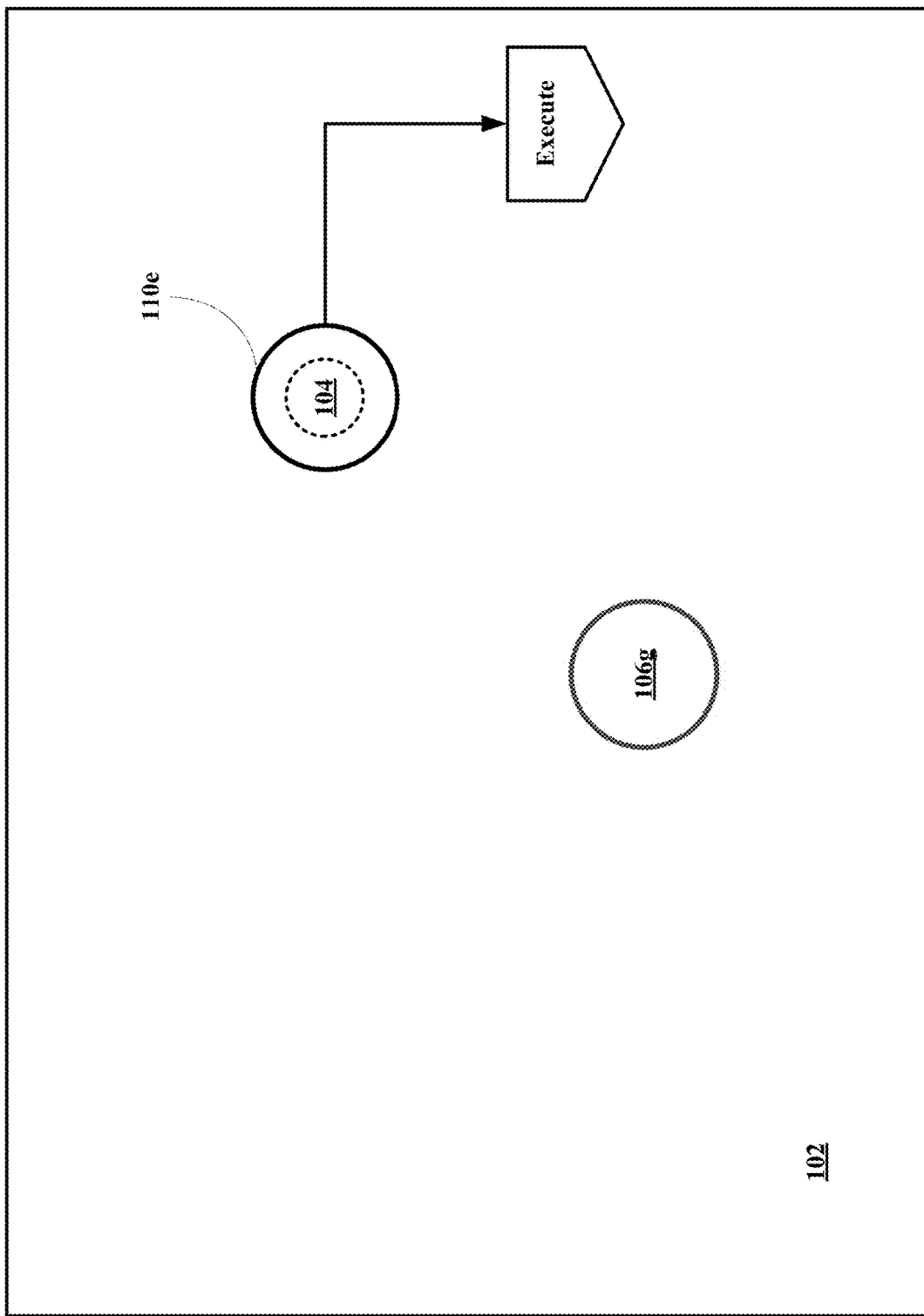

Referring now to FIG. 1I, the selection object 104 is moved out from the selected object 106*g* in a direction towards two possible subobjects 110*b-c*, which move toward the selection object 104 and may increase in size. Looking at FIG. 1J, the selection object 104 is moved away from the subobjects 110*b-c* toward the object 110*e*. Looking at FIG. 1K, the selection object 104 is moved into contact with the subobject 110*e*, which selects by merging the object 104 into the selected subobject 110*e* and activates the subobject 110*e* as shown in FIG. 1L. The subobject may also move into the position of the object if 104 moves and stops, allowing the subobject to do the rest of the motion.

Figure 1M:
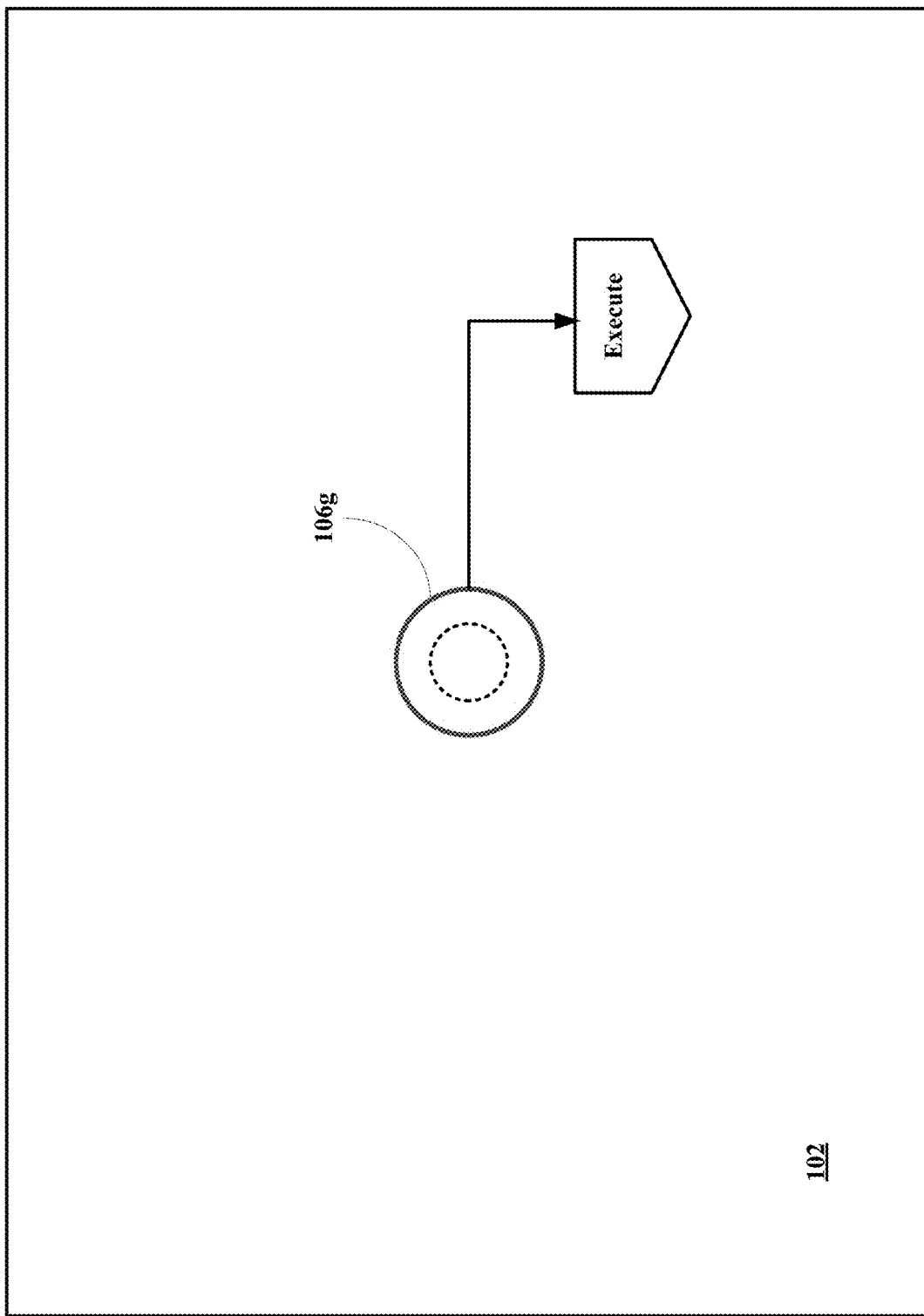

Referring now to FIG. 1M, if the selected object 106*g* is directly activatable, then selection of the selectable object 106*g* simultaneously activates the object 106*g*.

Second Method and System Embodiments

Figure 2B:
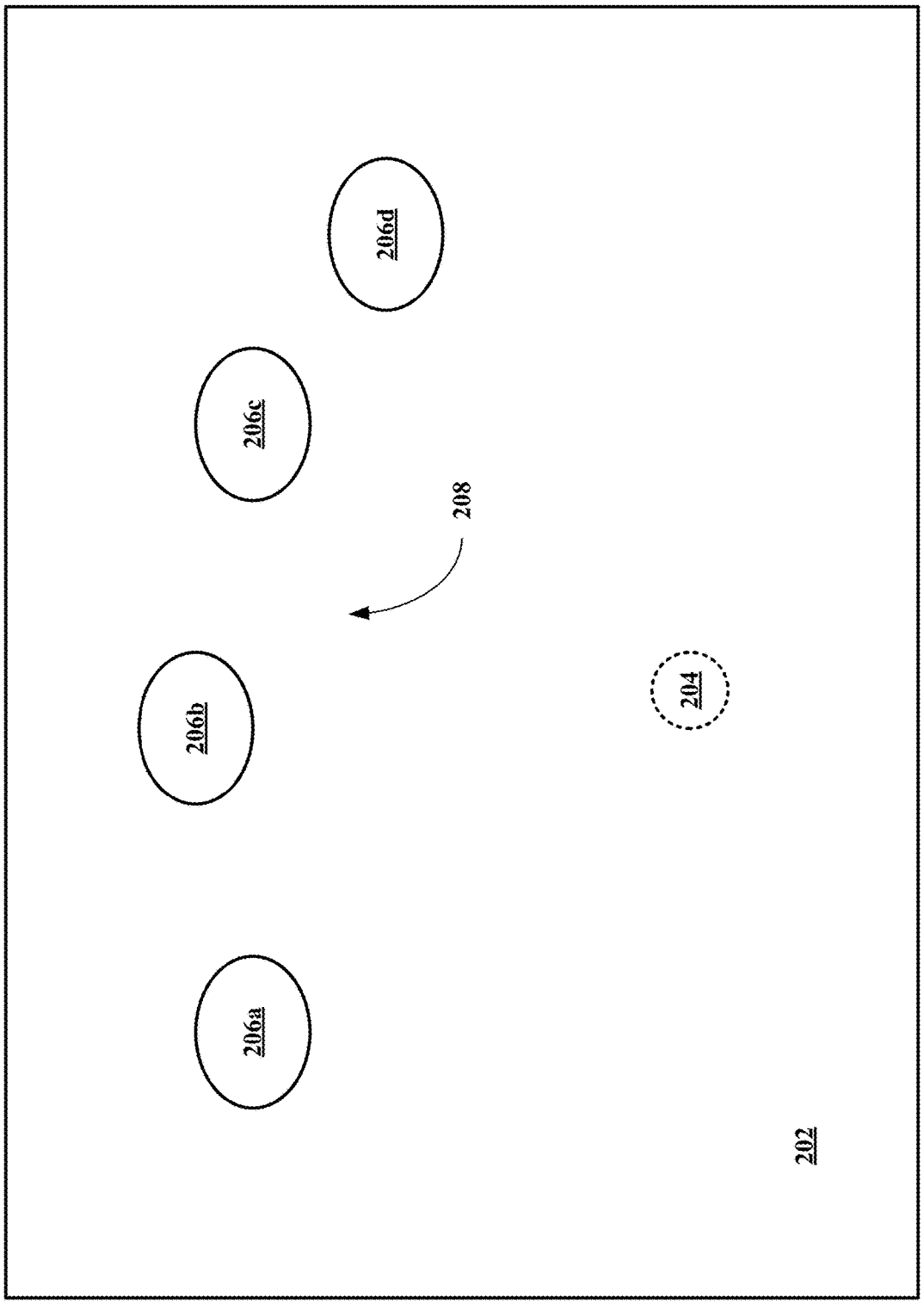
FIG. 2A-W depict another motion-based selection sequence using an attractive interface of this invention: (A) depicts a display prior to activation by motion of a motion sensor in communication with the display; (B) depicts the display after activation to display a selection object and a plurality of selectable objects; (C) depicts the display after the selection object is moved toward a selectable object causing it to move toward the selection objects and causing subobjects associated with the attracted object; (D) depicts the display showing further movement of the selection object and touching attracted object; (E) depicts the display showing the selection object touched by the selection object; (F) depicts the display showing the selection object merged with the selected object and recentered in the display; (G) depicts the display after the selection object is moved toward a first selectable subobject; (H) depicts the display merged with a selected subobject and simultaneous activation of the subobject; (I) depicts the display after the selection object is moved toward the other selectable subobject; (J) depicts the display merged with a selected subobject and simultaneous activation of the other subobject; (K) depicts the display with motion of the selection object away from the selected object and away from any subobjects; (L) depicts the display after moving away causing the original selection display to reappear; (M) depicts the display after the selection object is moved toward a second selectable subobject causing the second object to move toward and increase in size and simultaneously display associated subobjects; (N) depicts the display after movement of the selection object into contact with the second selectable object; (O) depicts the display after selection of the second selectable object now merged and centered with the subobjects distributed about the selected second object; (P) depicts the display after the selection object is moved toward a desired subobject; (Q) depicts the display after merger with the subobject simultaneously activating the subobject; (R) depicts the display after the selection object is moved toward a second selectable subobject causing the third object to move toward and increase in size and simultaneously display associated subobjects; (S) depicts the display after movement of the selection object into contact with the third selectable object; (T) depicts the display after selection of the third selectable object now merged and centered with the subobjects distributed about the selected third selectable object; (U) depicts the display after the selection object is moved toward a fourth selectable subobject causing the fourth object to move toward the selection object and increase in size; (V) depicts the display after movement of the selection object into contact with the fourth selectable object; and (W) depicts the display after selection of the fourth selectable object now merged and centered and the object activated.

Referring now to FIG. 2A, a display, generally 200, is shown to include a display area 202. The display area 202 is in a dormant state or a sleep state or an unactivated state. This state is changed only by motion within an active zone of a motion sensor. Motion may be any movement within the active zone. In the case of a touch screen, motion may be contact such as touching, sliding, etc. Looking at FIG. 2B, once activated, the display area 202 displays a selection object 204 and a plurality of selectable objects 206*a-d* distributed about the selection object in an arc 208.

Figure 2C:
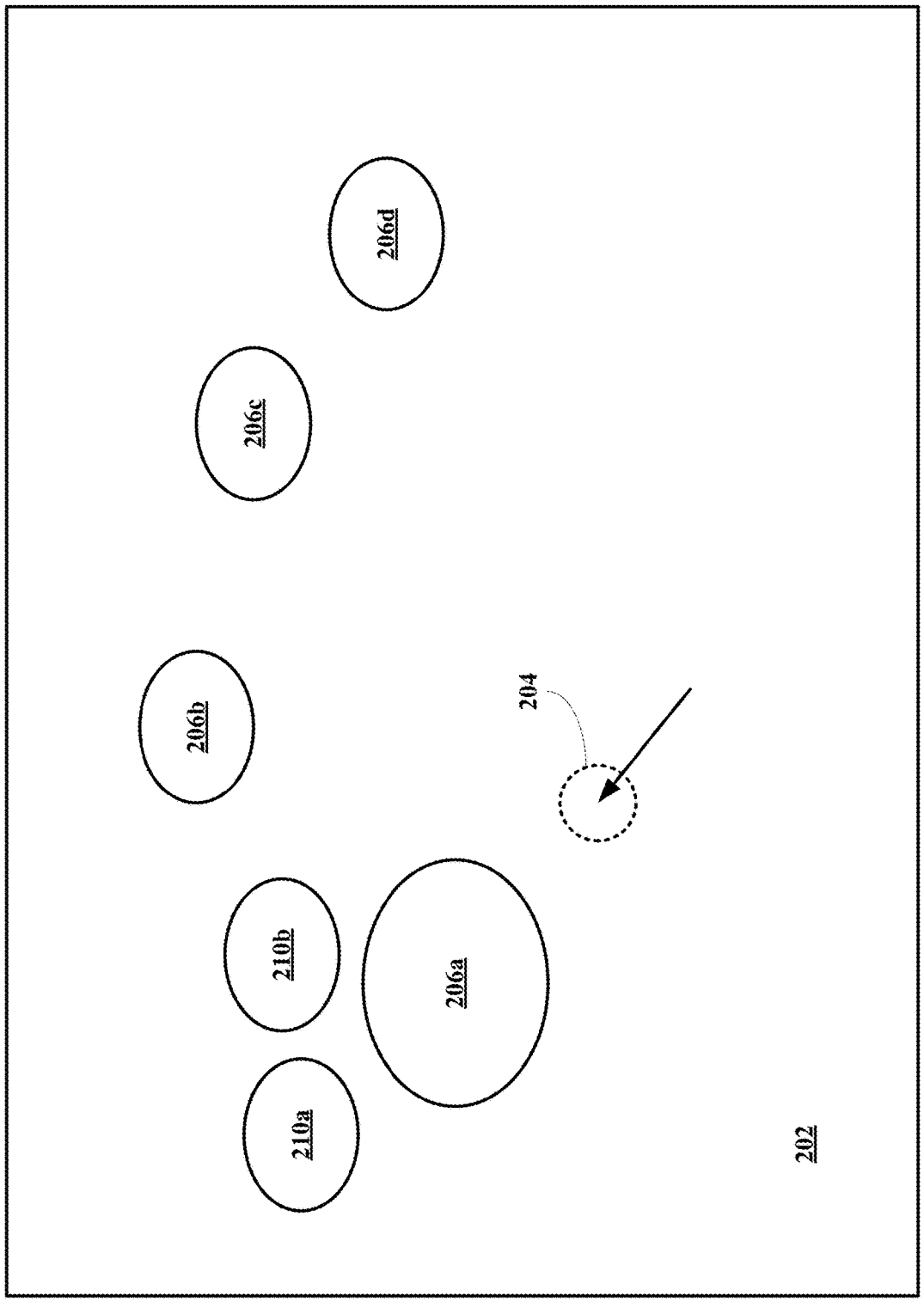
Figure 2D:
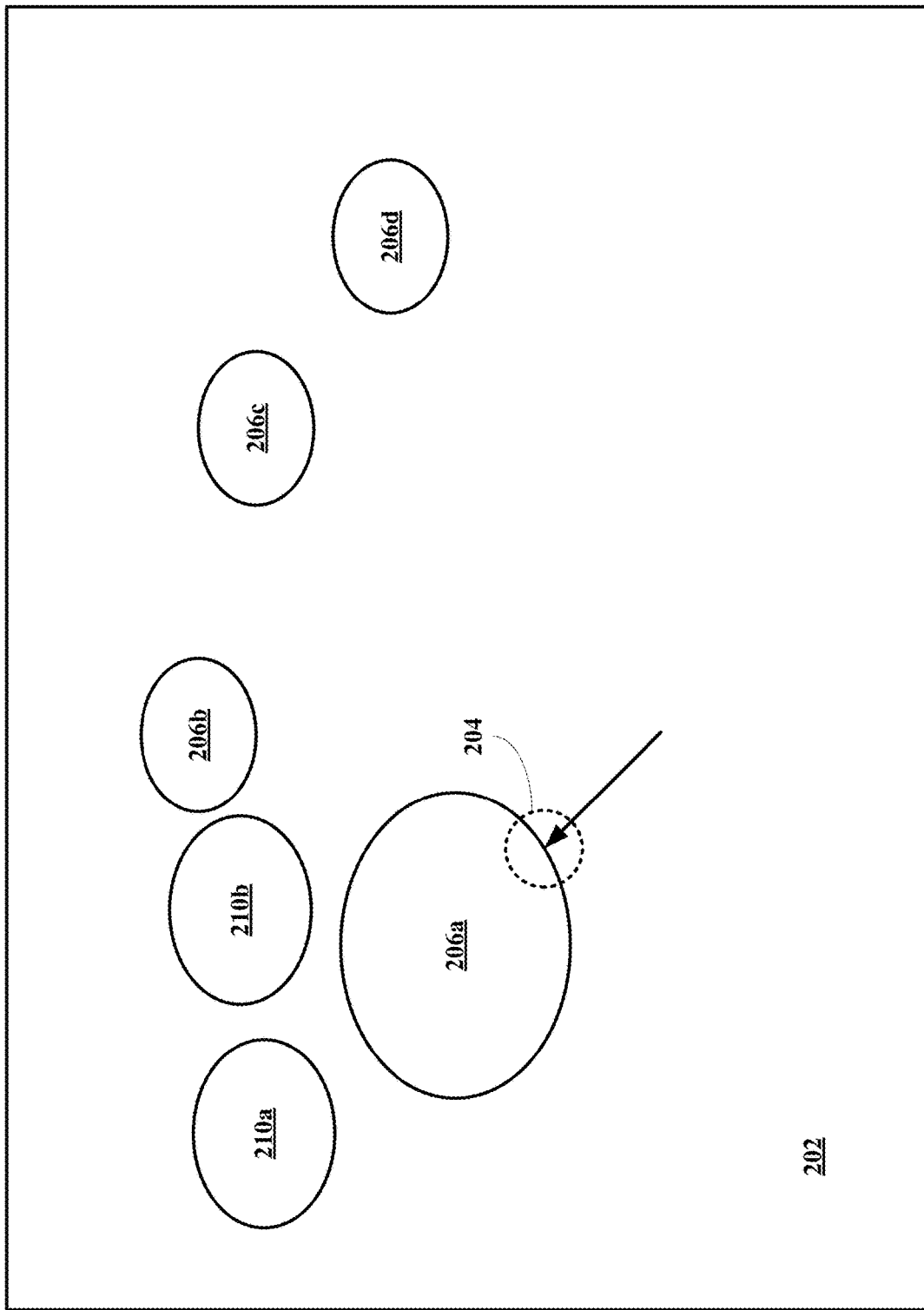
Figure 2E:
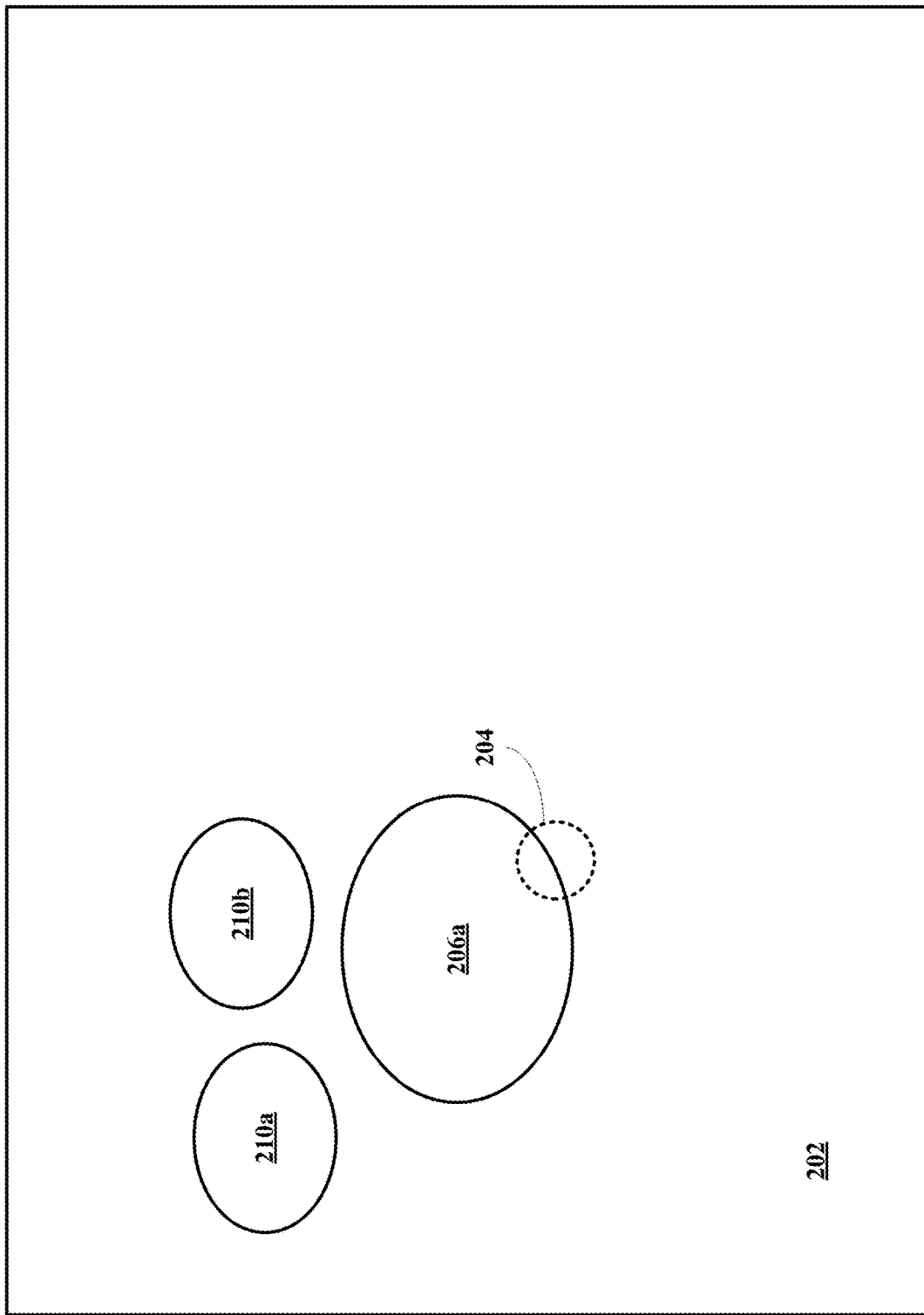
Figure 2F:
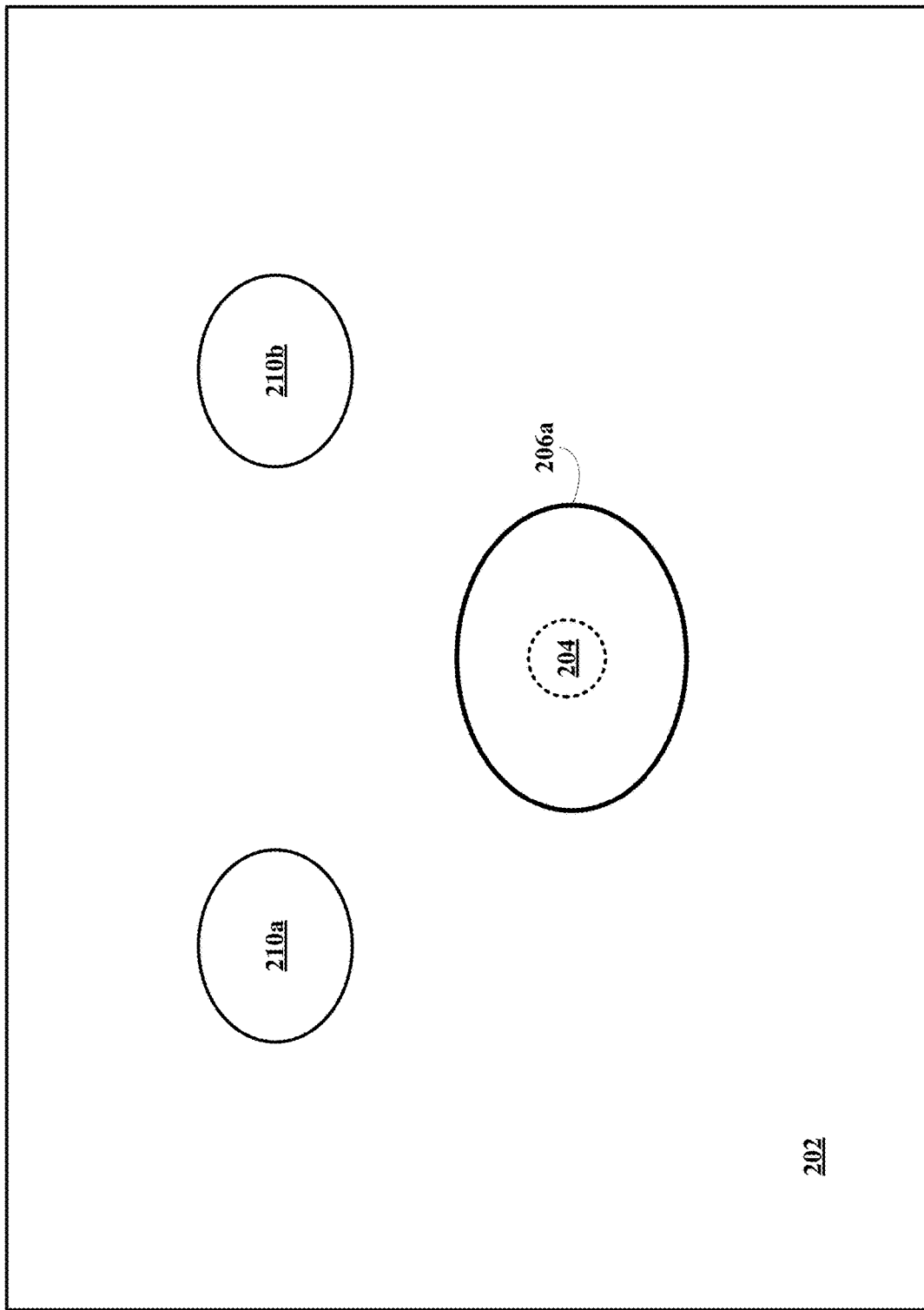

Looking at FIG. 2C, the section object 204 is moved toward the selectable object 206*a*, which may move toward the selection object 204 increasing its size and simultaneously displaying associated subobjects 210*a&b*. For example, if the object 206*a* is a camera and the subobjects 210*a&b* are commands to take a photograph and record a video sequence. As the selection object 202 is moved further toward and contacts or enters into a threshold event with the selectable object 206*a*, the selectable object 206*a* may move closer and get larger along with its subobjects 210*a&b* as shown in FIG. 2D. Looking at FIG. 2E, the selection object 204 is in contact with the selectable object 206*a* and the other objects 206*b-d* are removed or fade away and the selected object 206*a* and its associated subobjects 210*a&b* center and the subobjects distribute away so that the subobjects may be more easily selected as shown in FIG. 2F. This may or may not be centered in the display area.

Figure 2G:
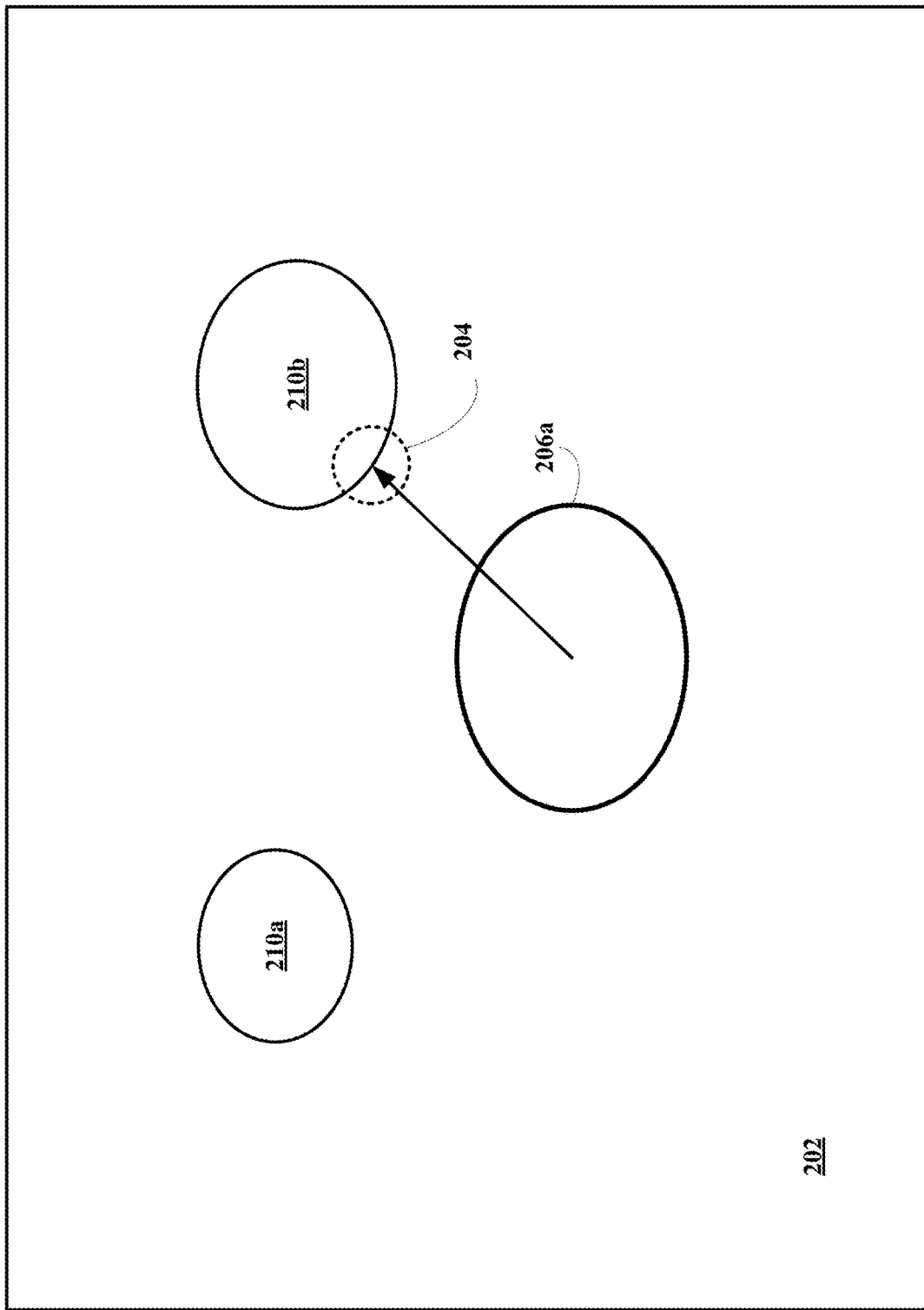
Figure 2H:
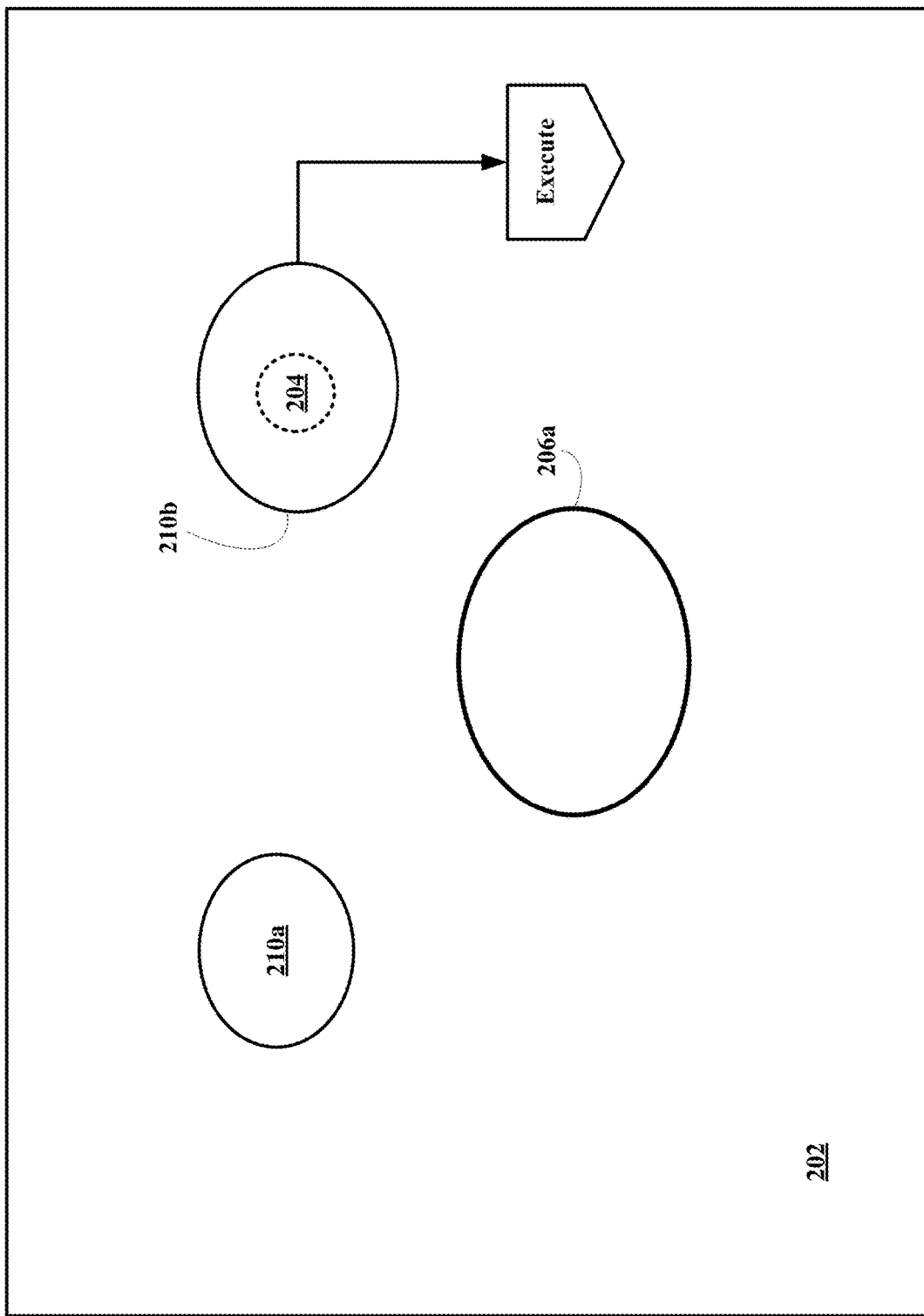

Referring now to FIG. 2G, the selection object 204 is moved from its merged state toward the subobject 210*b* coming in contact or entering into a threshold event with the subobject 210*b*, which is attracted to the selection object 204 and increase in size. Looking at FIG. 2H, the subobject 210*b* is selected as evidenced by the merging of the selection object 204 with the subobject 210*b* and simultaneously activates the subobject 210*b*.

Figure 2I:
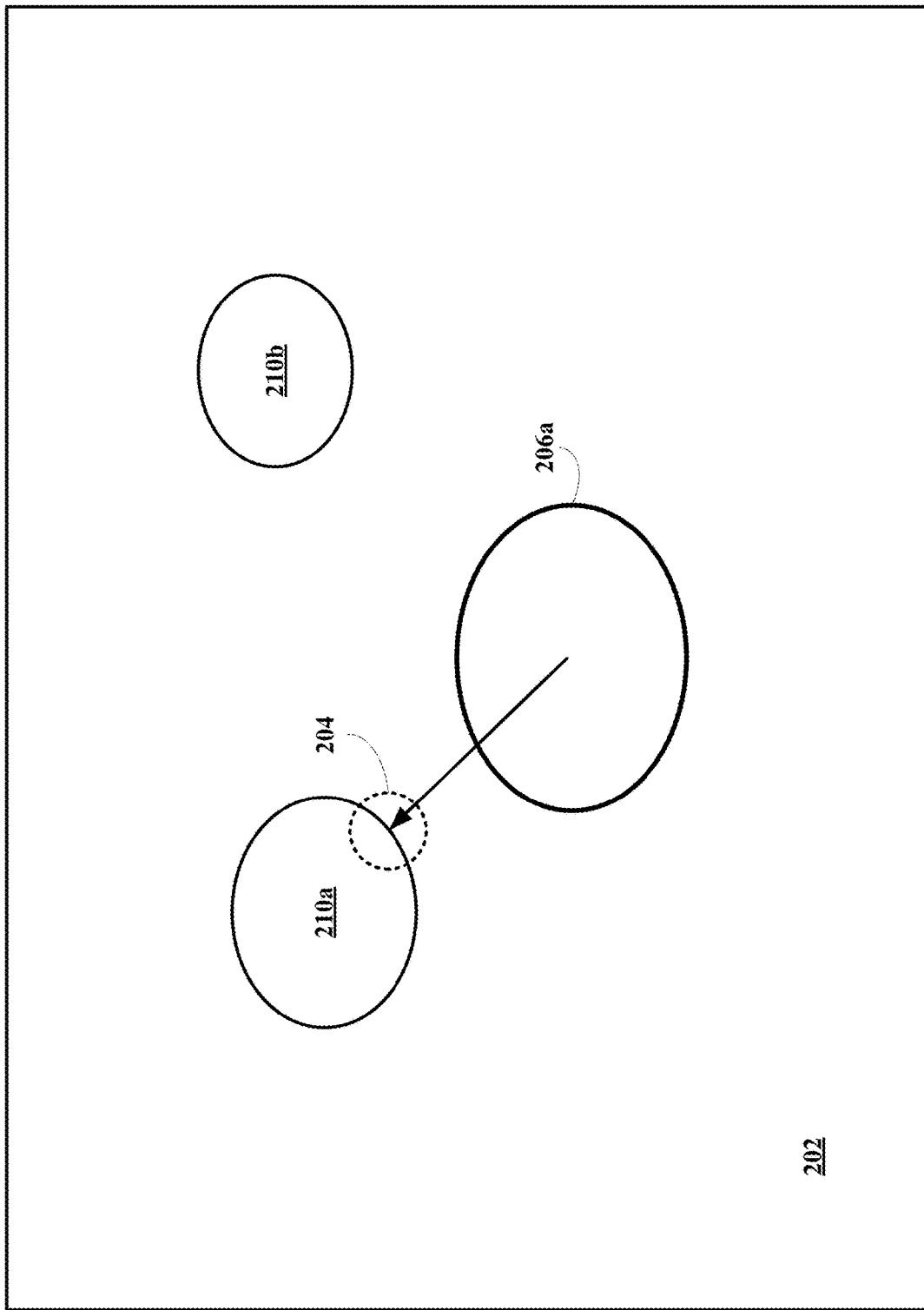
Figure 2J:
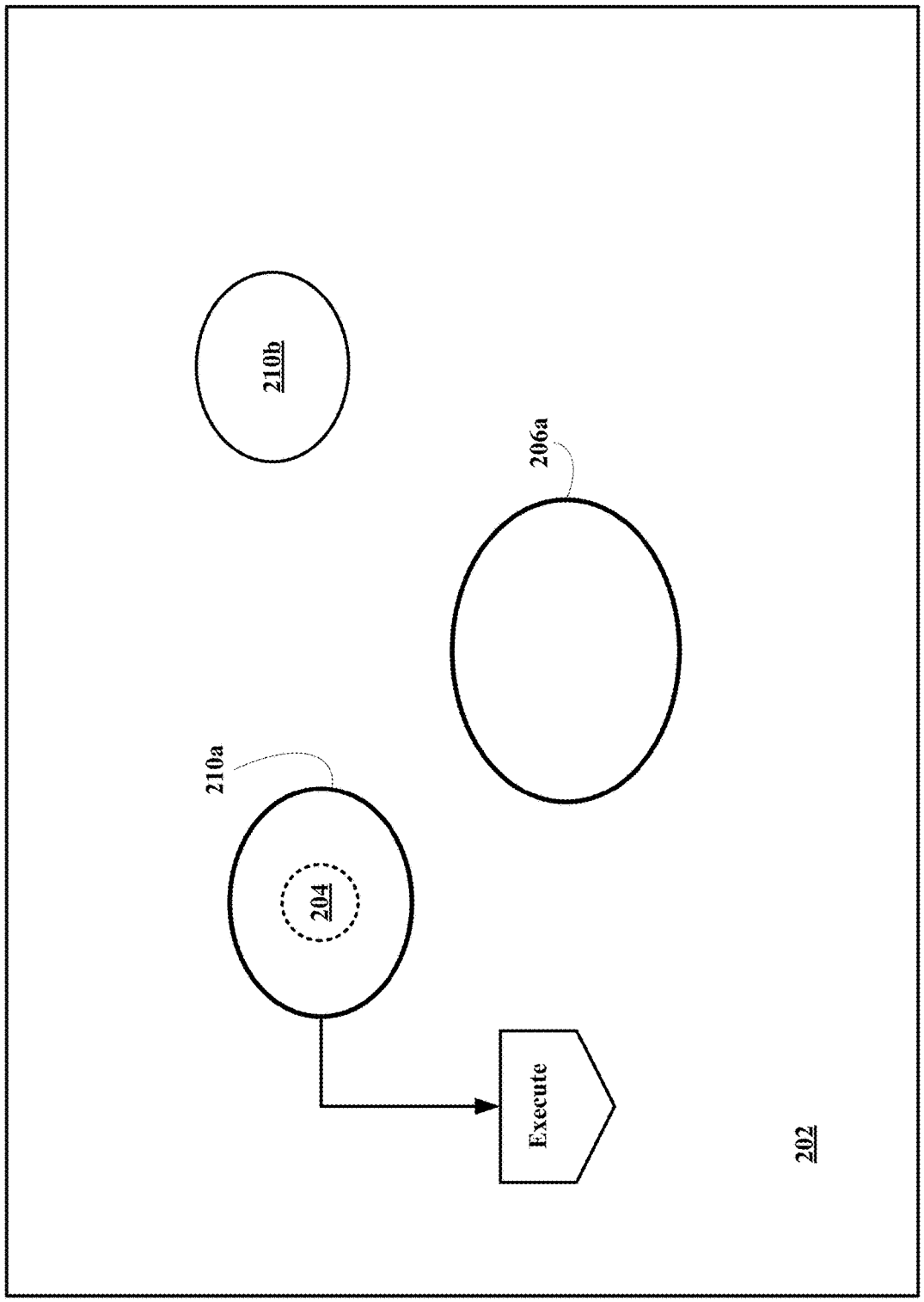

Referring now to FIG. 2I, the selection object 204 is moved from its merged state toward the subobject 210*a* coming in contact or entering into a threshold event with the subobject 210*a*, which is attracted to the selection object 204 and increase in size. Looking at FIG. 2J, the subobject 210*a* is selected as evidenced by the merging of the selection object 204 with the subobject 210*a* and simultaneously activates the subobject 210*a*.

Figure 2L:
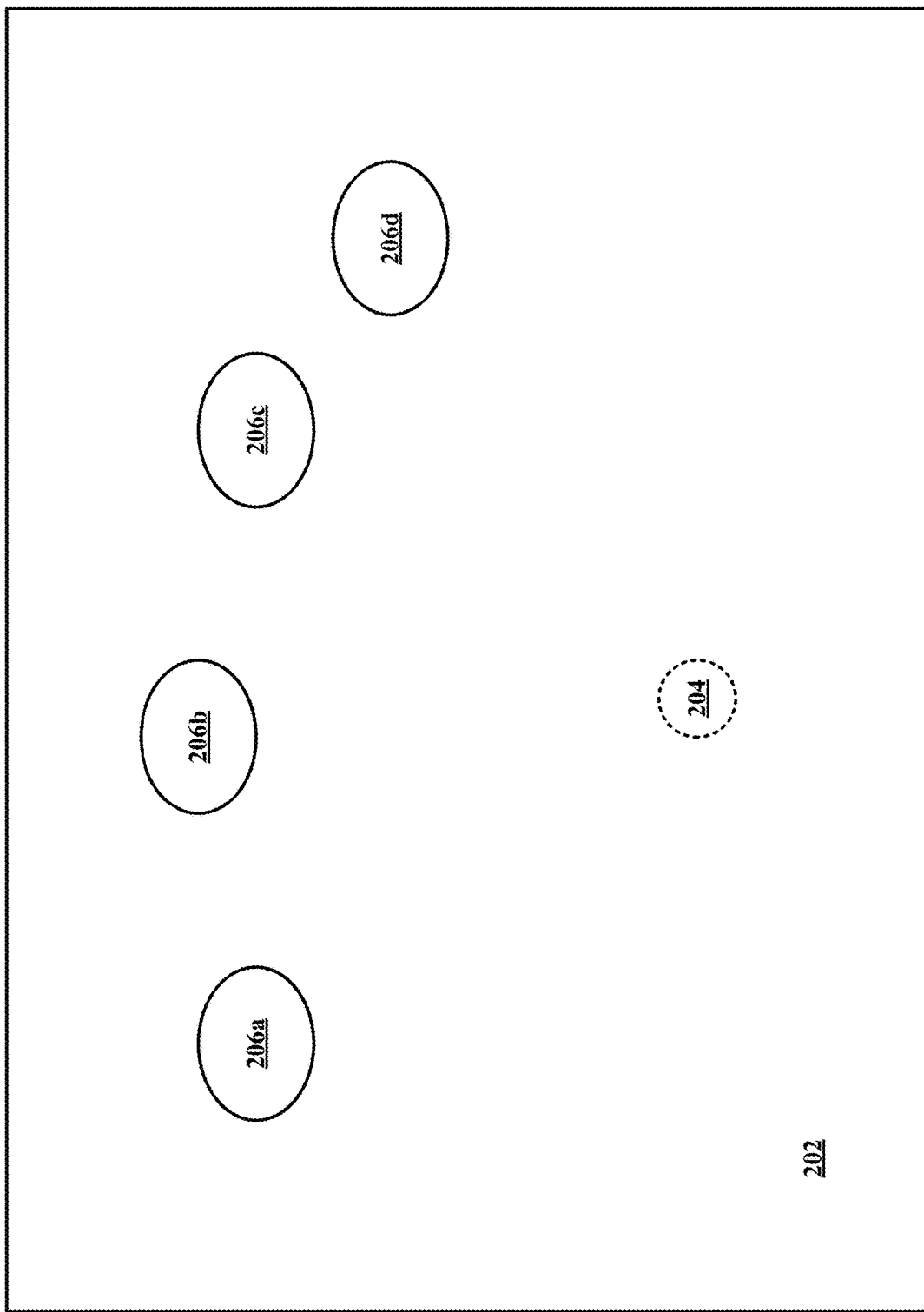

Referring now to FIG. 2K, after selecting the selectable object 206*a*, the user decides to discontinue this selection and move the selection object 204 from its merged state in a direction away from any other object resulting in the resetting of the display 202 back to the display configuration of FIG. 2B as shown in FIG. 2L.

Figure 2M:
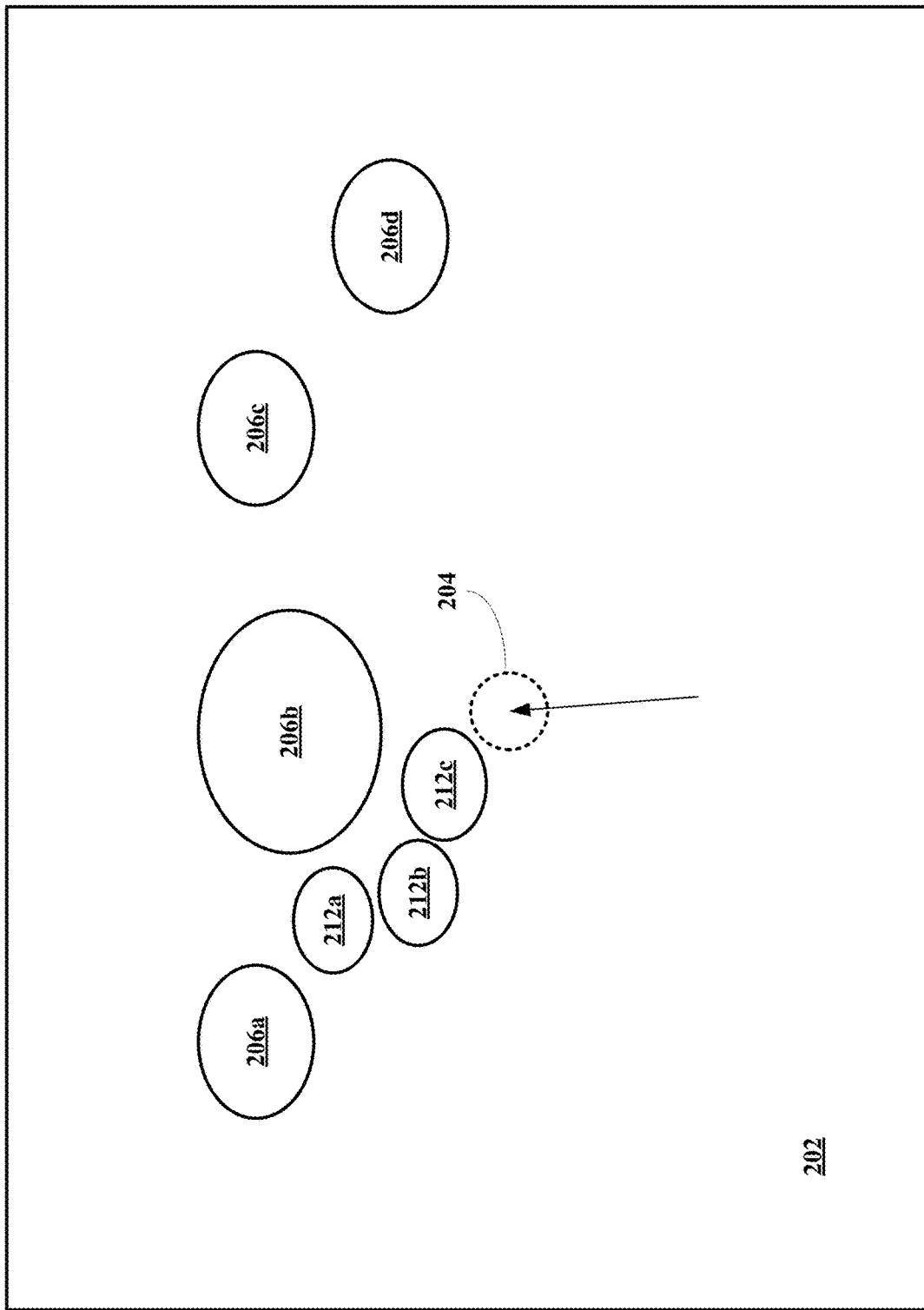
Figure 20:
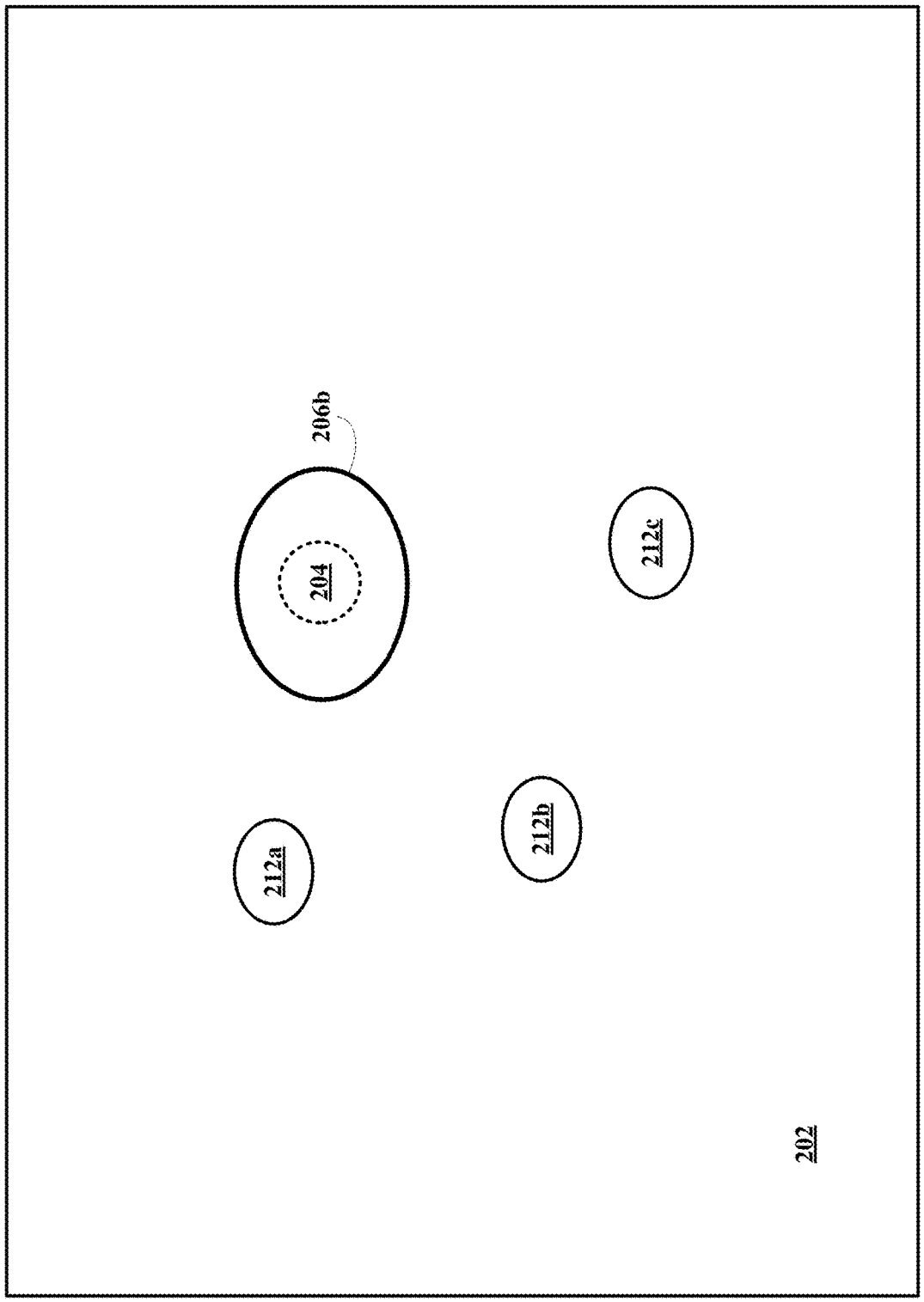

Referring now to FIG. 2M, the section object 204 is moved toward the selectable object 206*b*, which move toward the selection object 204 increasing its size and simultaneously displaying associated subobjects 212*a-c*. For example, if the object 206*b* is a phone and the subobjects 210*a-c* are activate voicemail, open contacts, and opening phone dialing pad. As the selection object 204 is moved further toward and contacts the selectable object 206*b*, the selectable object 206*b* move closer and get larger along with its subobjects 212*a-c* as shown in FIG. 2N. The selection object 204 is in contact with the selectable object 206*b* and the other objects 206*b-d* are removed or fade away and the selected object 206*b* and its associated subobjects 212*a-c* center and the subobjects distribute away so that the subobjects may be more easily selected as shown in FIG. 2O.

Figure 2P:
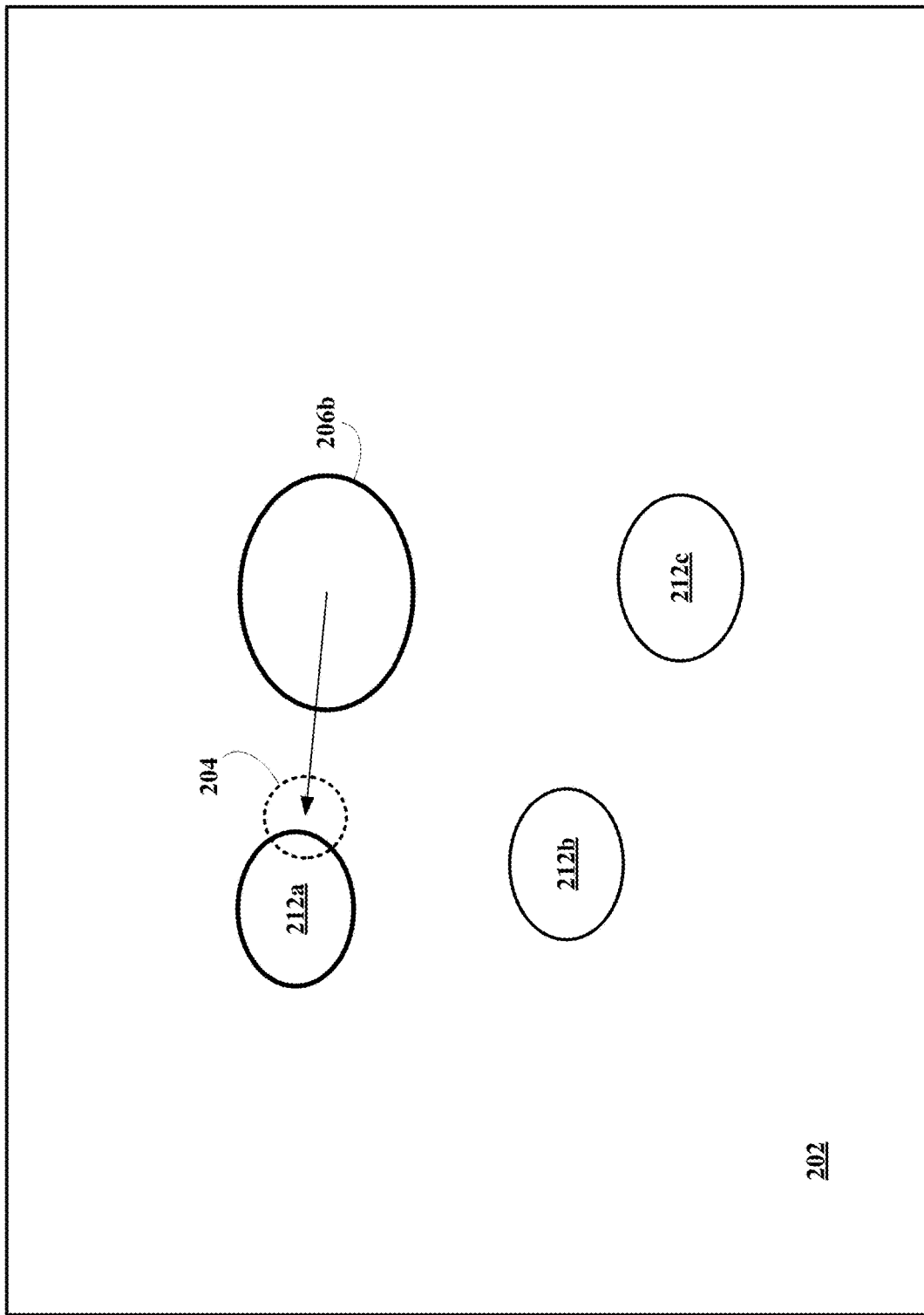
Figure 2Q:
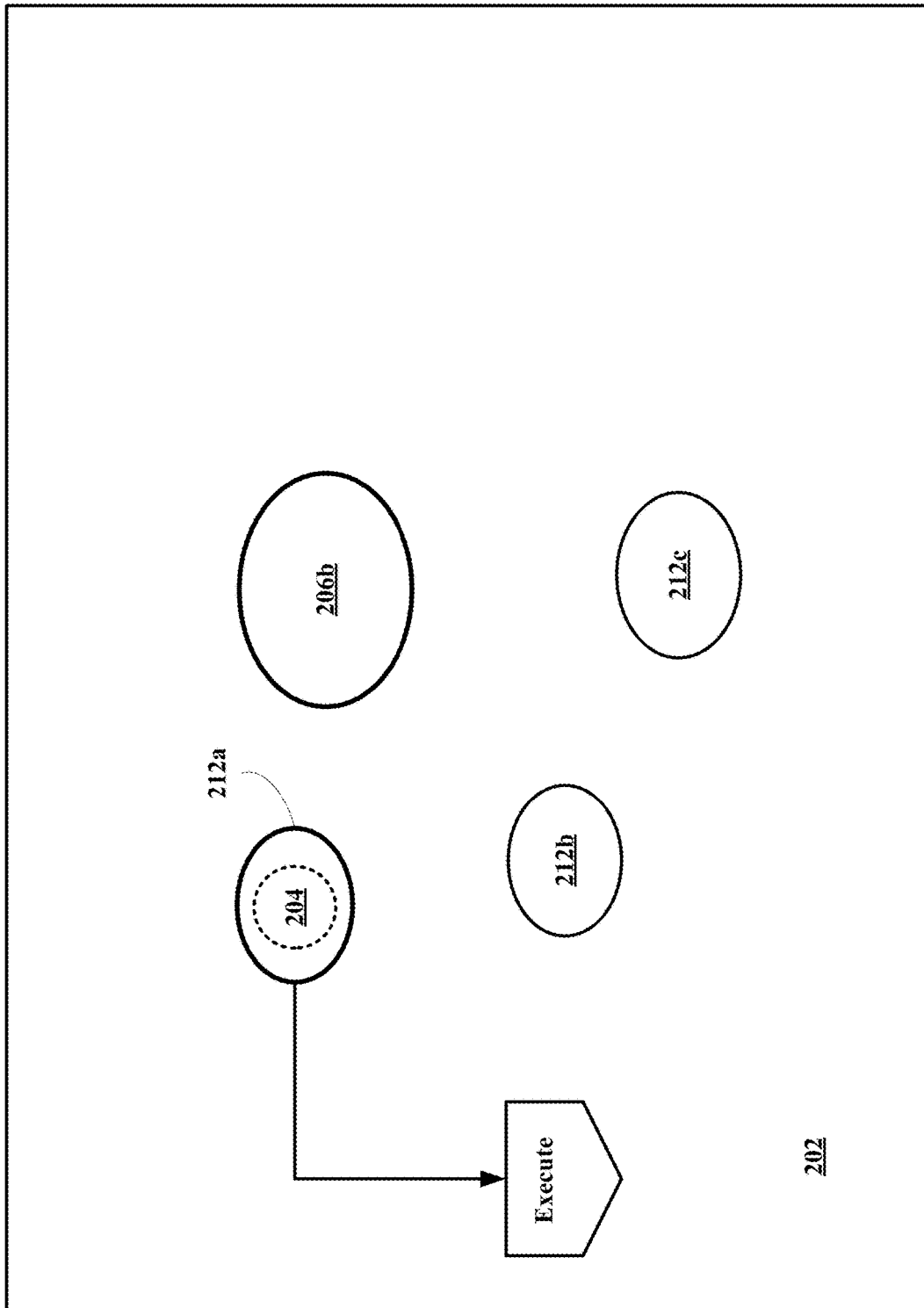

Referring now to FIG. 2P, the selection object 204 is moved from its merged state toward the subobject 212*a* coming in contact with the subobject 212*a*, which is attracted to the selection object 204 and increase in size and its line width is increased. Looking at FIG. 2Q, the subobject 212*a* is selected as evidenced by the merging of the selection object 204 with the subobject 212*a* and simultaneously activates the subobject 212*a*.

Figure 2R:
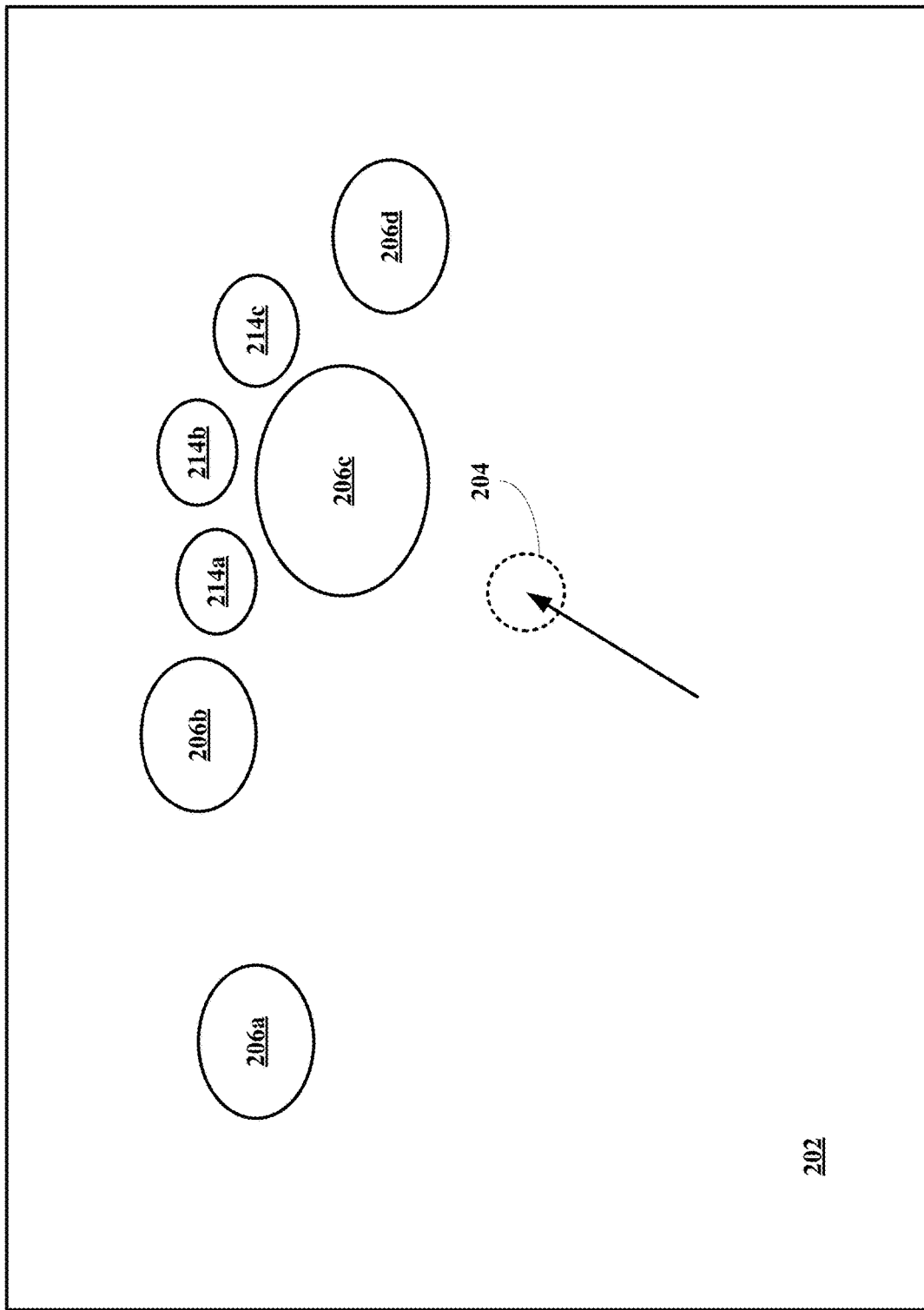
Figure 2S:
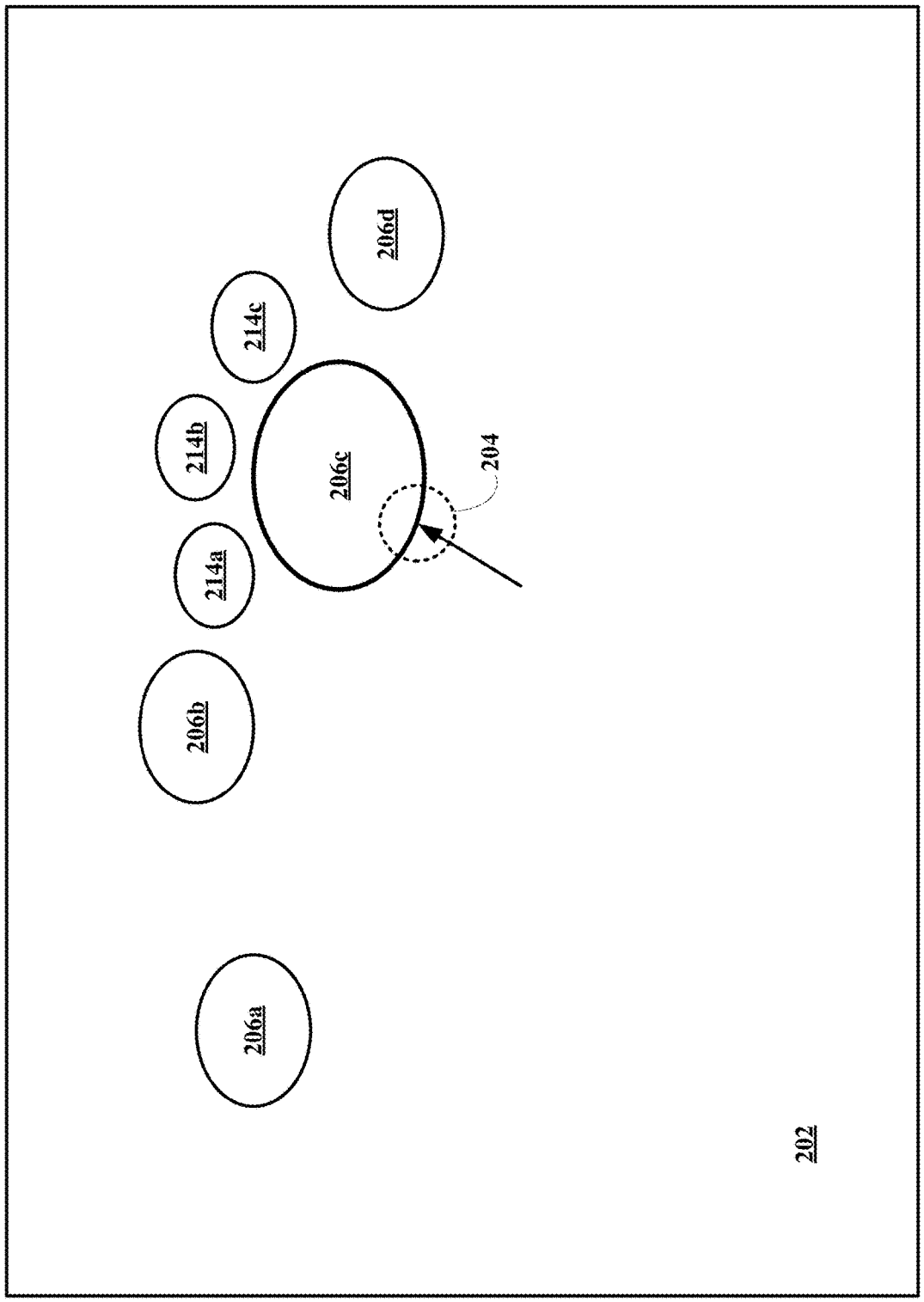
Figure 2T:
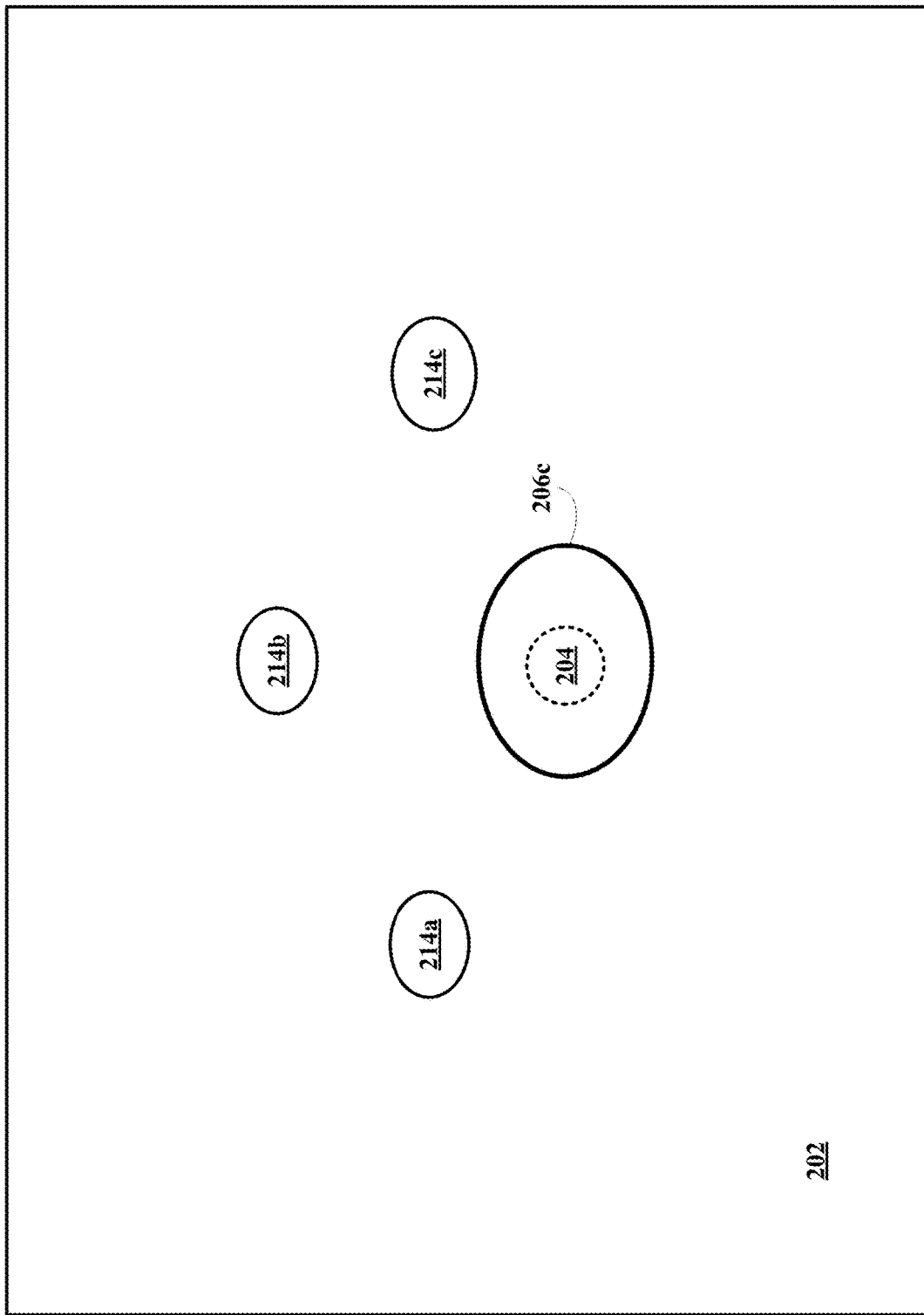

Referring now to FIG. 2R, the section object 204 is moved toward the selectable object 206*c*, which move toward the section object 204 increasing its size and simultaneously displaying associated subobjects 214*a-c*. For example, if the object 206*c* is the world wide web and the subobjects 210*a-c* are open favorites, open recent sites, and open frequently visited sites. As the selection object 204 is moved further toward and contacts or entering into a threshold event the selectable object 206*c*, the selectable object 206*c* move closer and get larger along with its subobjects 214*a-c* as shown in FIG. 2S. The selection object 204 is in contact with the selectable object 206*c* and the other objects 206*b-d* are removed or fade away and the selected object 206*c* and its associated subobjects 214*a-c* center and the subobjects distribute away so that the subobjects may be more easily selected as shown in FIG. 2T.

Figure 2U:
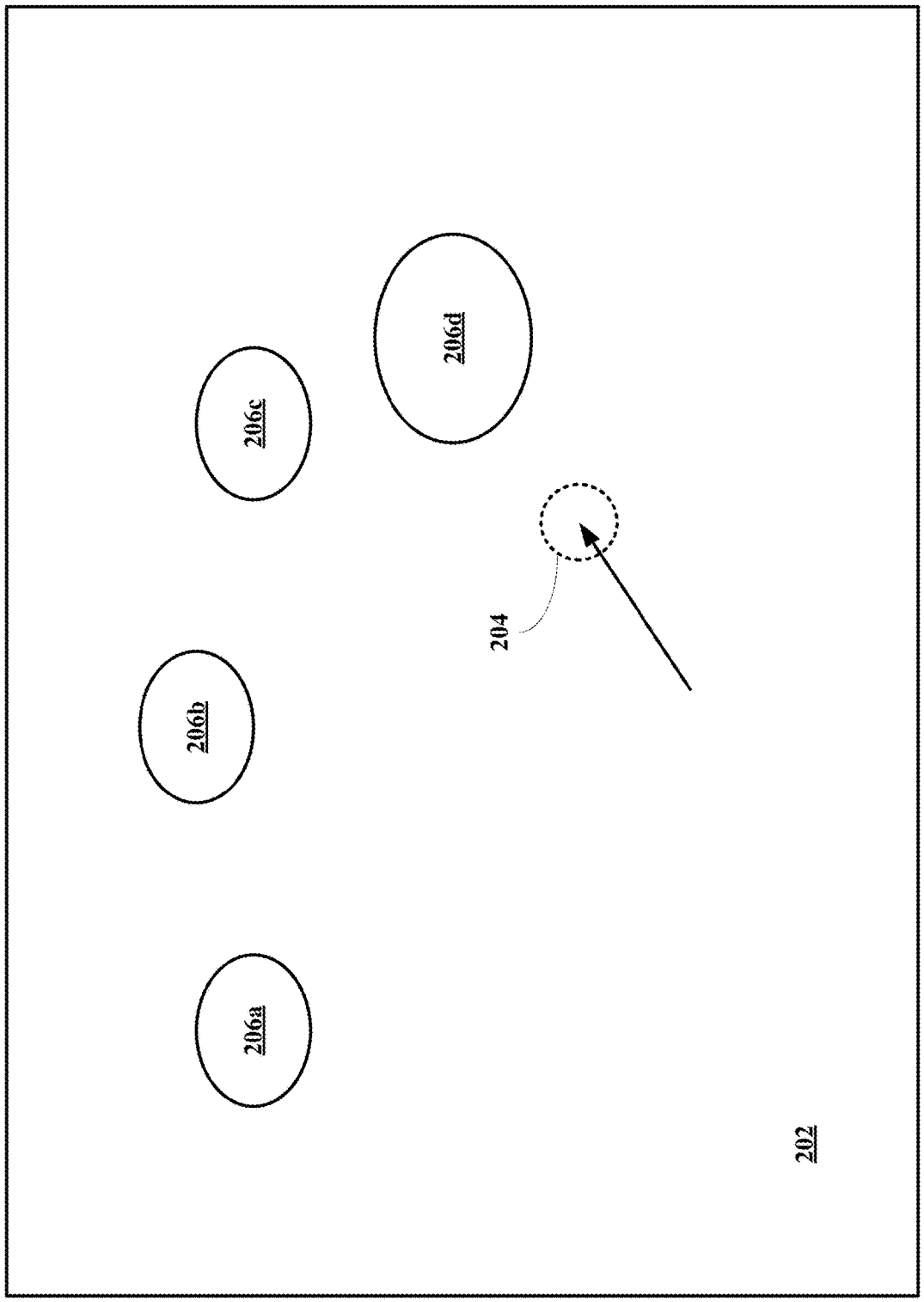
Figure 2V:
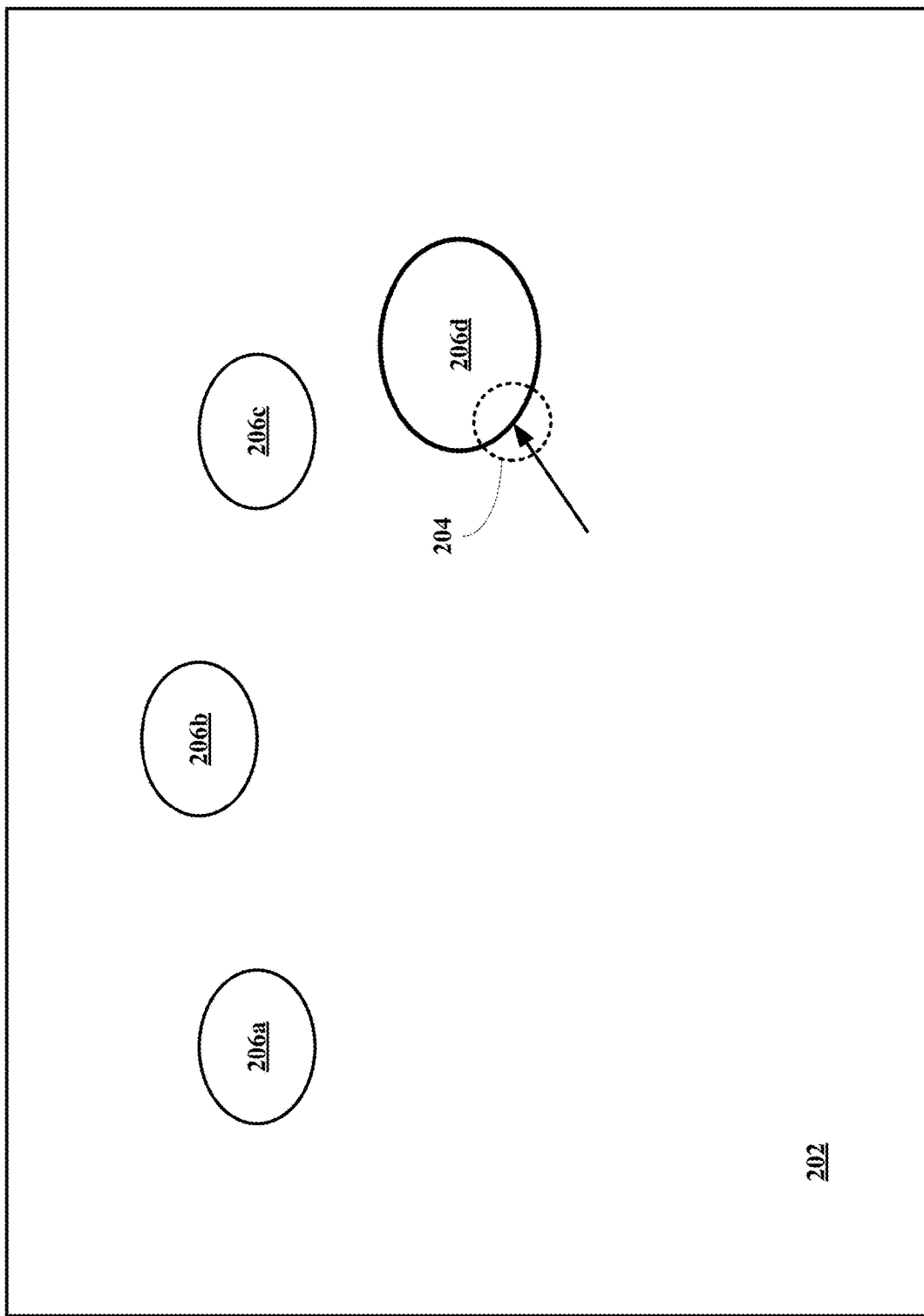
Figure 2W:
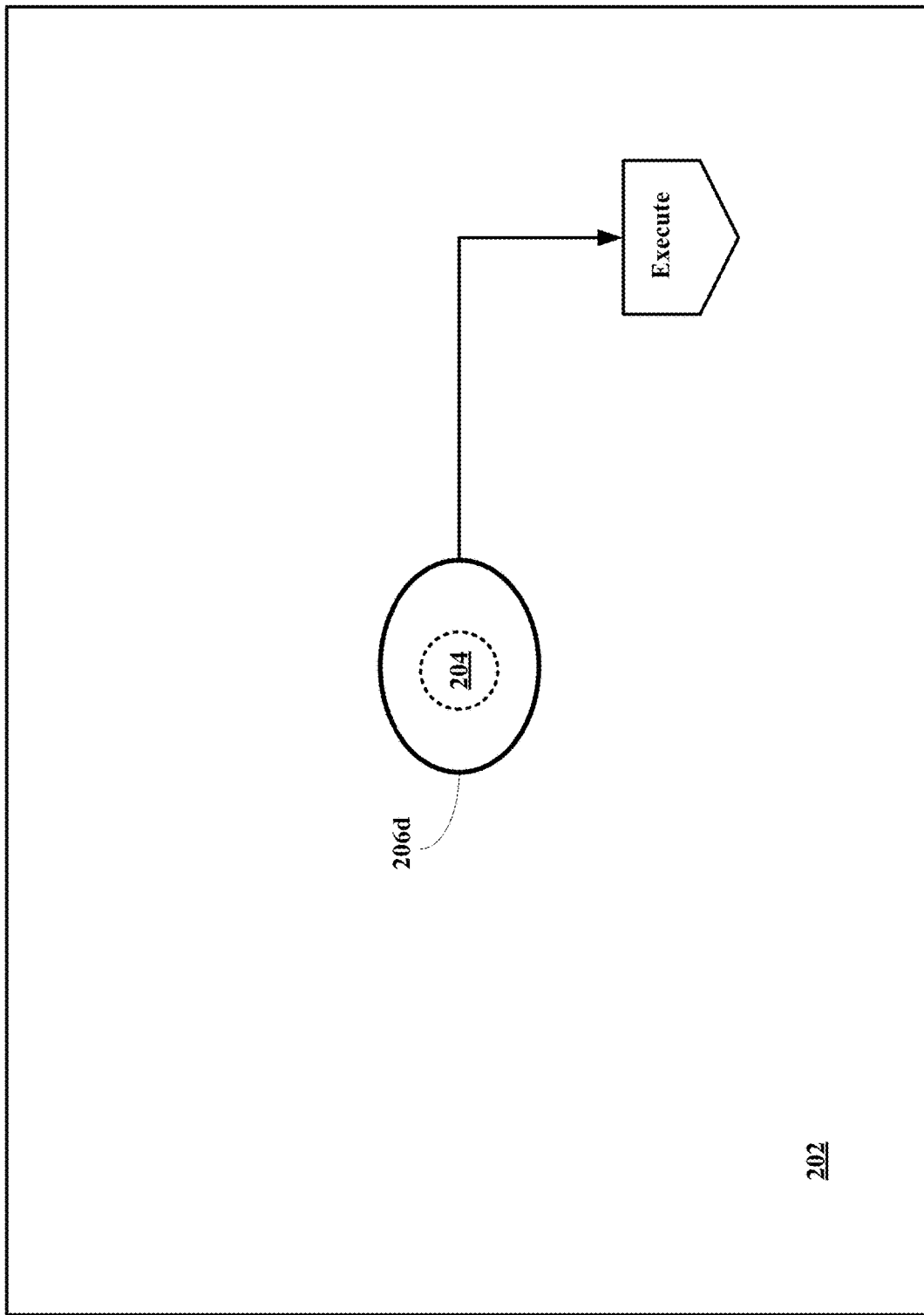

Referring now to FIG. 2U, the section object 204 is moved toward the selectable object 206*d*, which move toward the section object 204 increasing its size. For example, if the object 206*d* is twitter, then twitter is opened, i.e., the object is activated. As the selection object 204 is moved further toward and contacts or entering into a threshold event the selectable object 206*d*, the selectable object 206*d* move closer and get larger as shown in FIG. 2V. The selection object 204 is in contact with the selectable object 206d are removed or fade away and the selected object 206d is activated as shown in FIG. 2T.

Third Method and System Embodiments

Figure 3B:
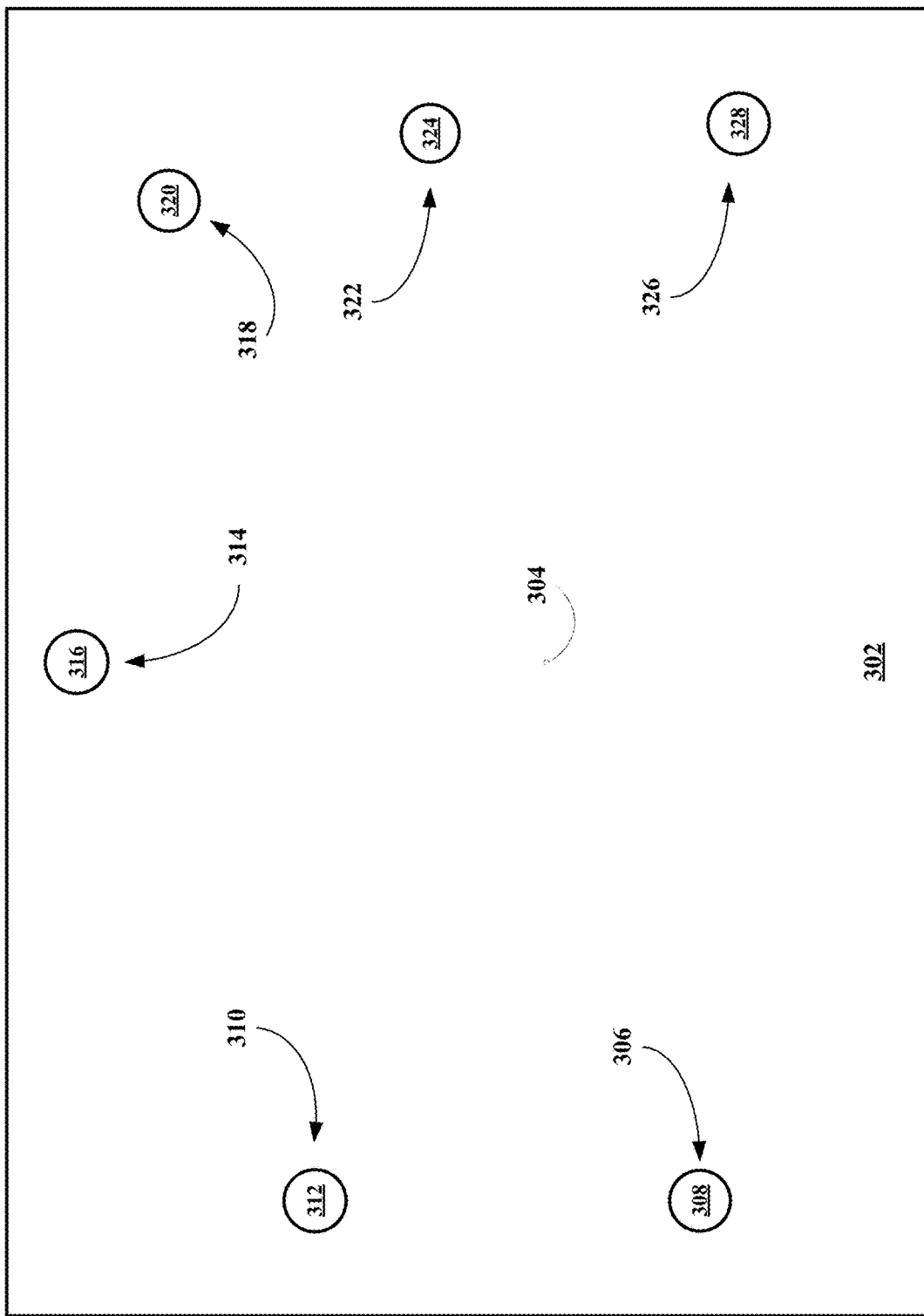

Referring now to FIG. 3A, a display, generally 300, is shown to include a display area 302. The display area 302 is in a dormant state or a sleep state or an unactivated state. This state is changed only by motion within an active zone of a motion sensor. Motion may be any movement within the active zone. In the case of a touch screen, motion may be contact such as touching, sliding, etc. Looking at FIG. 3B, motion within an active zone of a motion sensor associated with an interface activates the system and the display area 302 includes a virtual centroid 304 (the centroid is an object in the processing software and does not appear on the display, but all subsequent motion is defined relative to this centroid). In the display area, a plurality of selectable object clusters 306, 310, 314, 318, 322, and 326 are distributed about the virtual centroid 304. The selectable object clusters 306, 310, 314, 318, 322, and 326 include selectable cluster objects 308, 312, 316, 320, 324, and 328, respectively. Looking at FIG. 3C, the cluster 308 includes objects 308a-e; the cluster object 312 includes objects 312a-c; the cluster 316 includes 316a-f; the cluster 320 includes 320a-f; the cluster 324 is a selectable object; and the cluster 328 includes 328a-d.

Figure 3D:
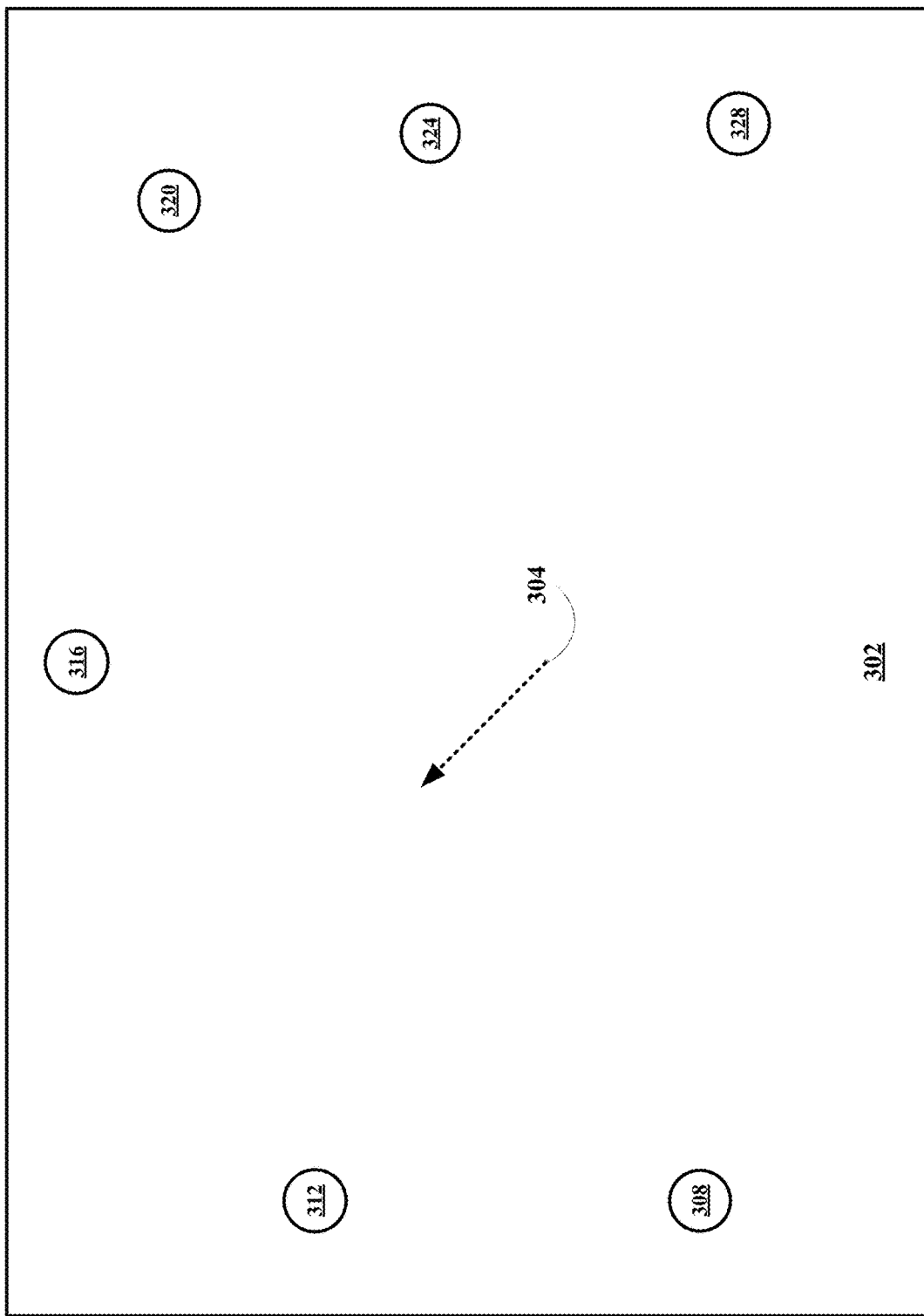
Figure 3E:
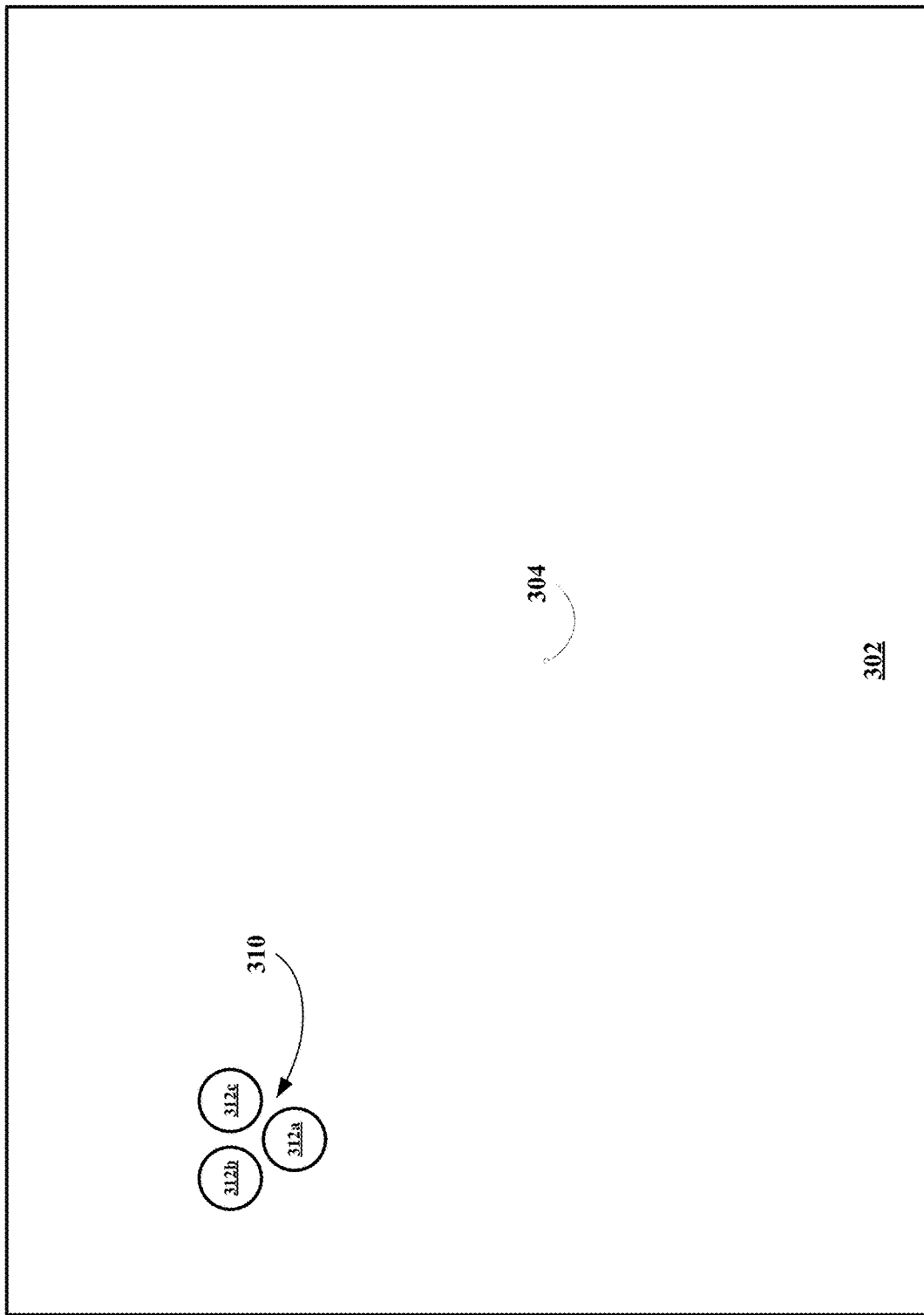
Figure 3F:
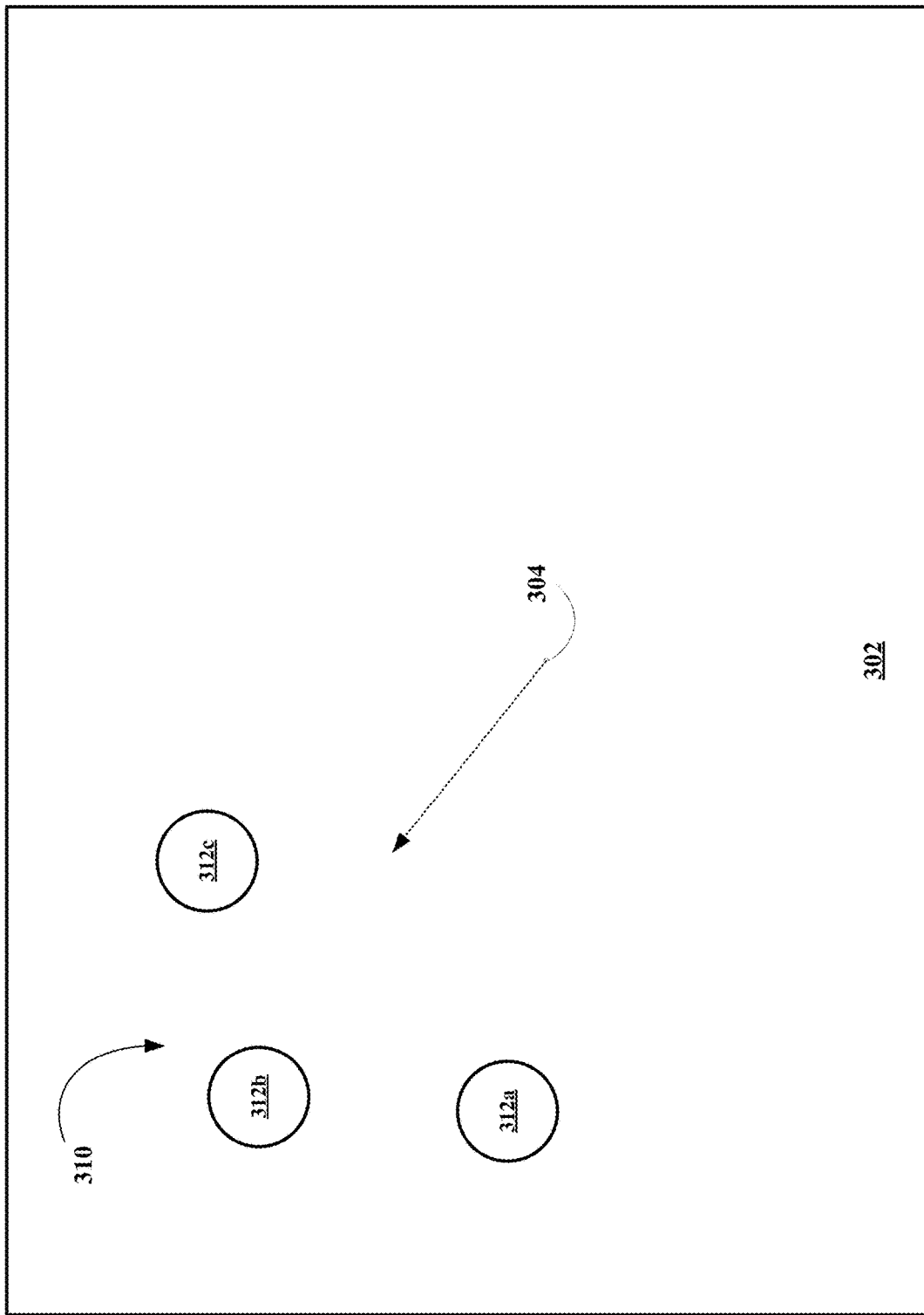
Figure 3G:
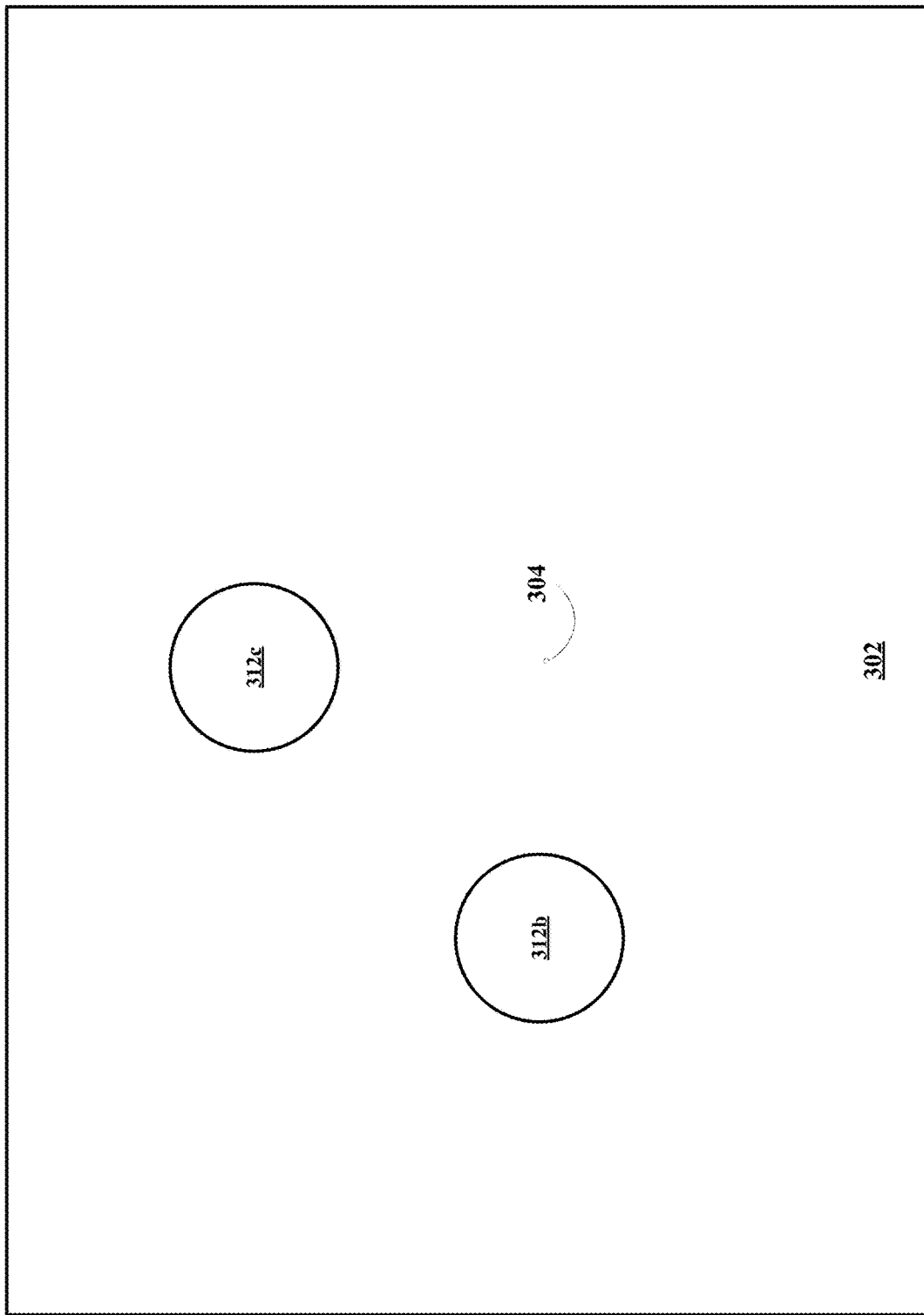

Referring now to FIG. 3D, motion of a body part such as a user's eye, hand, foot, etc. within in the active zone of the motion sensor associated with the interface is displayed as a virtual directed line segment in the display area, but the directed line segment is not actually displayed. The sensed motion is analyzed and the interface predicts the object most aligned with the motion characteristic such as direction, speed of motion and/or acceleration of the motion. Looking at FIG. 3E, the predict portion of the software of the interface determines and cluster 310 is the most likely cluster that is to be selected and its associated selectable cluster object 312a-c are also displayed. The interface then causes the objects 312a-c to be drawn to the centroid 304 (or towards the relative location of the user's eye(s) or body part(s) acting as the selection object) and increased in size as shown in FIG. 3F. FIG. 3F also shows continued motion sensed by the motion sensor in an augmented direction. Looking at FIG. 3G, the augmented direction permits additional discrimination so that now only objects 312b and 312c are displayed, attracted and spaced apart for better discrimination.

Figure 3H:
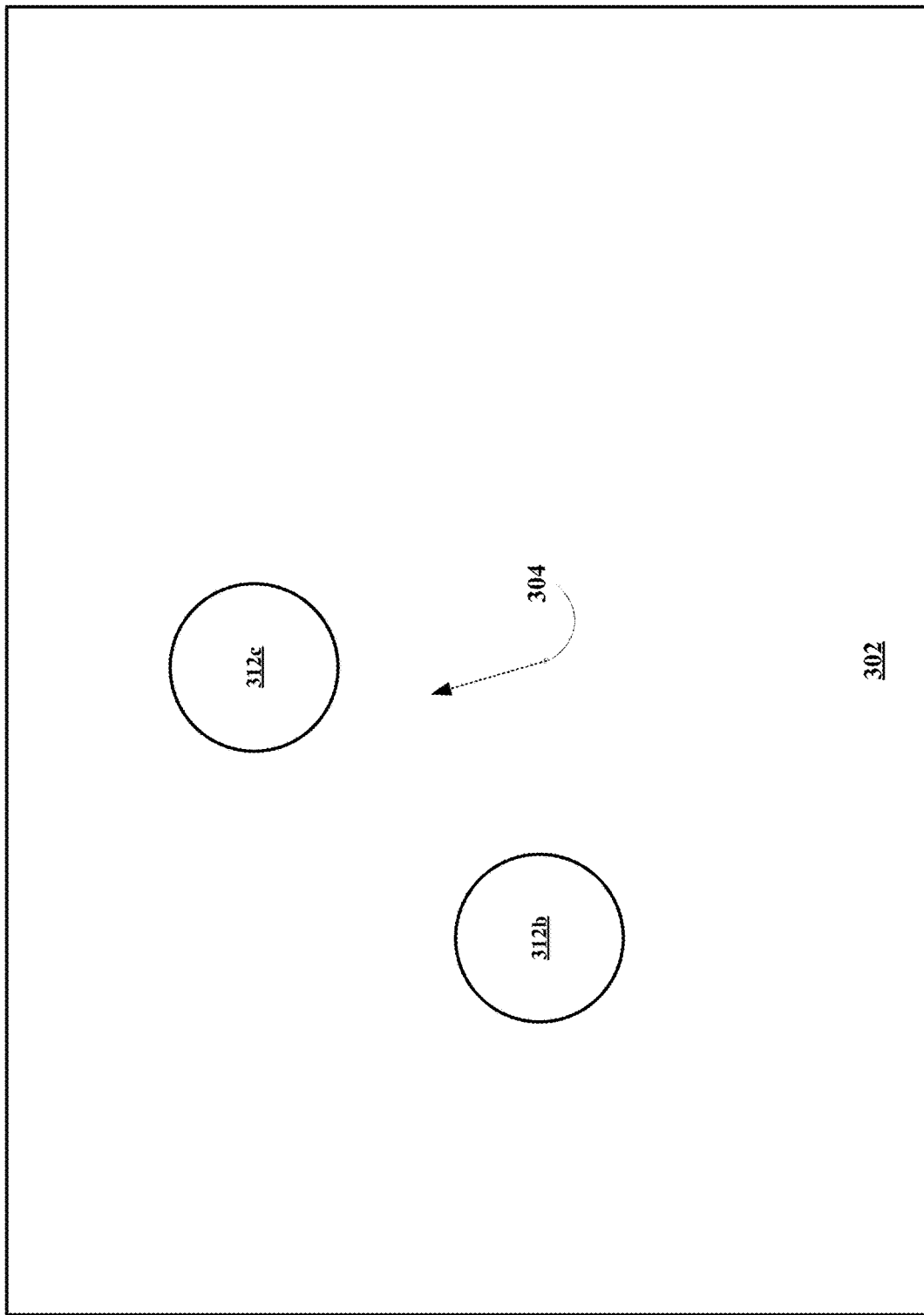
Figure 3I:
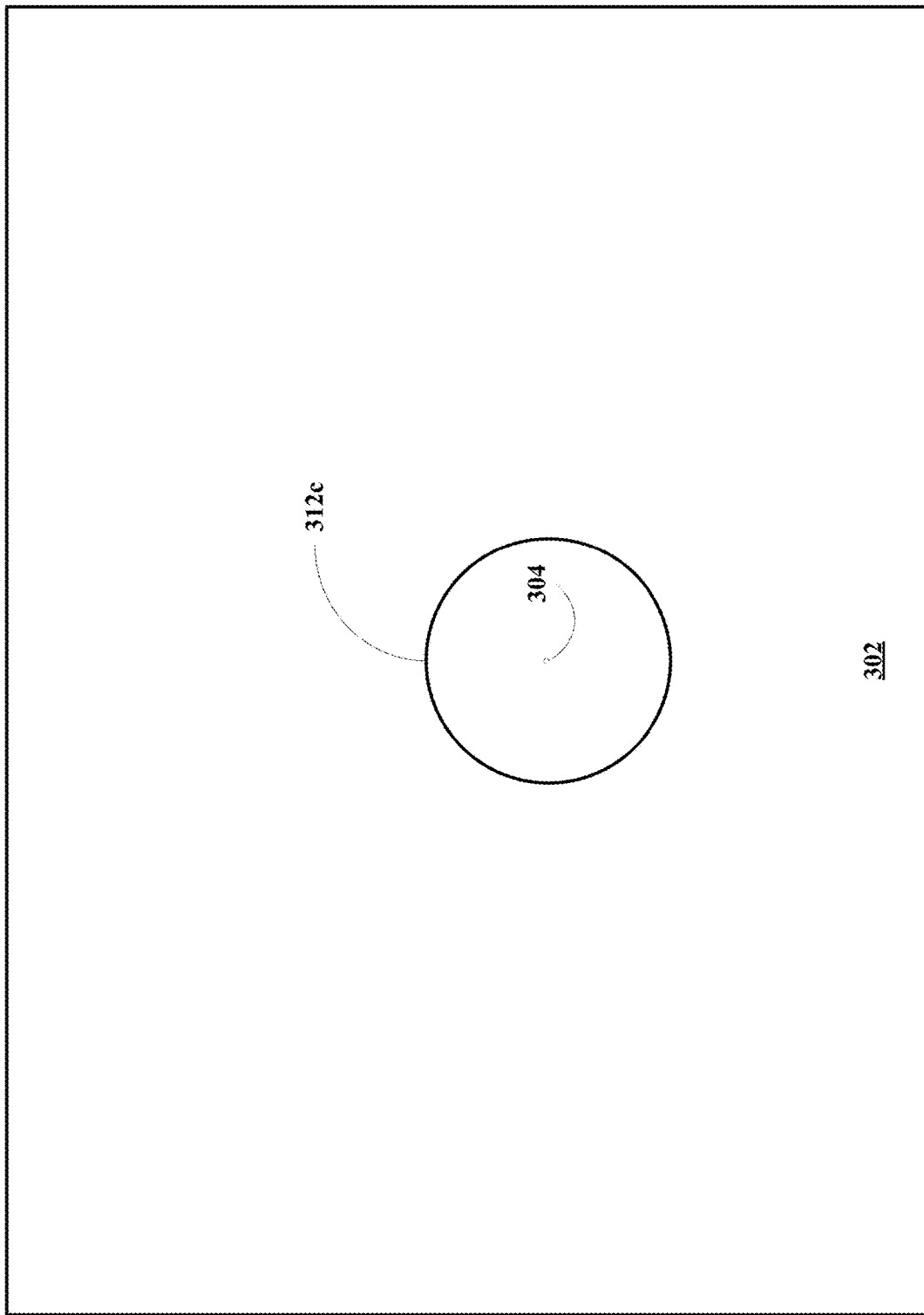
Figure 4B:
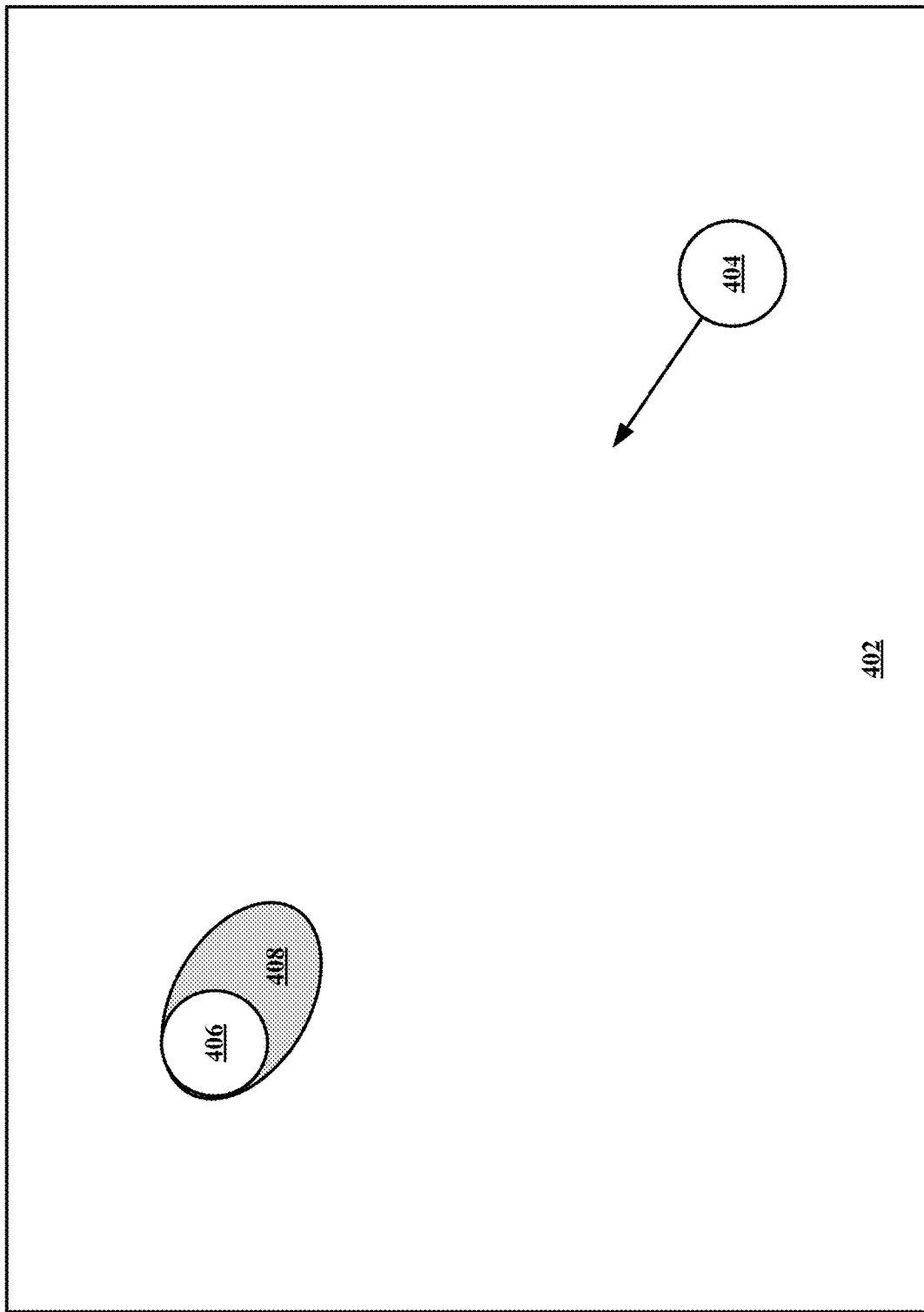
Figure 4C:
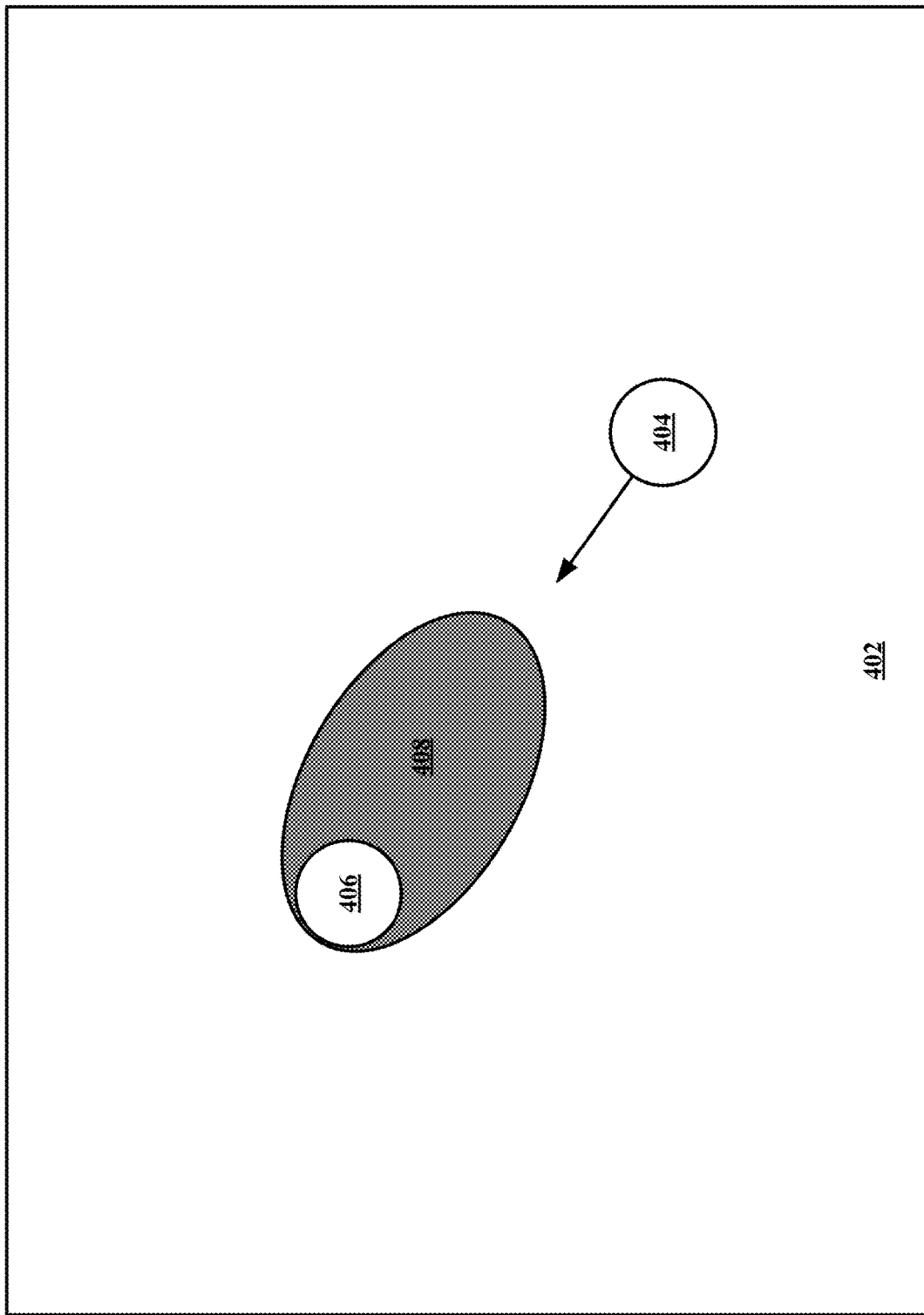
Figure 4D:
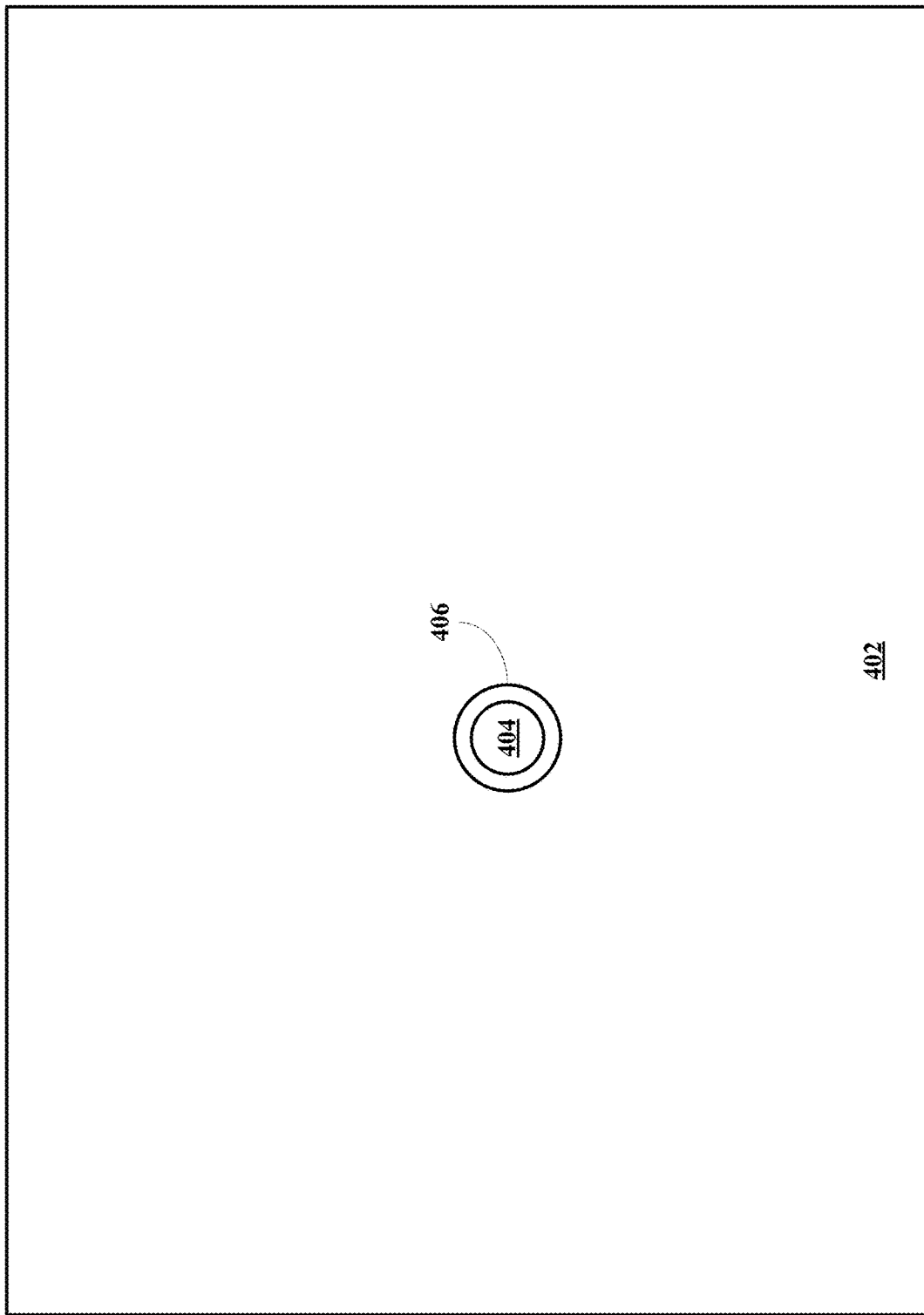

Referring now to FIG. 3H, a new augments direction of motion sensed by the motion sensor permits selection, centering of the selected object 312c and activation of the selected object 312c as shown in FIG. 3I.

in the predictive selection of cluster 310 and the eventual selection of the object 312c, these selections may be confirmed by motion of a second body part. Thus, if eye motion is used as the primary motion indicator, then motion of a second body part such as nodding of the head, blinking of the eye, hand movement, or motion of any other body part may be used as confirmation of the selection. Similarly, a hold may be utilized to begin the attractive process of bringing the selectable object or objects toward the user. Just as in the interfaces of FIGS. 1A-M and FIGS. 2A-W, motion away from selectable objects returns the display to the previous selection level. Continued motion away continues this drill up until the display is back to the top level. In certain embodiments, clusters may be selected by certain predetermined gestures that are used to active particular cluster, objects or object groups. In other embodiments, lifting of the finger or moving out of an activating plane, area or volume would reset the objects to a predetermined location and state.

Fourth Method and System Embodiments

Referring now to FIGS. 4A-D, a display, generally 400, is shown to include a display area 402. The display area 402 is shown to include a selection object 404 and a selectable object 406. As the selection object 404 moves toward the selectable object 406, the two objects 404 and 406 move toward each other and an active area 408 is generated in front of the selectable object 406 in the direction of the selection object 404. As movement continues, the size of the active area 408 increases and the certainty of the selection increases as shown by the darkening color of the active area 408. Finally, the selection is confirmed by merging the two objects 404 and 406.

Figure 5B:
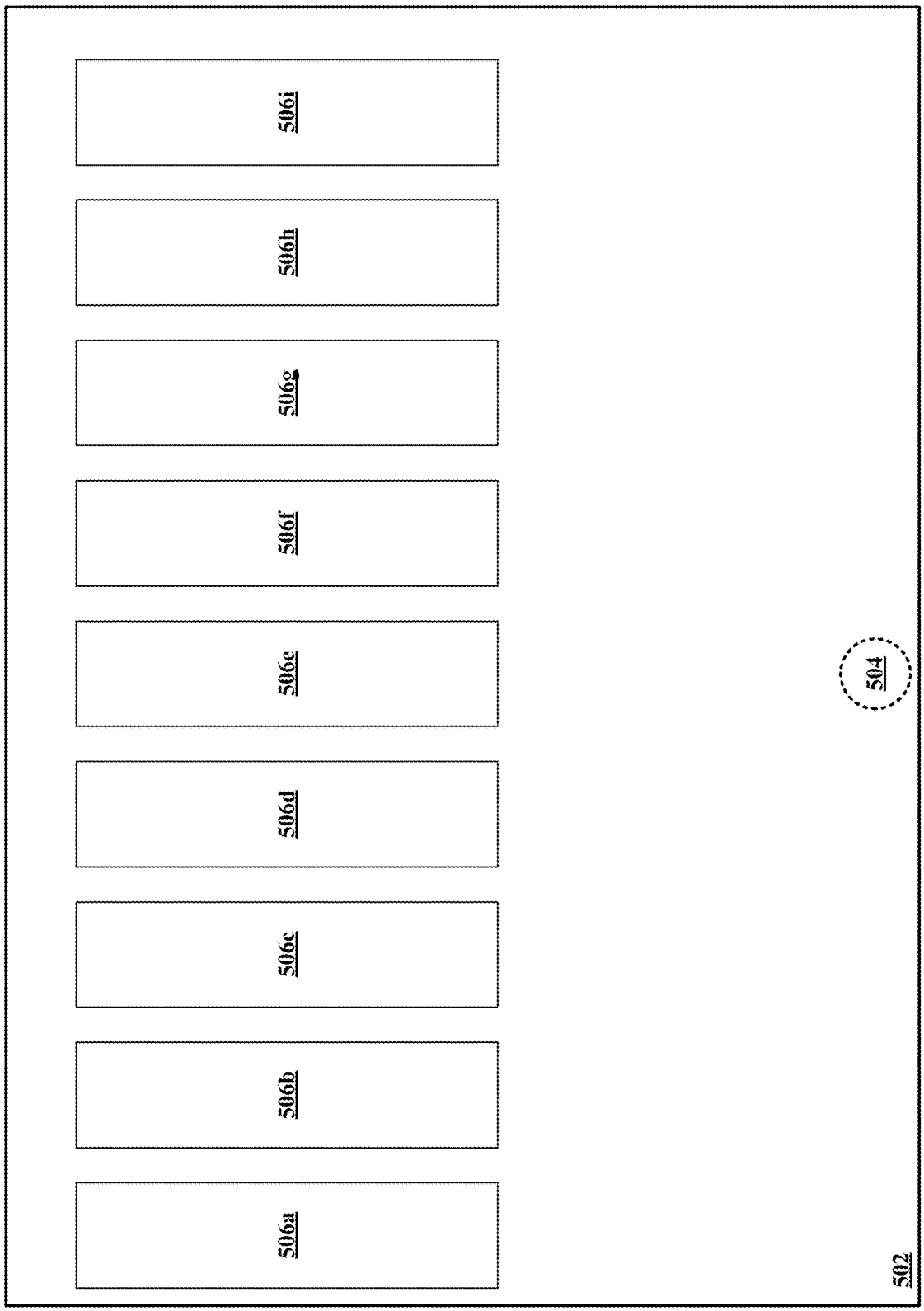
FIG. 5A-P depict another motion-based selection sequence using an attractive interface of this invention: (A) depicts a display prior to activation by motion of a motion sensor in communication with the display; (B) depicts the display after activation to display a selection object and a plurality of selectable objects; (C) depicts the display after the selection object is moved toward one or more selectable objects; (D) depicts the display showing the movement causing the one or more selectable objects to move towards or attracted to the selection object and undergo size increases and the selection object is moved further toward a particular selectable object; (E) depicts the display showing the further movement causing the particular selectable object to move toward or attracted to the selection object and undergo size enlargement; (F) depicts the display after the selection object is moved toward a first selectable subobject; (G) depicts the display merged with a selected subobject and simultaneous activation of the subobject; (H) depicts the display after the selection object is moved toward the other selectable subobject; (I) depicts the display merged with a selected subobject and simultaneous activation of the other subobject; (J) depicts the display with motion of the selection object away from the selected object and away from any subobjects; (K) depicts the display after moving away causing the original selection display to reappear; (L) depicts the display after the selection object is moved toward a second selectable subobject causing the second object to move toward and increase in size and simultaneously display associated subobjects; (M) depicts the display after movement of the selection object into contact with the second selectable object; (N) depicts the display after selection of the second selectable object now merged and centered with the subobjects distributed about the selected second object; (O) depicts the display after the selection object is moved toward a desired subobject; and (P) depicts the display after merger with the subobject simultaneously activating the subobject.
Figure 5C:
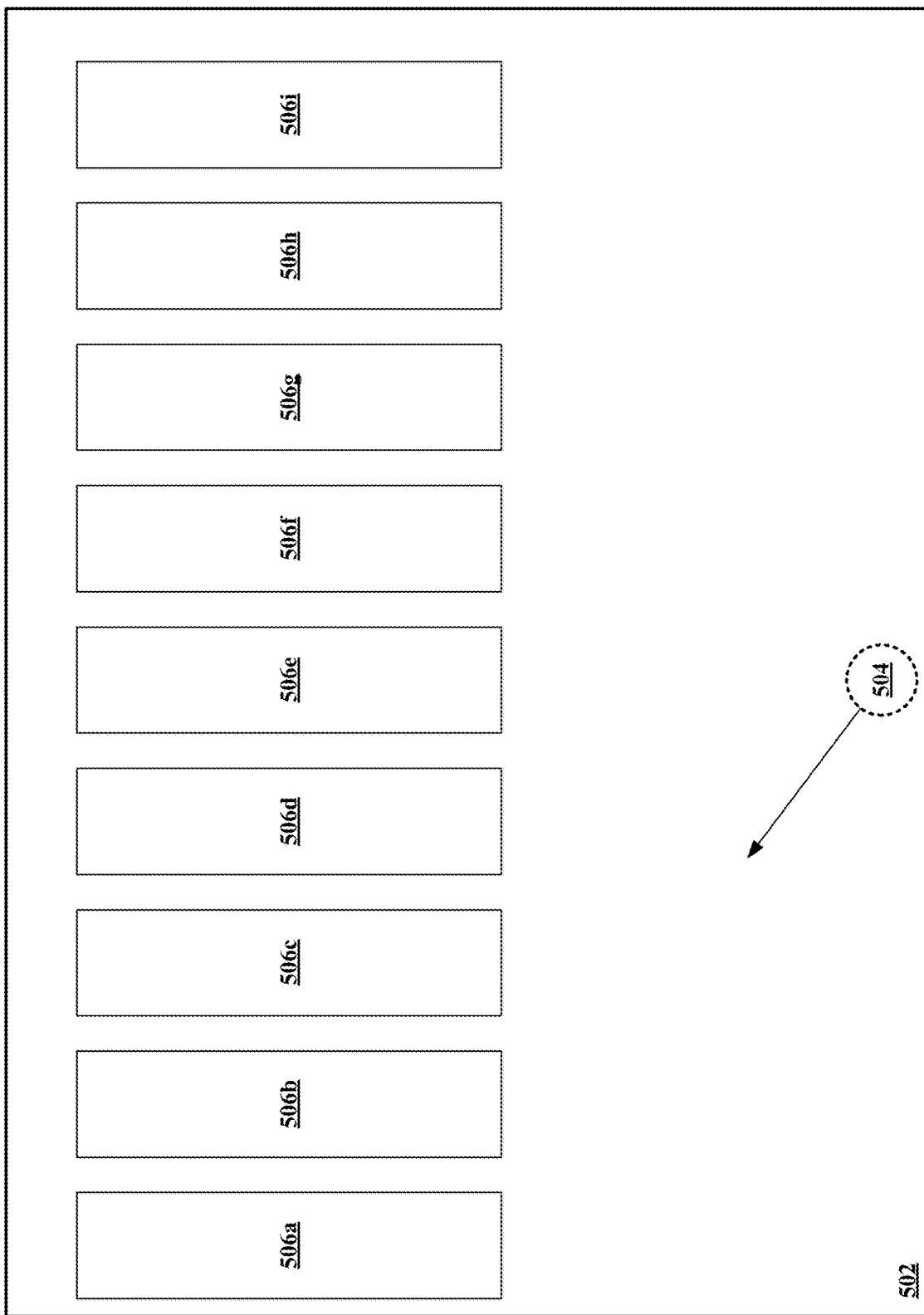
Figure 5D:
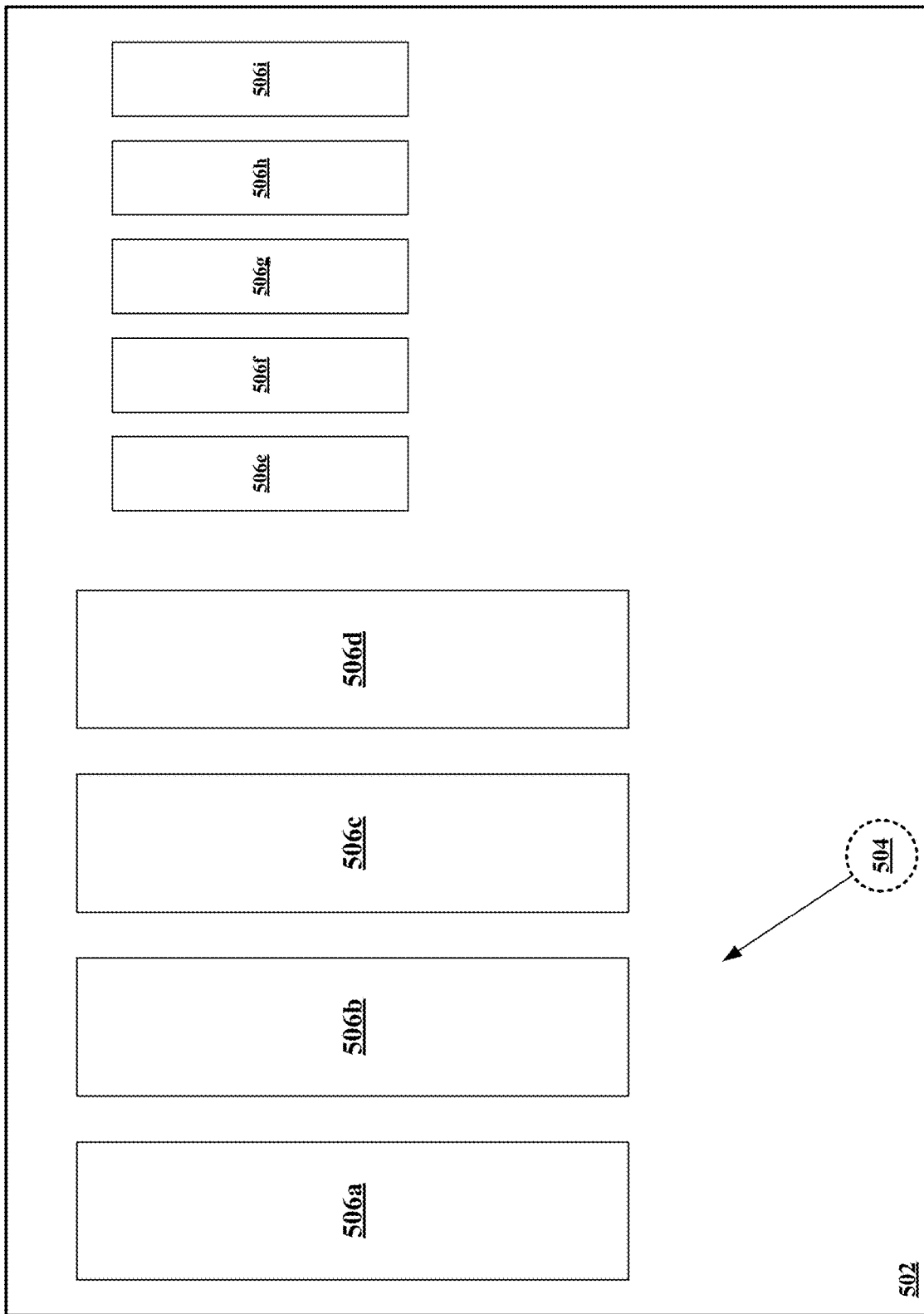
Figure 5F:
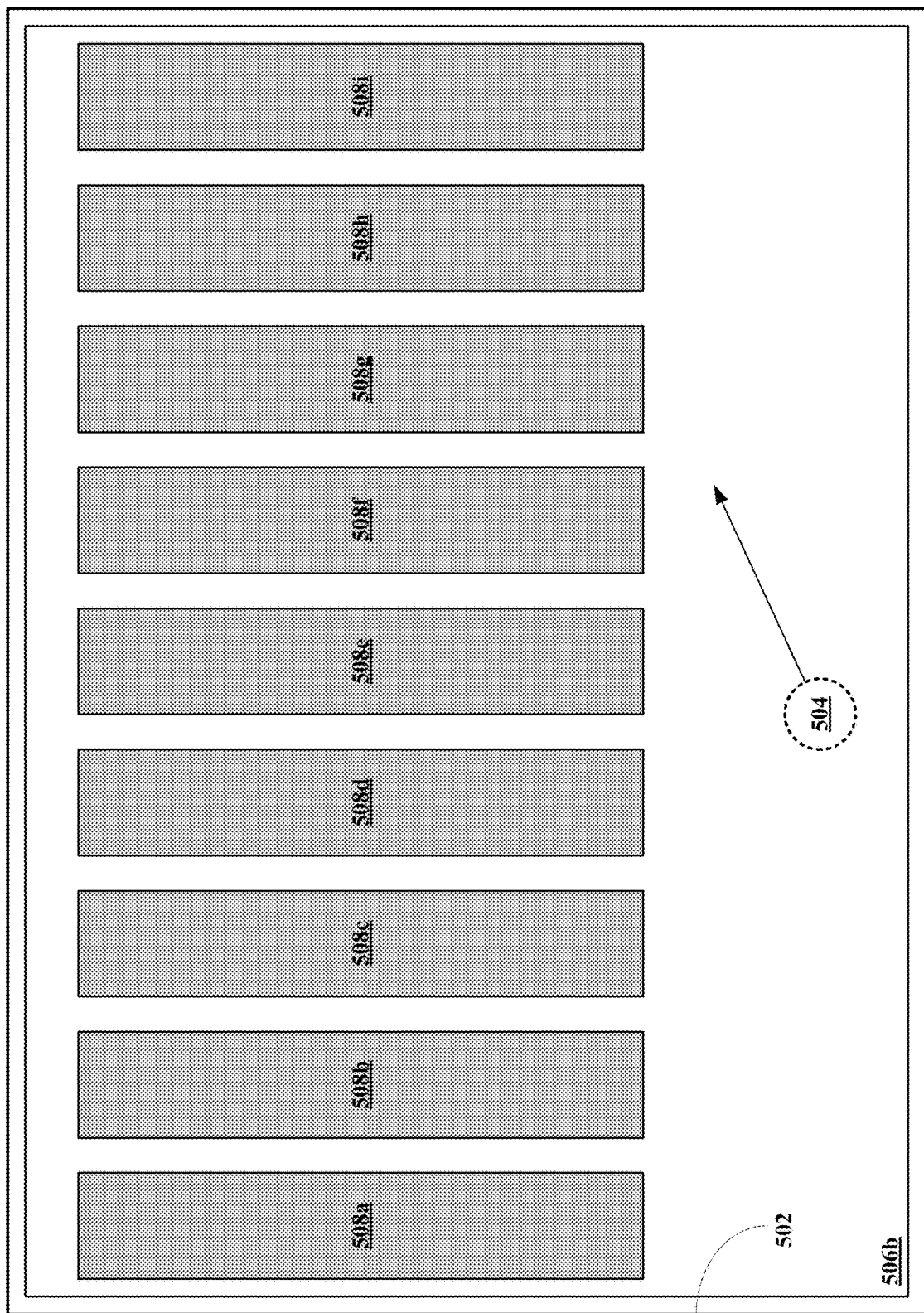
Figure 5G:
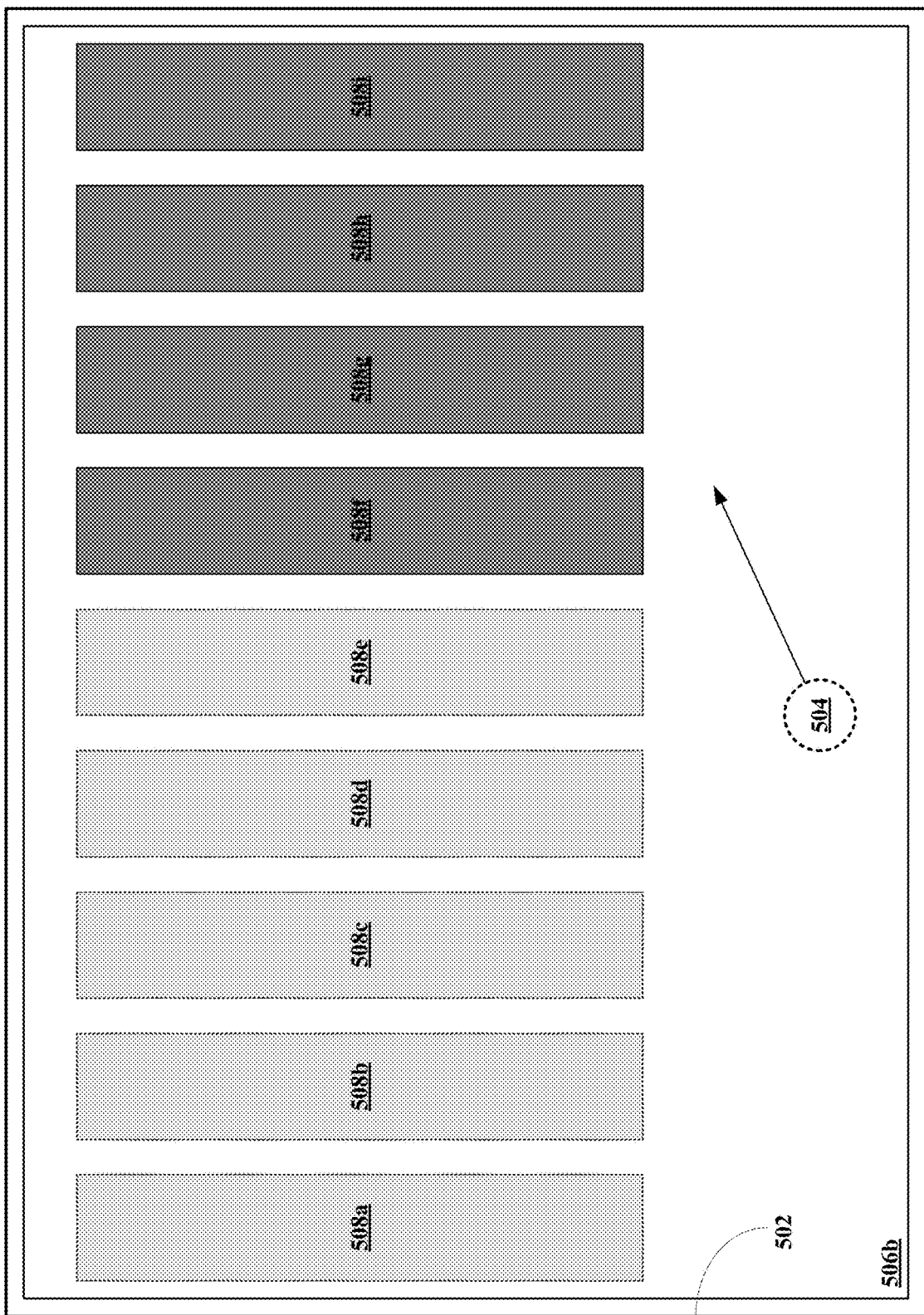
Figure 5H:
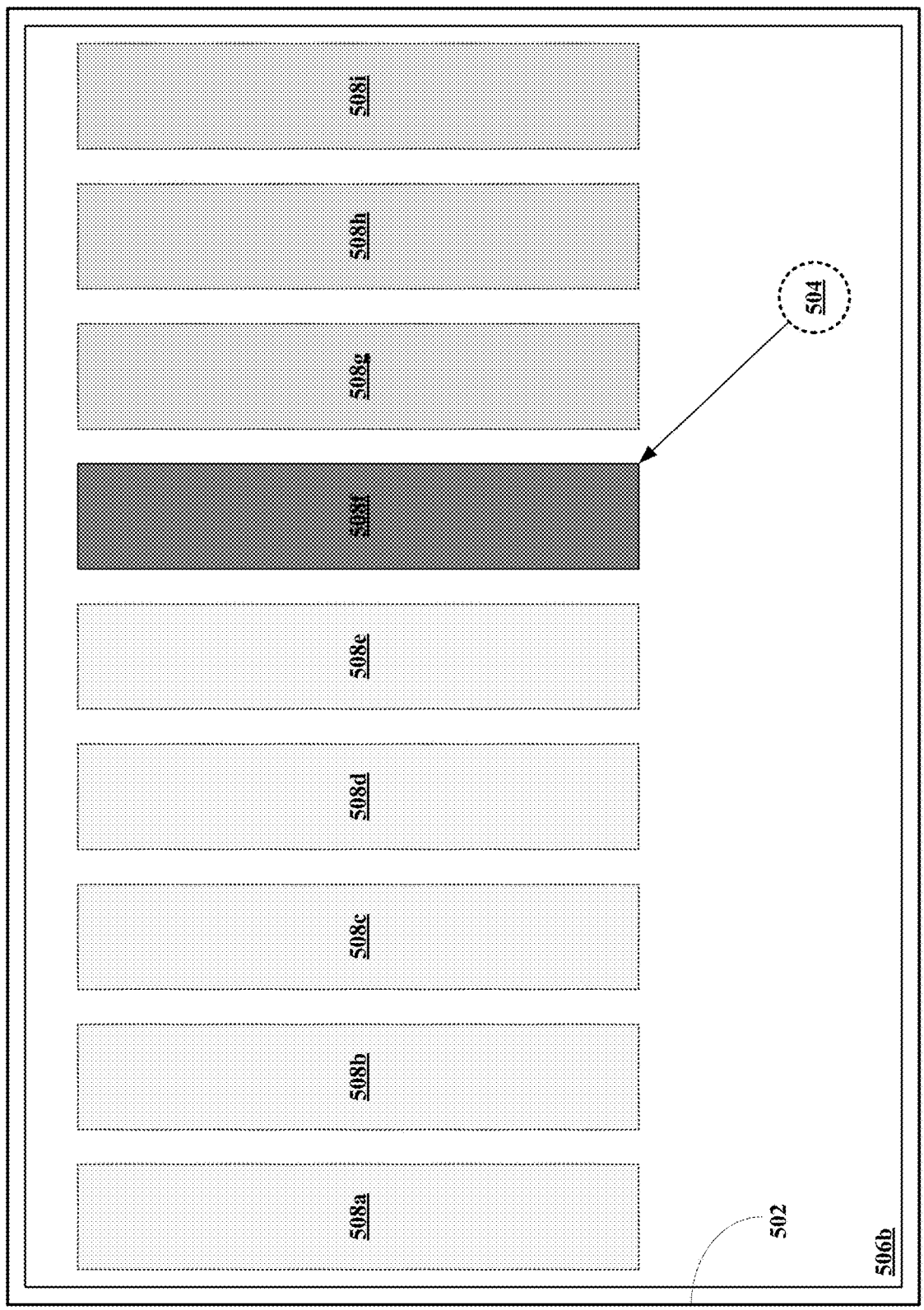
Figure 51:
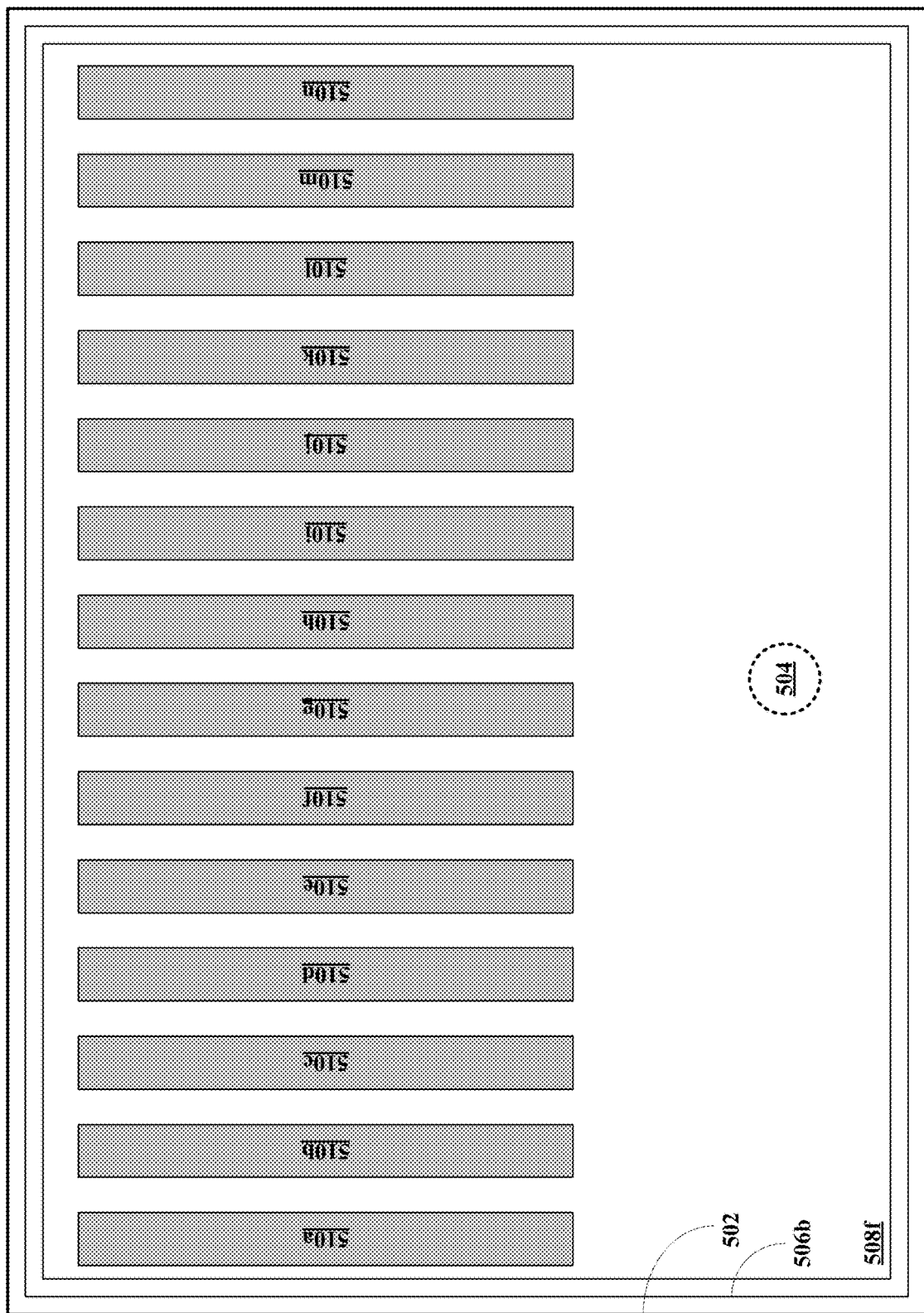
Figure 5J:
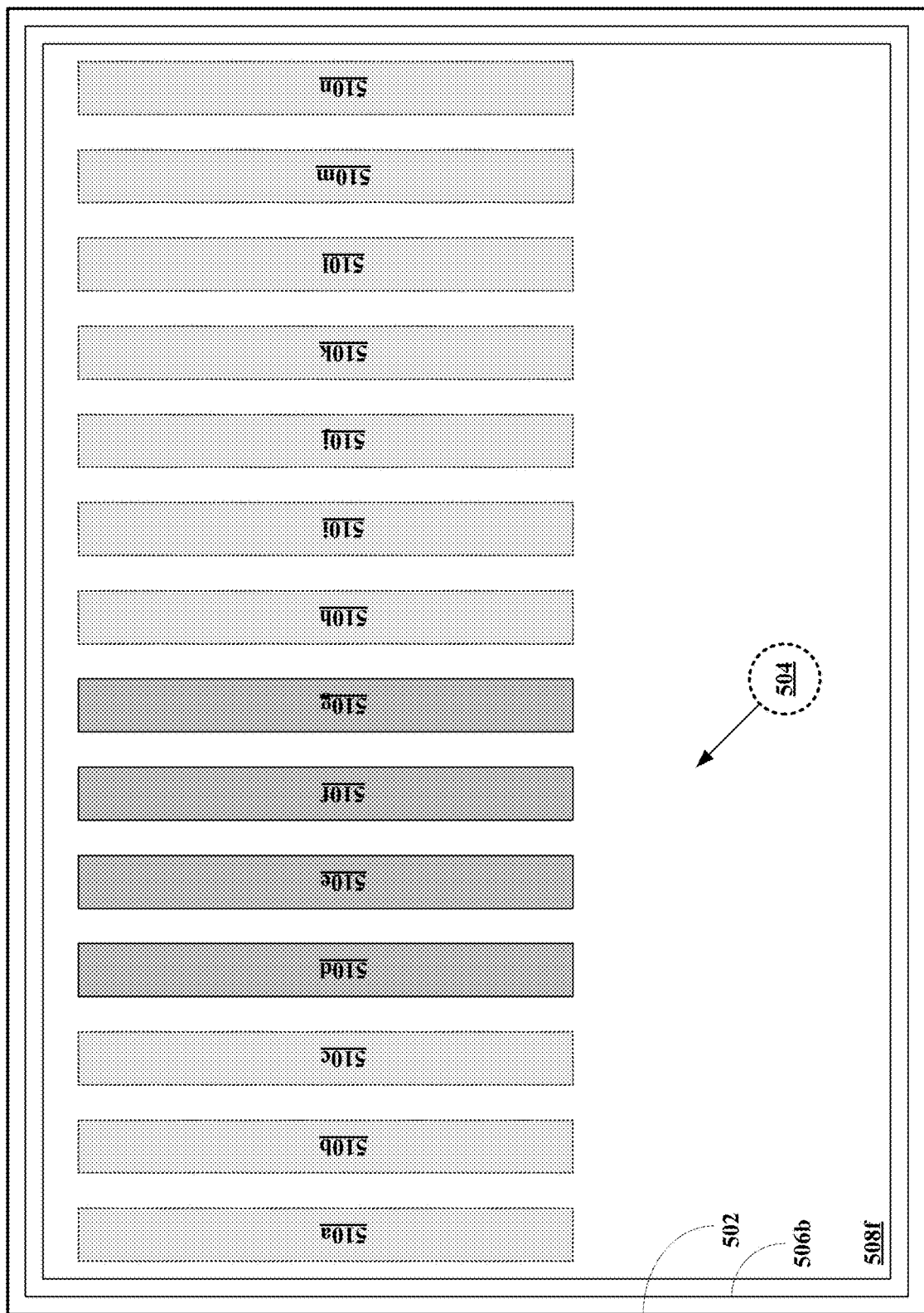
Figure 5K:
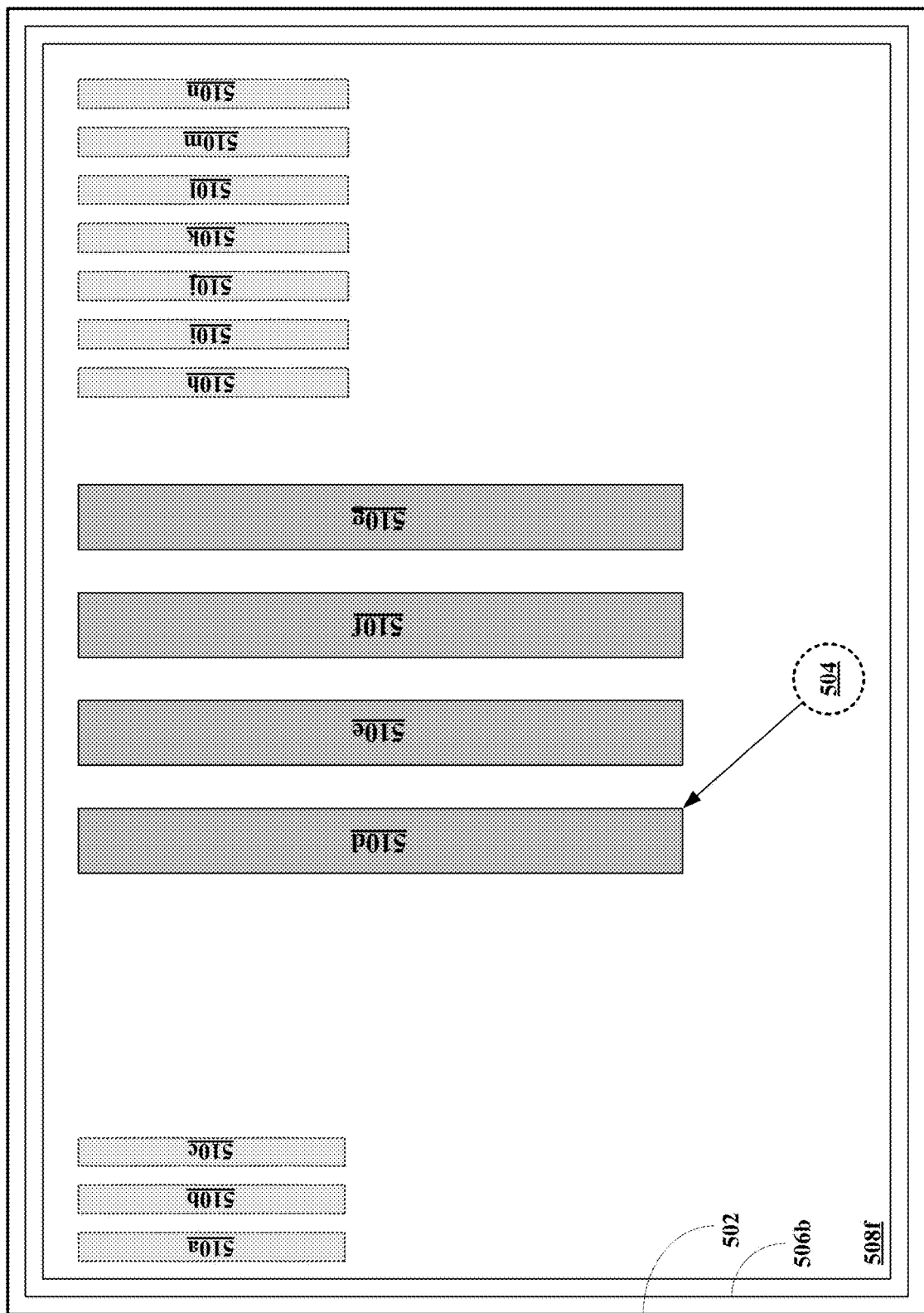
Figure 5L:
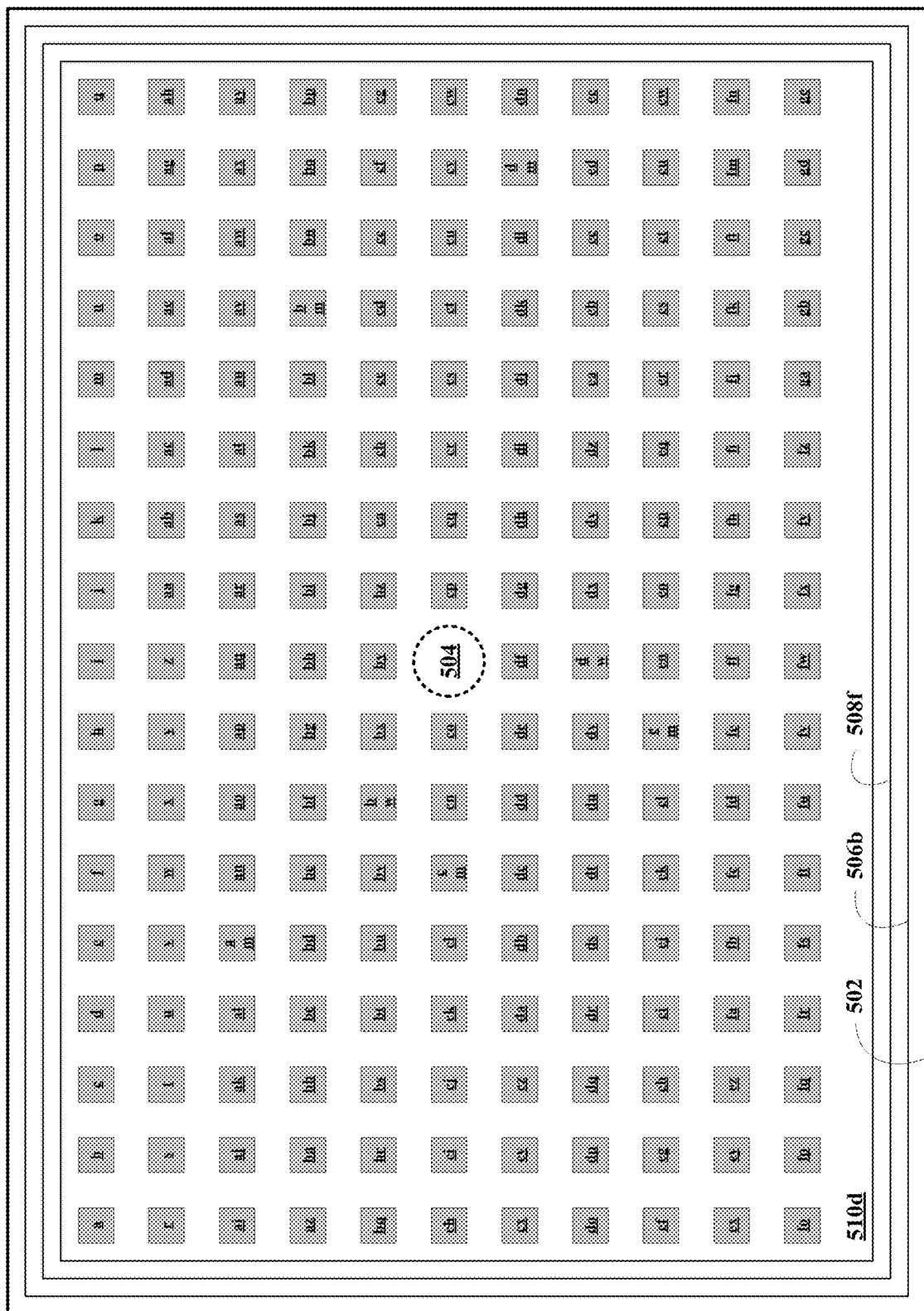
Figure 5M:
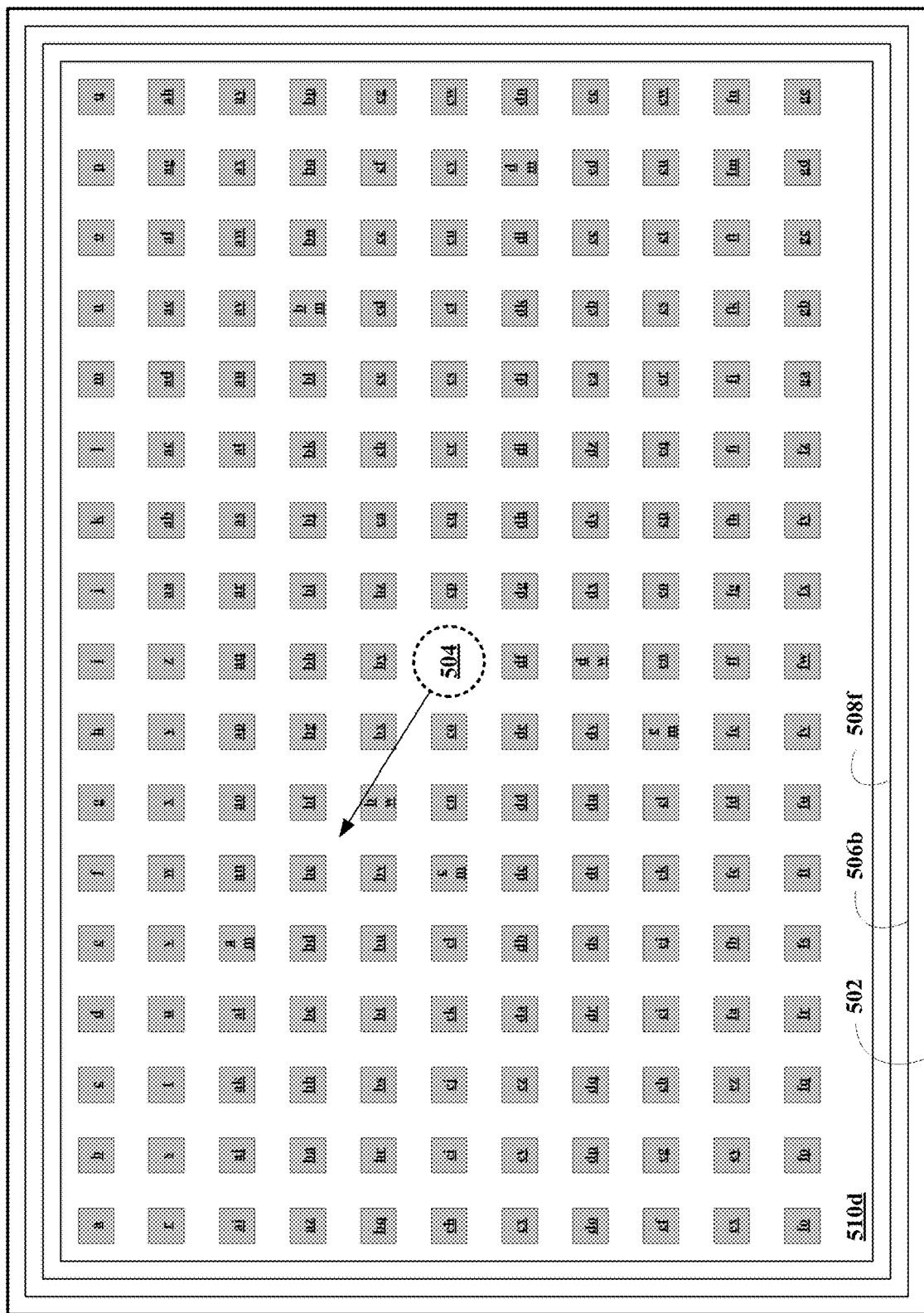
Figure 5N:
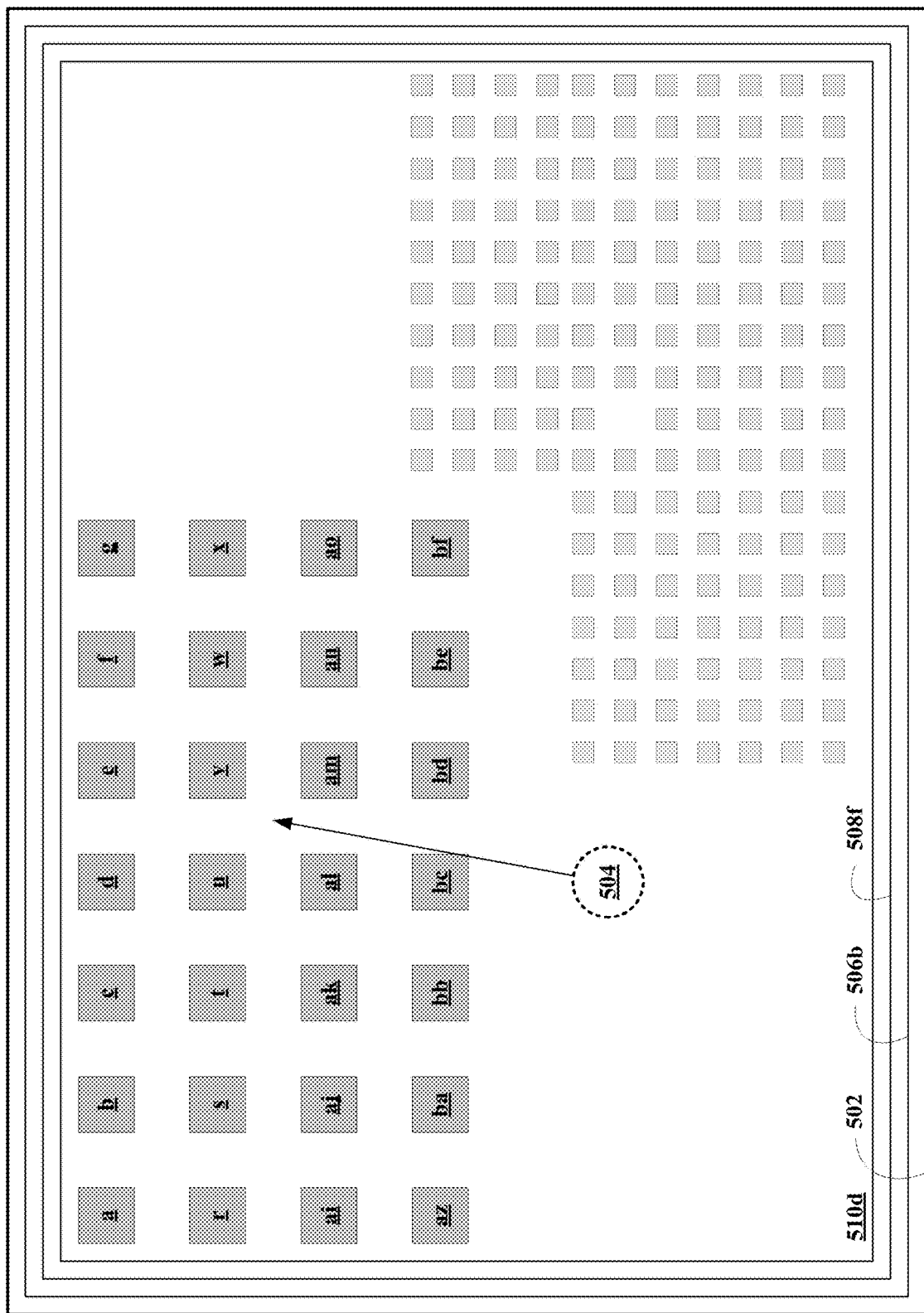
Figure 50:
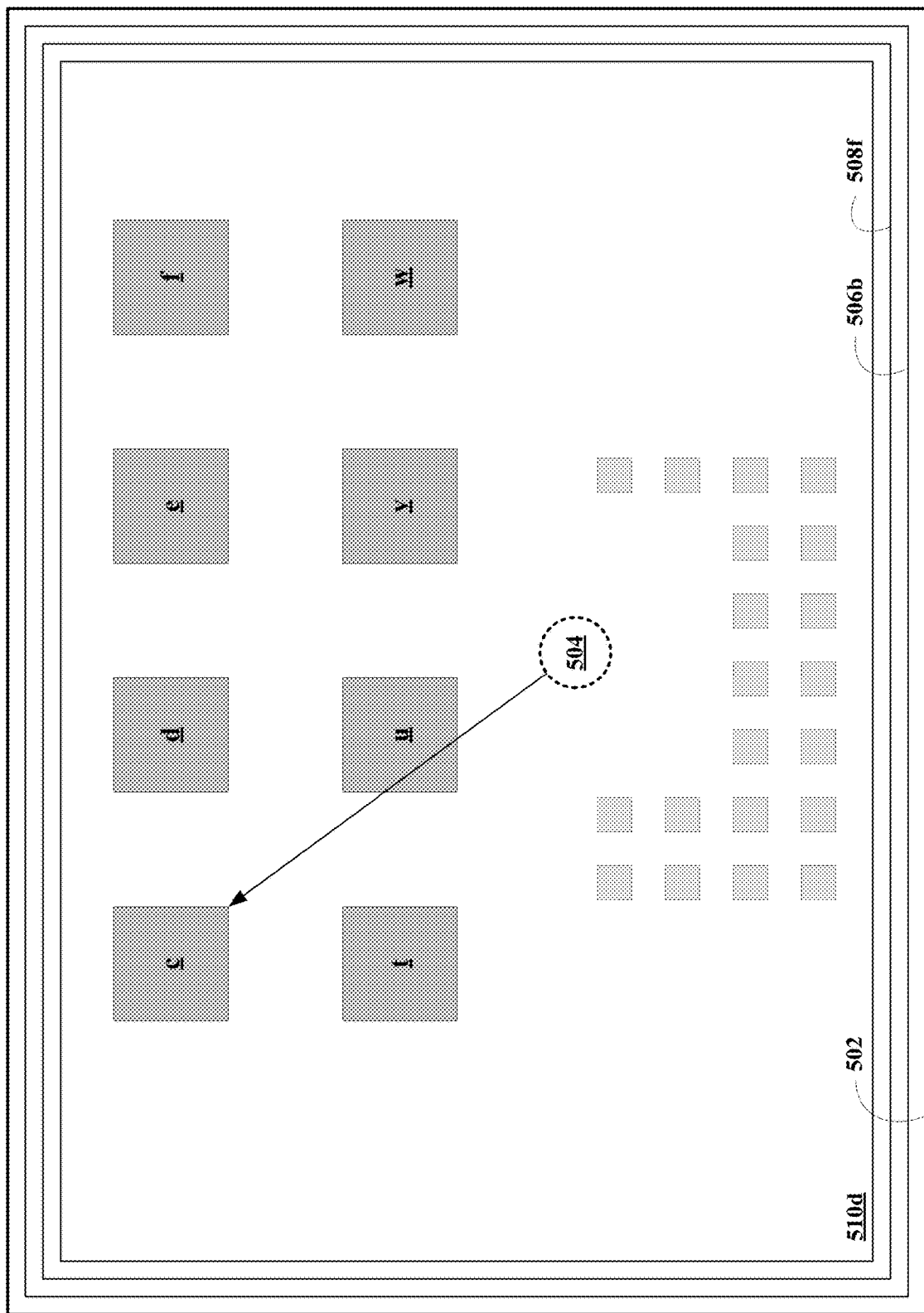
Figure 5P:
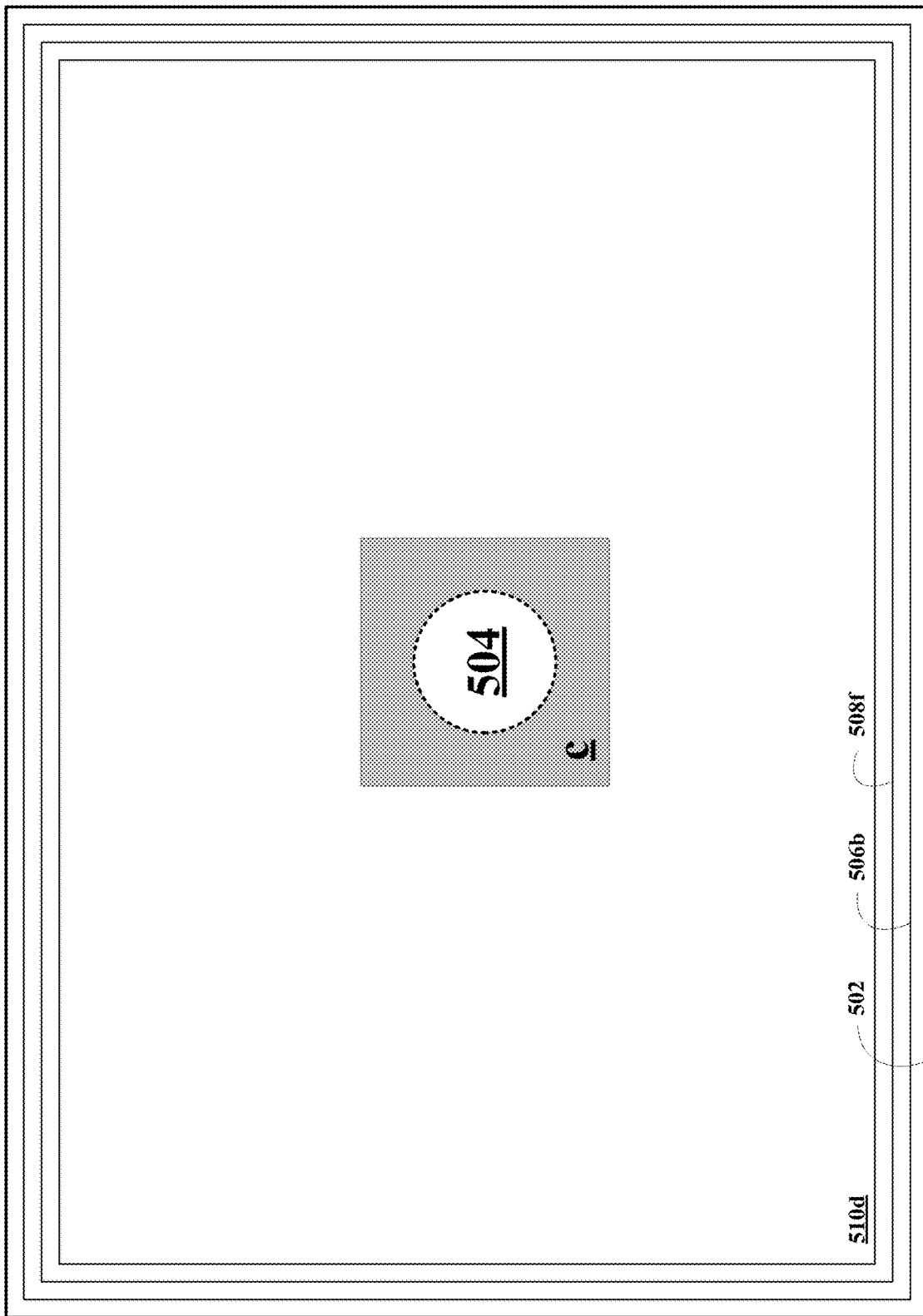

Referring now to FIGS. 5A-P, a process of this invention is shown to context with a virtual store including primary selectable "isles". While the virtual store is represented in 2D, it should be clear that 3D and higher dimensional analogues are equally enabled, where high dimension would be constructed of object that are 3D in nature but are presented by selectable 2D objects. 4D systems may be presented by 3D selectable objects that change in color or change some other attribute on a continuous or discrete basis.

Fifth Method and System Embodiments

Looking at FIGS. 5A&B, a display, generally 500, is shown to include a display area 502, and is shown in its sleep or inactive state. Once activated by touch, motion within an active zone or by another activation methodology such as sound, voice, claps, or the like, the display area 502 is shown to include a selection object 504 (which may be visible or invisible—invisible here) and a plurality of selectable object or isles 506a-i.

Looking at FIGS. 5C-E, movement of the selection object 504 towards the left side of the display 502 causes isles 506a-d to enlarge and move toward the selection object 504, while isles 506e-i to shrink and move away from the selection object 504. Although these figures show selectable objects aligned with the direction of movement to enlarge and move toward the selection object 504 and selectable objects not aligned with the direction of movement to shrink and move away from the selection object 504, each set of objects may also be highlighted as then enlarge or faded as they recede. Additionally, the speed of the movement may result in the enhancement of the enlargement and movement towards of the aligned objects making them appear to accelerate towards the selection object 504, while simultaneously enhancing the movement away and fading of the non-aligned objects. As the movement continues, discrimination between the aligned isles 506a-d clarifies until the movement permits sufficient discrimination to select isle 506b, which may move and/or accelerate toward the selection object 504 shown here as being enlarged in size as the non-aligned are reduced in size and move away. Of course, the isles 506b may be highlighted as the isles 506a, 506c, and 506d. It should be recognized that all this selection discrimination occurs smoothly and not disjointed as represented in these figures. Moreover, the discrimination may also be predictive both from a mathematical and vector analysis framework and/o based on user specific movement characteristics and prior selection histories. Based on mathematics and vector analysis and user history, the level of predictability may be such that selection is much more immediate. Additionally, as the interface learn more and more about a user's preferences and history, the interface upon activation may bring up less choices or may default to a most probable choices.

Looking at FIGS. 5F-H, once the interface has determined the target isle, here isle 506b, either by direct contact of the selection object 504 with the isle 506b, by a proximity contact of the selection object 504 with the isle 506b, by a predictive selection of the isle 506b, or by a threshold event triggered by the selection object 504 moving toward the isle 506b, the display 502 opens up to selectable objects associated with the isle 506b including subisles 508a-i. In this embodiment, the subisles 508a-i do not become visible until and selection of the isle 506b was made, however, in other embodiments, as the selection of isle 506b becomes more certain and the other isles reduce and fade away, the display 502 may start displaying the subisles 508a-i or several layers of subisles (or subobjects or submenus) simultaneously, permitting movement to begin to discriminate between the subisles 508a-i. Movement to the right of the display 502 causes subisles 508f-i to be highlighted (darkened in this case), but not to move toward the selection object 504 or become enlarged, while subisles 508a-e to be dotted and faded instead of moving away from the selection object 504 and fading. Additional movement permits discrimination of 508f to be selected as evidence by the continued darkening of 508f and the continued fading of 508a-e and the start of fading 508g-i. In certain embodiments, no gravitational effect is implemented.

Looking at FIGS. 5I-J, once the interface has determined the target isle, here subisle 508f, either by direct contact of the selection object 504 with the subisle 508f, by a proximity contact of the selection object 504 with the subisle 508f, by a predictive selection of the subisle 508f, or by a threshold event triggered by the selection object 504 moving toward the subisle 508f, the display 502 opens up to selectable objects associated with the isle 508f including subsubisles 510a-n. In this embodiment, the subsubisles 510a-n do not become visible until the selection of the subisle 508f was made, however, in other embodiments, as the selection of subisle 508f becomes more certain and the other subisles reduce and fade away, the display 502 may start displaying the subsubisles 510a-n permitting movement to begin to discriminate between the subsubisles 510a-n. Movement to the left of the display 502 causes subsubisles 510d-g to be highlighted (darkened in this case), but not to move toward the selection object 504 or become enlarged, while subsubisles 510a-c and 510h-n to be dotted and faded instead of moving away from the selection object 504 and fading. Additional movement causes the subsubisles 510d-g to be enlarge and move toward the selection object 504, while the subsubisles 510a-c and 510h-n move away from the selection object 504 and fade. The additional movement also permits discrimination and selection of subsubisle 510d.

Looking at FIGS. 5L-P, once the interface has determined by the movement, either by direct contact of the selection object 504 with the subsubisle 510d, proximity contact of the selection object 504 with the subsubisle 510d, or predictive selection of the isle 510d, the display 502 opens up to selectable objects associated with the subsubisle 510d including items a-ge. In this embodiment, the items a-ge do not become visible until and selection of the subsubisle 510d was made, however, in other embodiments, as the selection of subsubisle 510d becomes more certain and the other subisles reduce and fade away, the display 502 may start displaying the items a-ge permitting movement to begin to discriminate between the items a-ge. As seen in FIGS. 5M-P, the items a-ge are distributed on a standard grid pattern around the selection object 504. Of course, the items a-ge may be distributed in any pattern in the display 502 such as circularly or arcuately distributed about the selection object 504. Movement to the left of the display 502 causes items a-g, r-x, ai-ao, and az-bf to be highlighted (darkened in this case), enlarged and pulled towards the selection object 504, while the items h-q, y-ah, ap-ay, bg-bp, and bq-ge recede from the selection object 504 are reduced in size and faded. Additional movement permits discrimination of the items a-g, r-x, ai-ao, and az-bf, where the additional movement refines the potential selection to items c-f and t-w. The next movement permits selection of item c, which results in the selection object 504 and the item c merged in the center of the display 502. As is shown in FIGS. 5A-PA-Q, each level of selection superimposes onto the display 502, the selection made.

The methodology depicted in FIGS. 5A-P is amenable to use in any setting, where the interface is part of applications associated with stores such as grocery stores, retails stores, libraries, or any other facility that includes large amounts of items or objects cataloged into categories. The applications using the interface is implemented simply by allowing movement to be used to peruse, shop, select, or otherwise select items for purchase or use. The applications may also be associated with computer systems running large number of software programs and large number of databases so that movement only will permit selection and activation of the software programs, selection and activation of databases, and/or the extraction and analysis of data within the databases, and may also be applicable to environmental systems, such as mechanical, electrical, plumbing, oil and gas systems, security systems, gaming systems and any other environment where choices are present.

In an array of objects, say a mobile smart phone, touching directly and lifting off opens the app currently (old technology and not ours), but by touching directly (in a specified way such as a "hold") on an object could cause the surrounding objects to move away and make room for the choices related to that object to appear (radially, arcuately, or in another fashion) with such menu items as "move" and "open", submenus or subobjects to be activated, or to directly control variable attributes, or scroll, etc. —whatever is associated with that item. Touching in an area, but not directly on an object, or touching and beginning to move immediately, would invoke the selection process described so well above. This specific point regarding the first action to be touching an object vs. moving towards an object and having its subobjects appear, possibly in several layers needs to be included, as we will incorporate it into our mobile controls in the near future.

Moreover, the software may be implemented to use any, some, or all of the above described methods, aspects, techniques, etc. In fact, the interface may be user tailored so that certain selection format used a specific aspect or a set of specific aspects of the invention, while other selections use other aspects or a set of other aspects. Thus, the interface may be tuned to by the user. Additionally, the interface may be equip with learning algorithms that permit the interface to tune itself to the user's preferred movement and selection modality so that the interface becomes attuned to the user permitting improved selection prediction, improved user conform, improved user functionality and improved user specific functionality.

Telephone Number Selecting

Figure 6A:
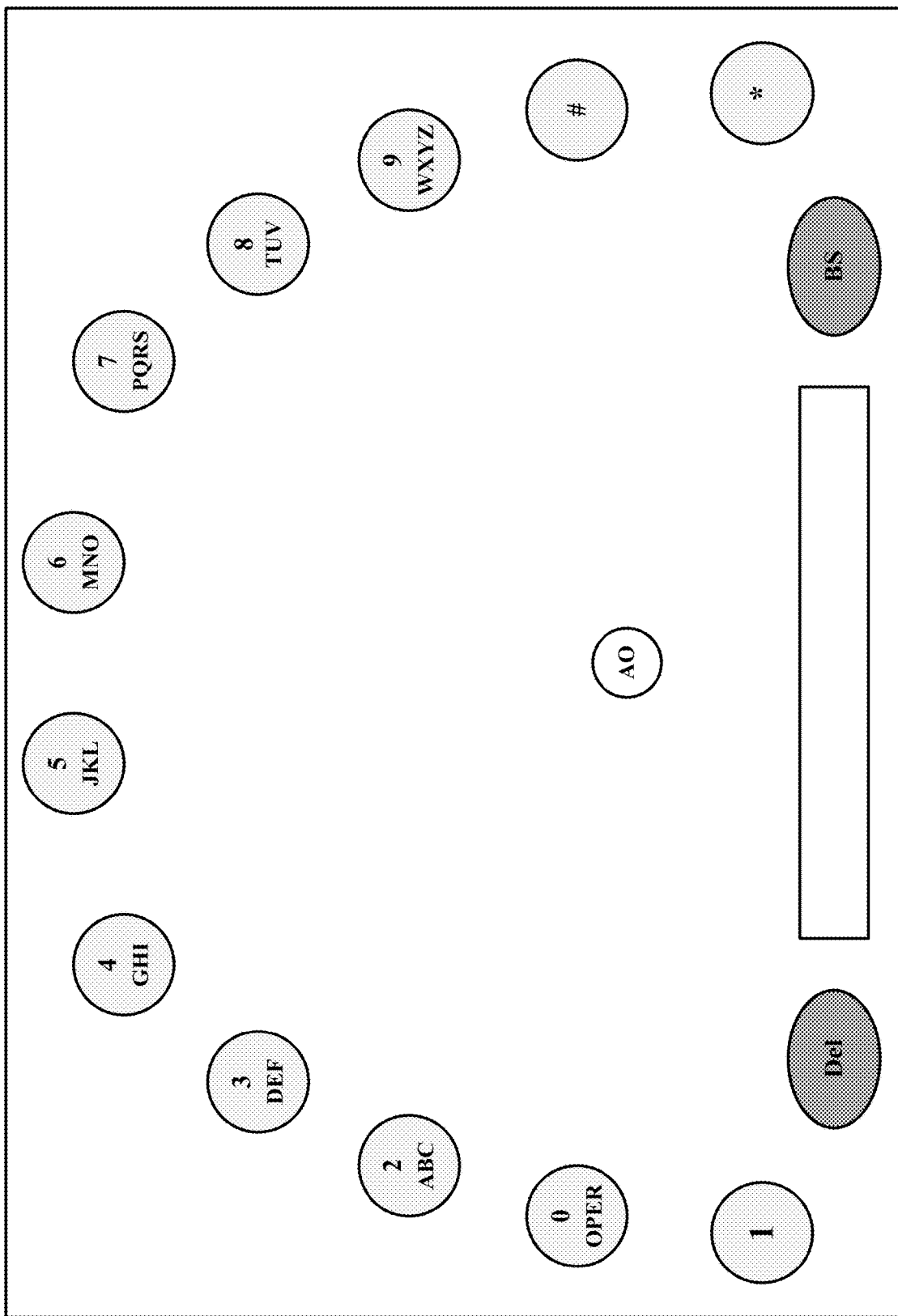
FIG. 6A depict a display prior to activation by motion of a motion sensor in communication with the display including an active object, a set of phone number objects, a backspace object (BS) and a delete object (Del) and a phone number display object.
Figure 6B:
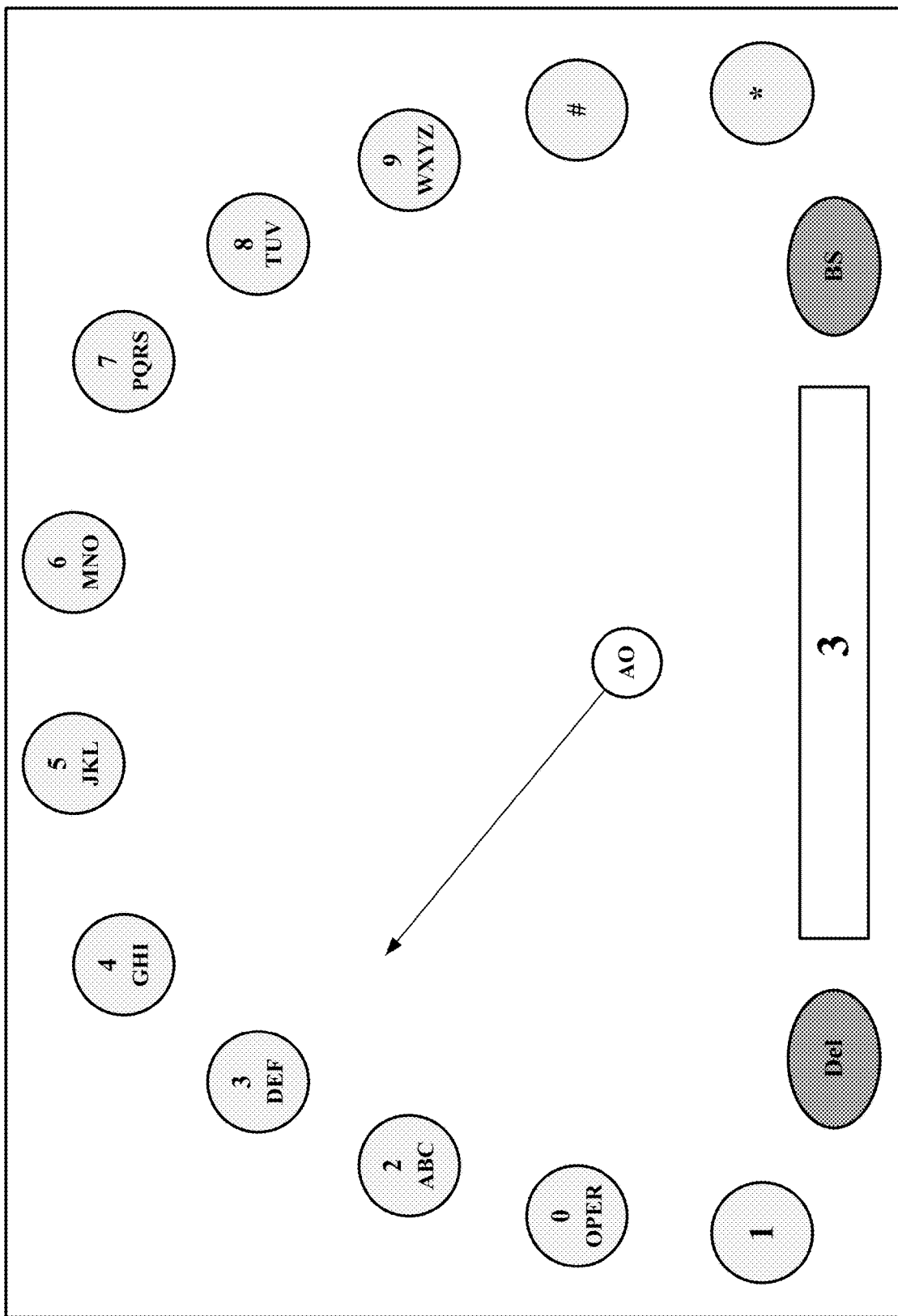
FIGS. 6B-K depict the selection of a phone number from the display via motion of the active object from one phone number object to the next without any selection process save movement.
Figure 6C:
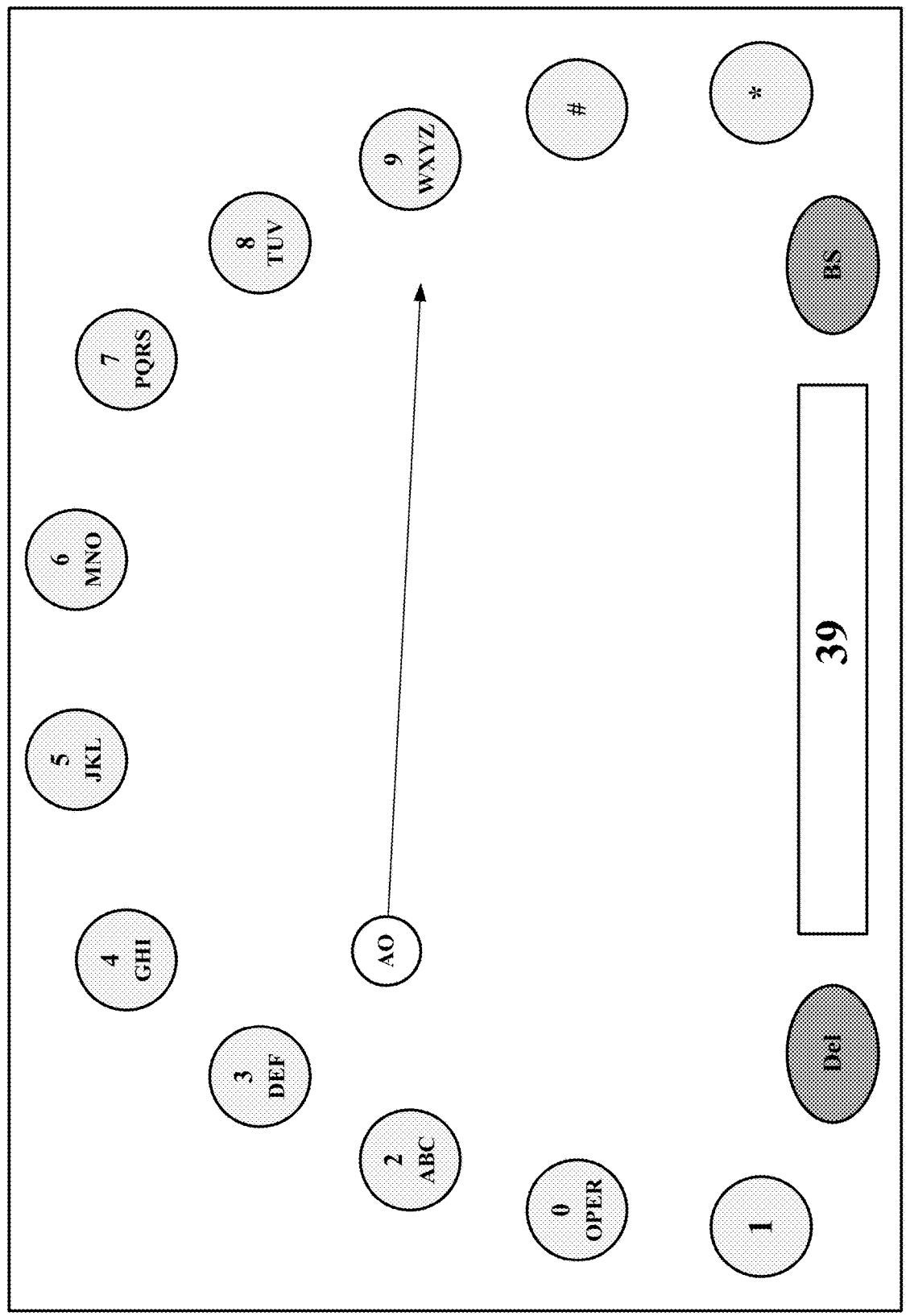
Figure 6D:
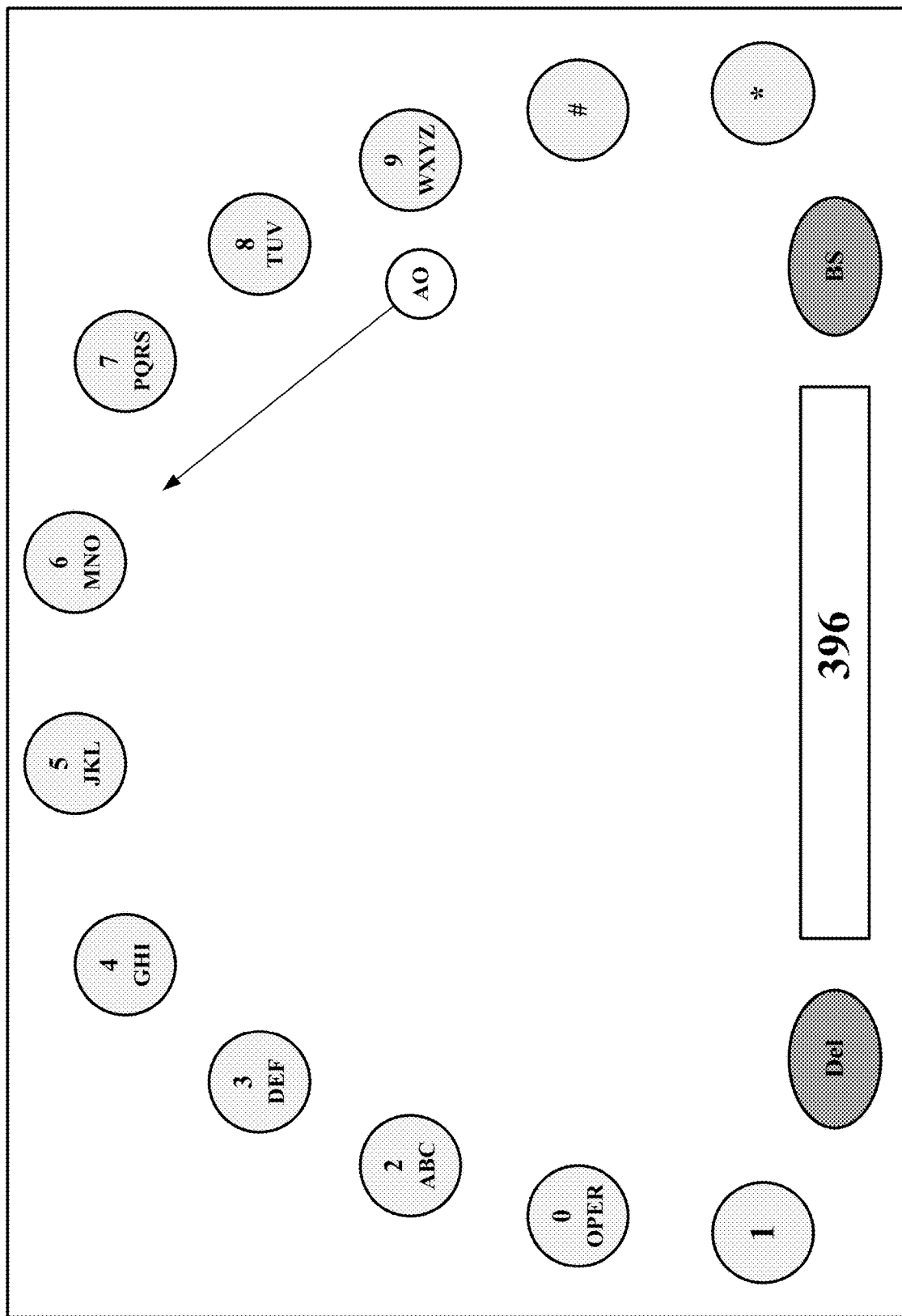
Figure 6E:
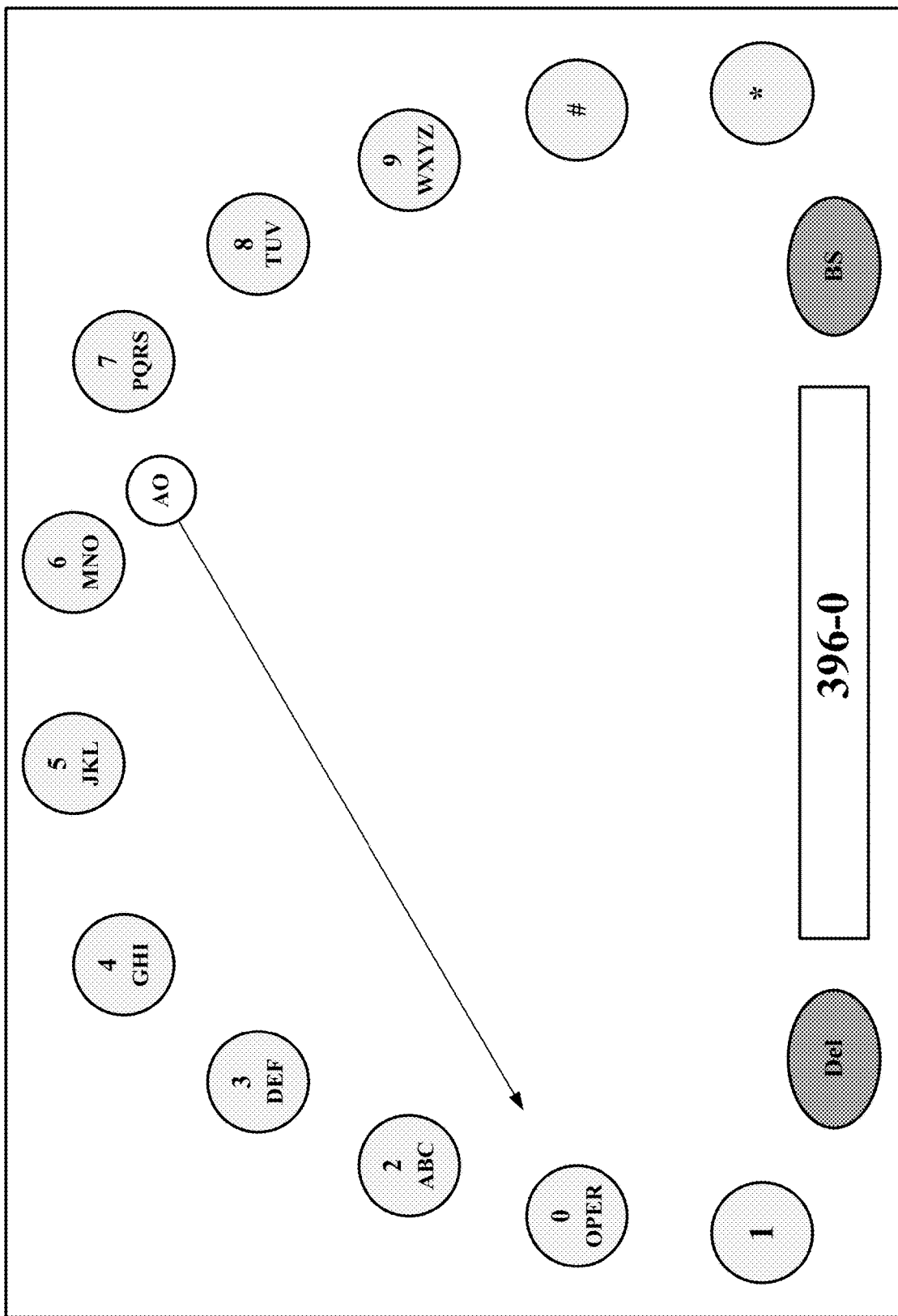
Figure 6F:
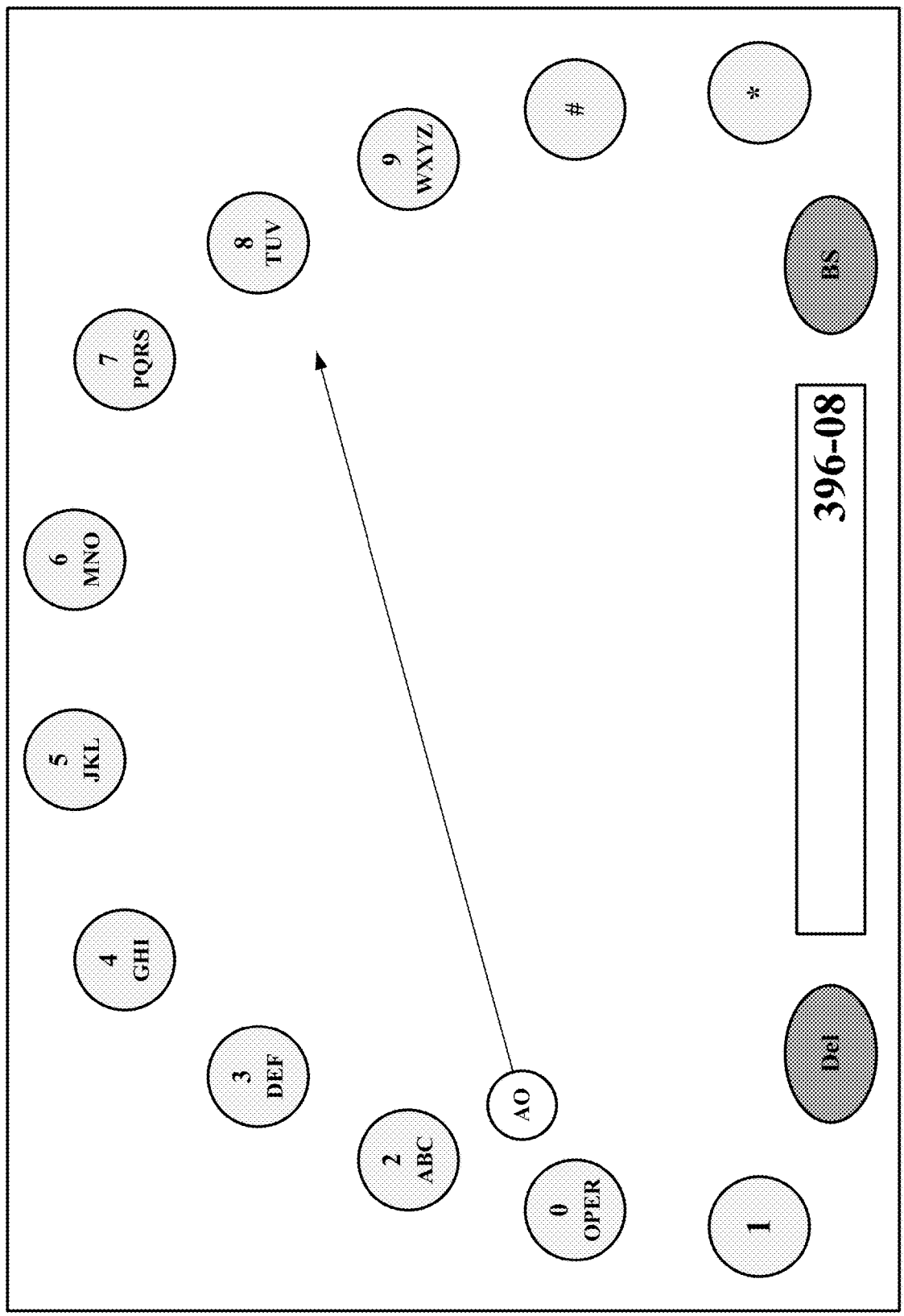
Figure 6G:
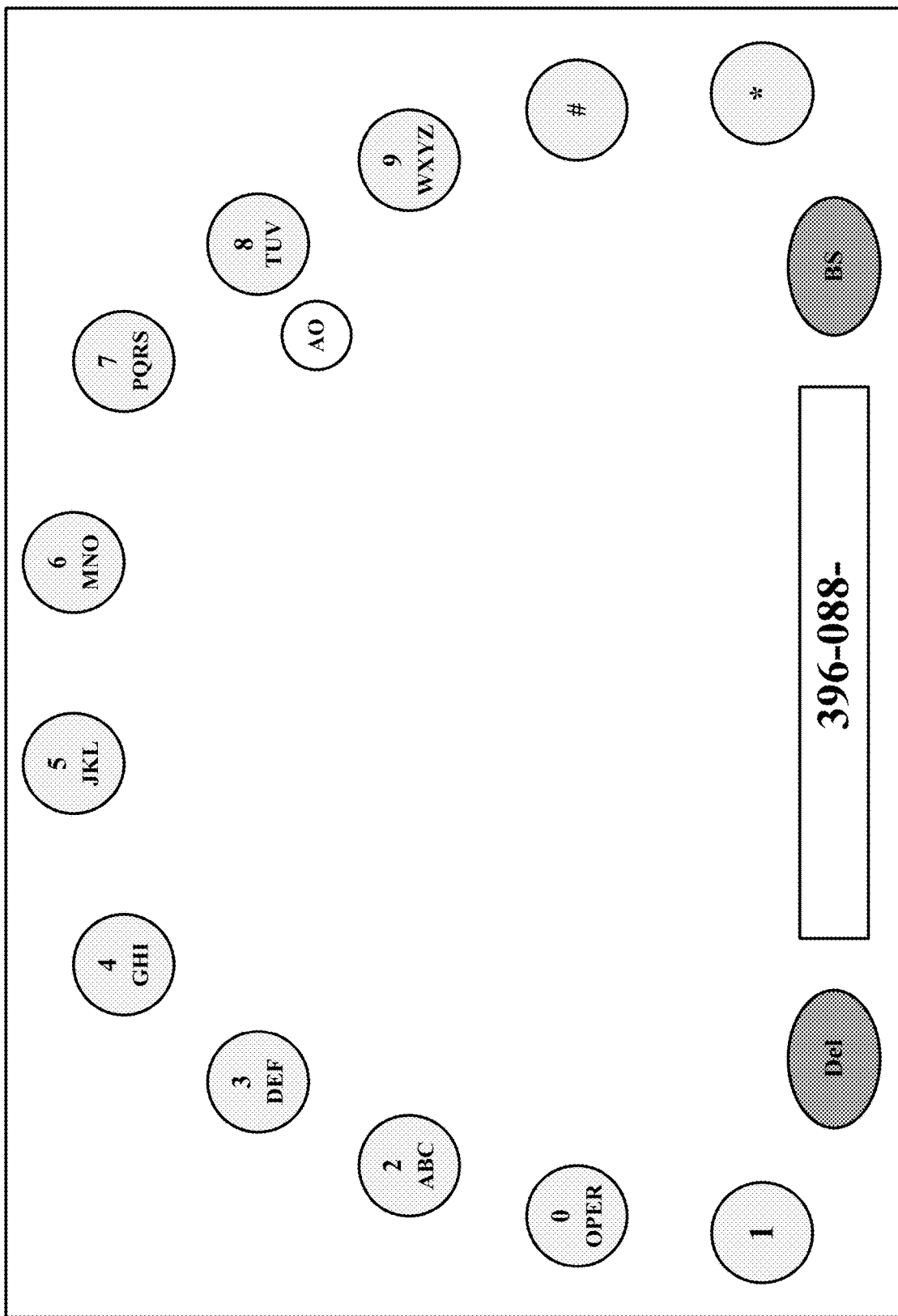

Referring now to FIG. 6A, a display is shown prior to activation by motion of a motion sensor in communication with the display. The display includes an active object AO, a set of phone number objects 0-9, * and #, a backspace object BS and a delete object Del and a phone number display object.

Figure 6H:
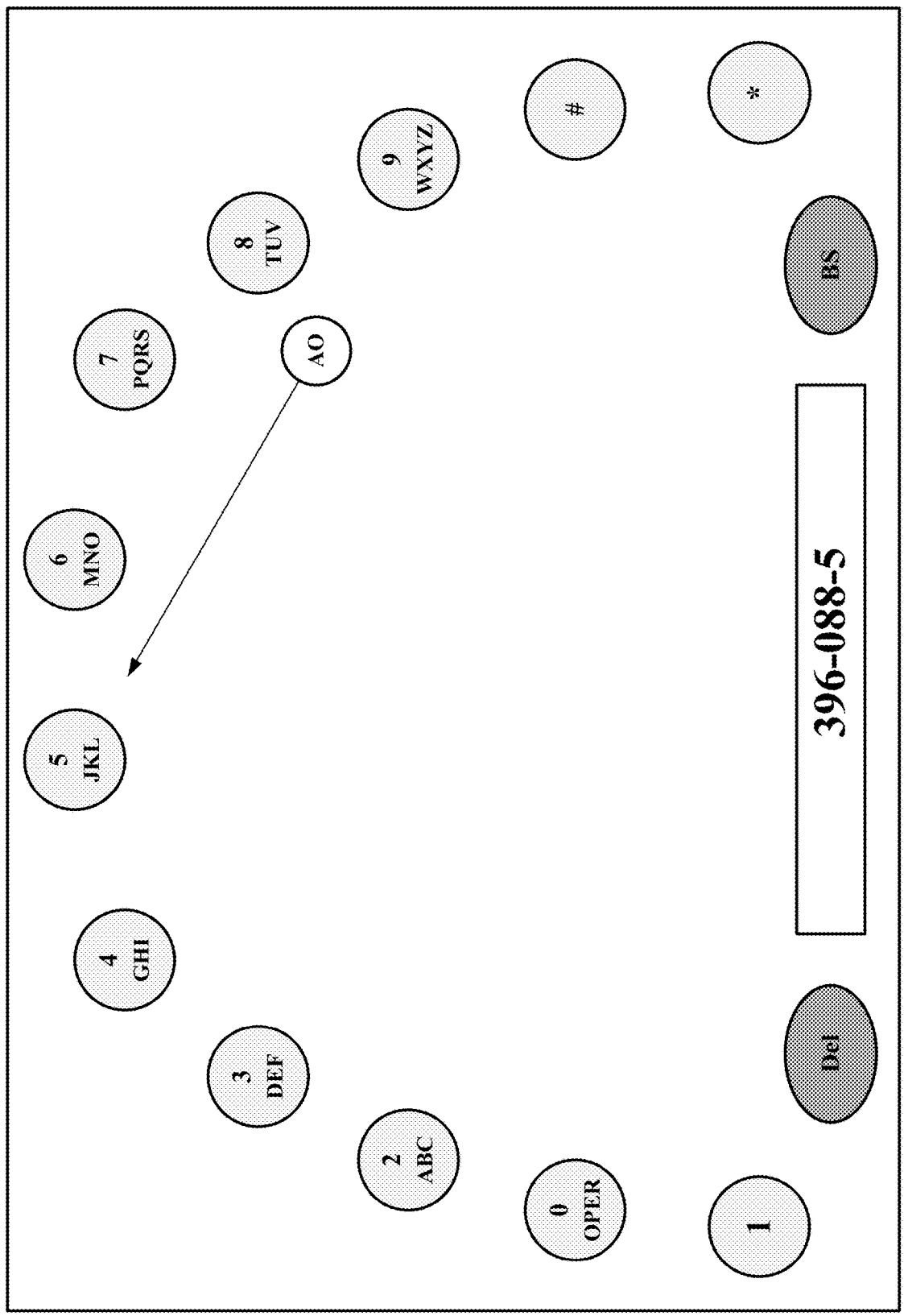
Figure 6I:
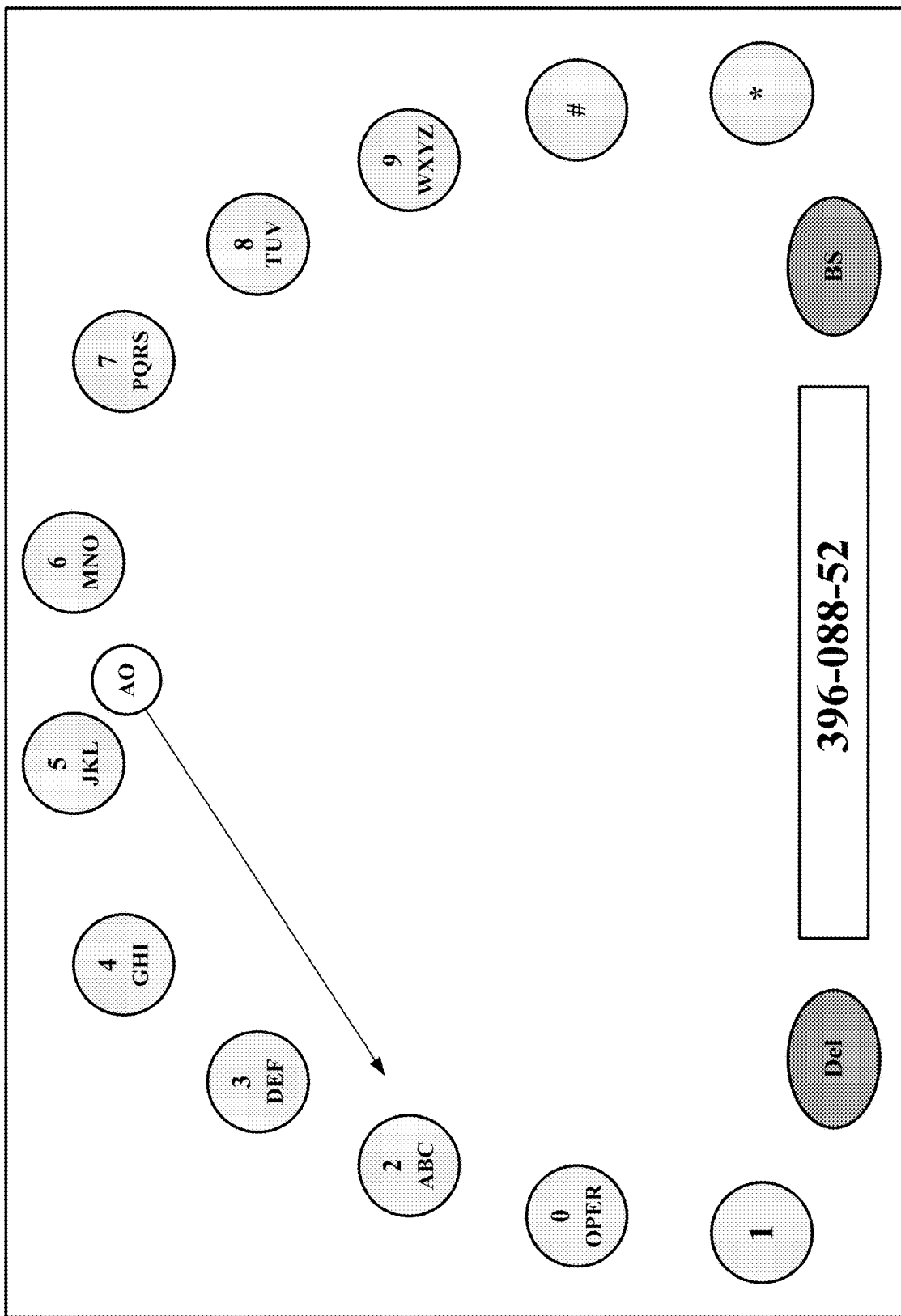
Figure 6J:
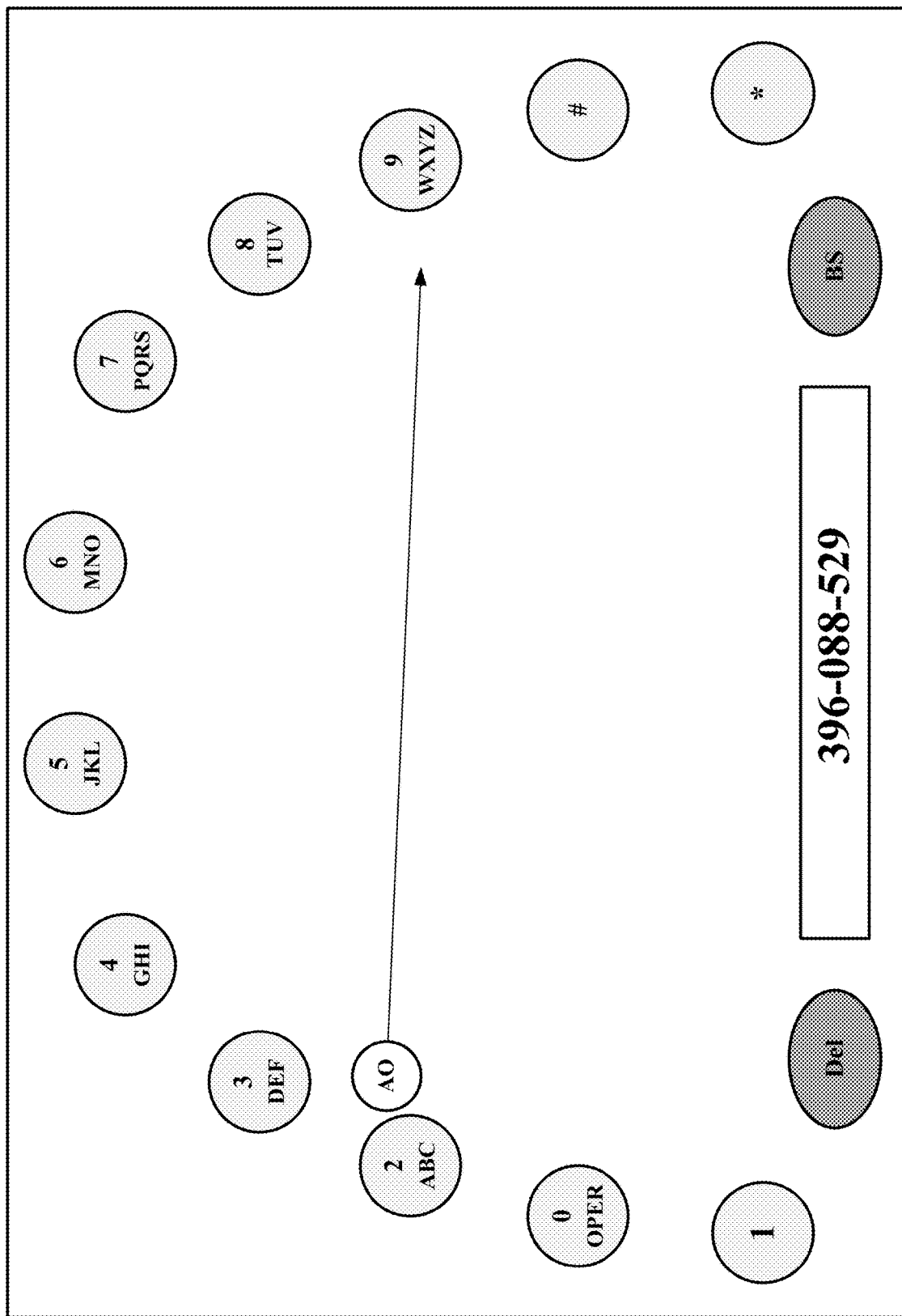
Figure 6K:
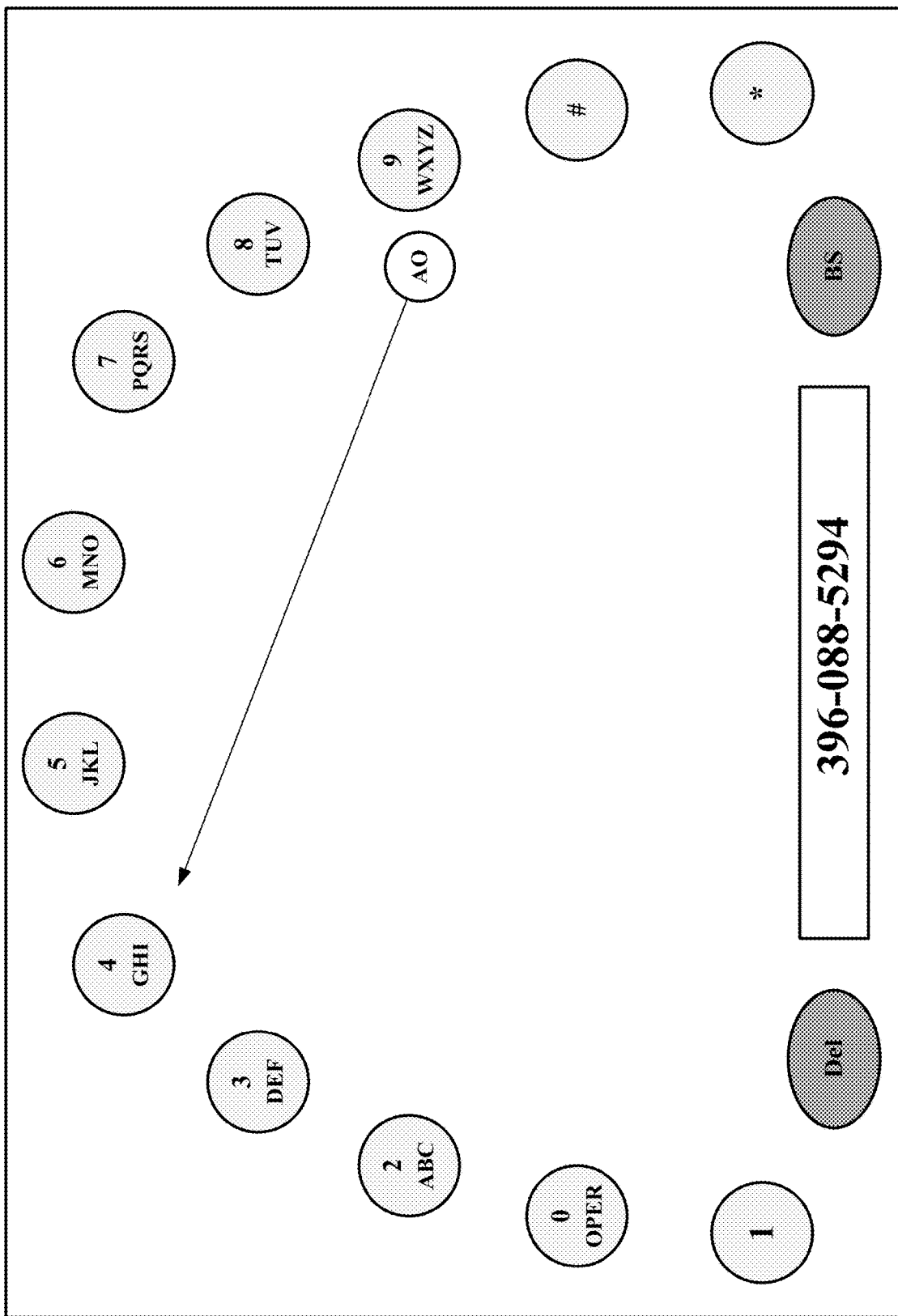
Figure 6L:
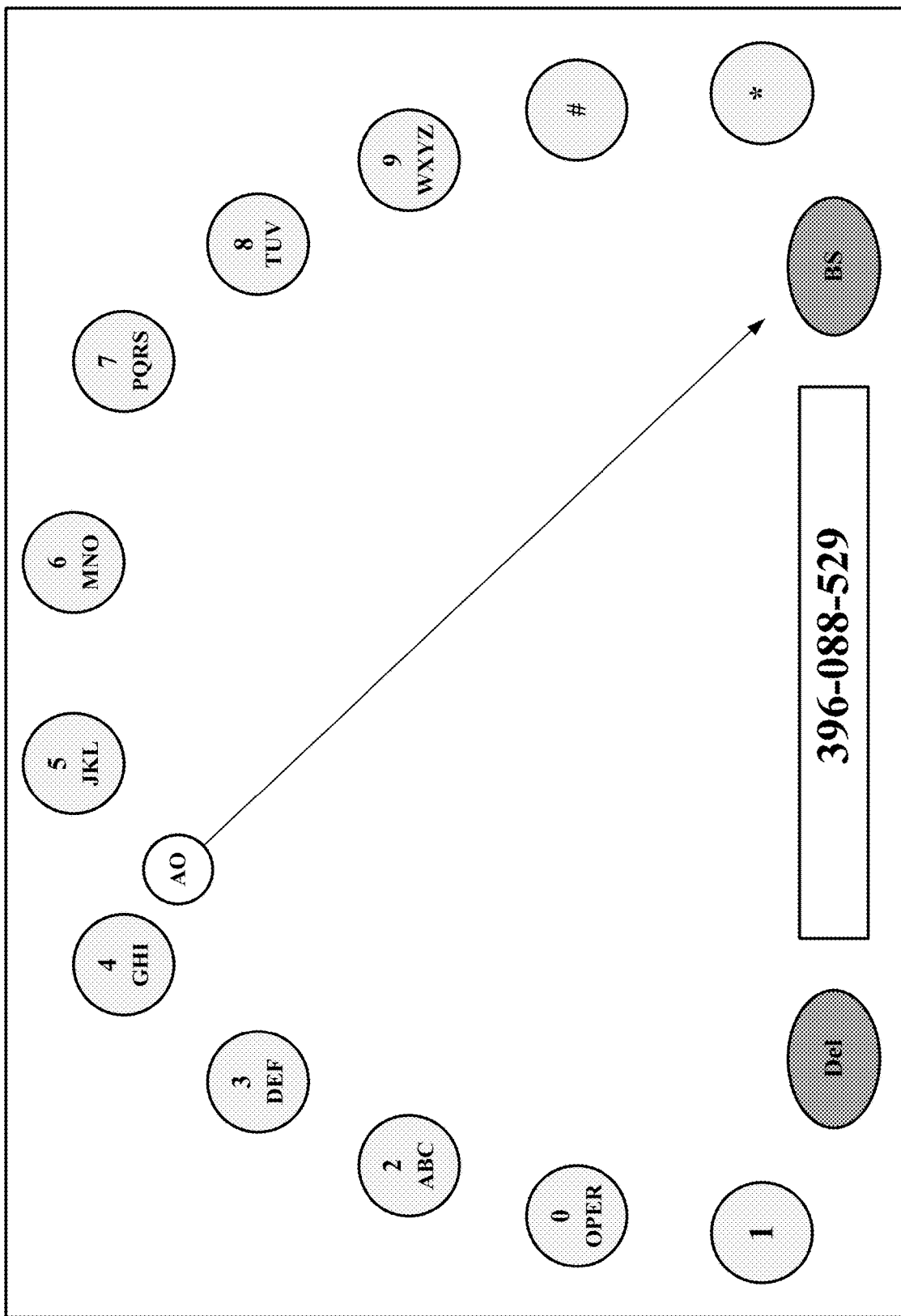
FIGS. 6L-R depict the used of the backspace object and the delete object to correct the selected phone number display after the selection object is moved toward a selectable object causing it to move toward the selection objects and causing subobjects associated with the attracted object.
Figure 6M:
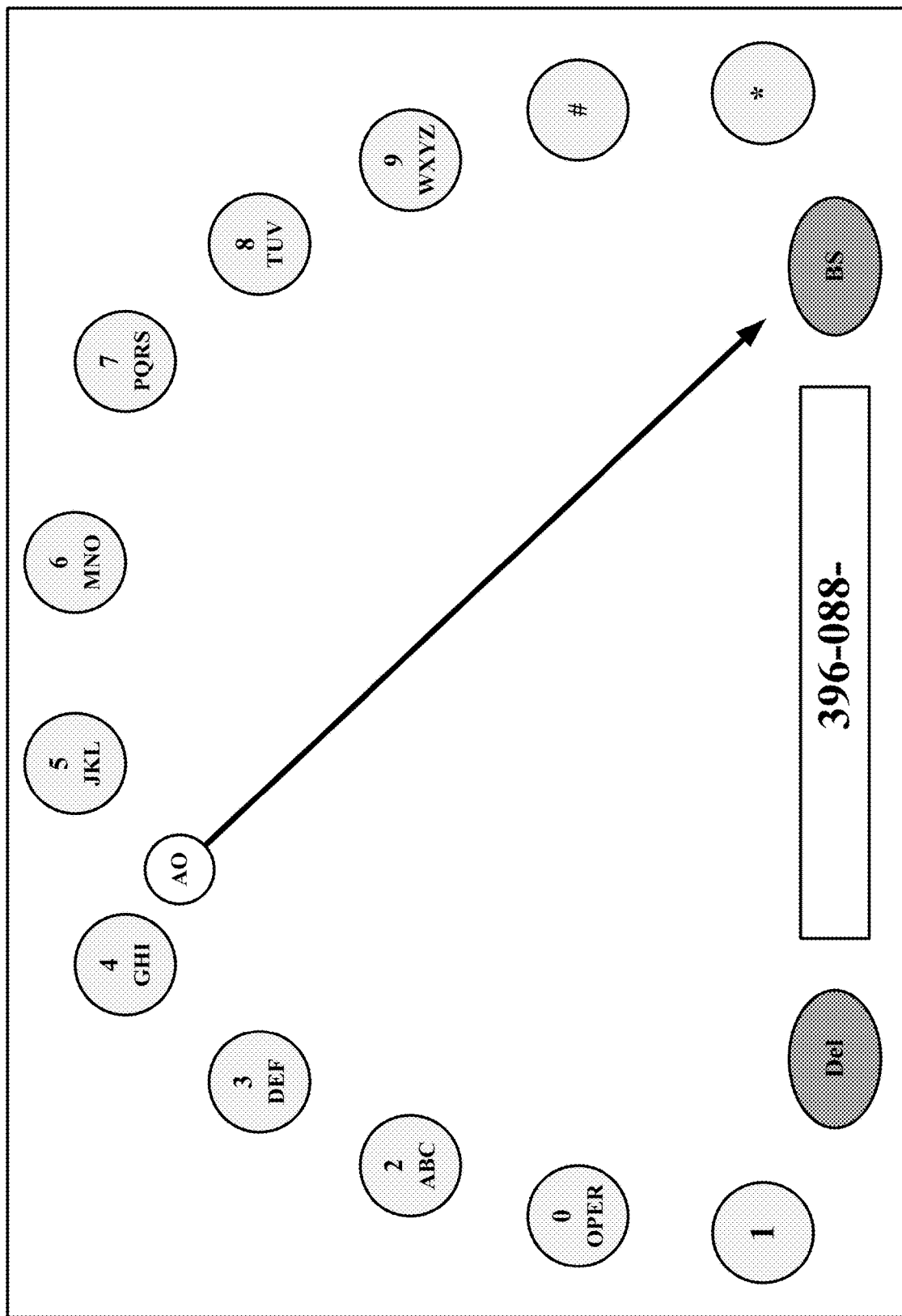
Figure 6N:
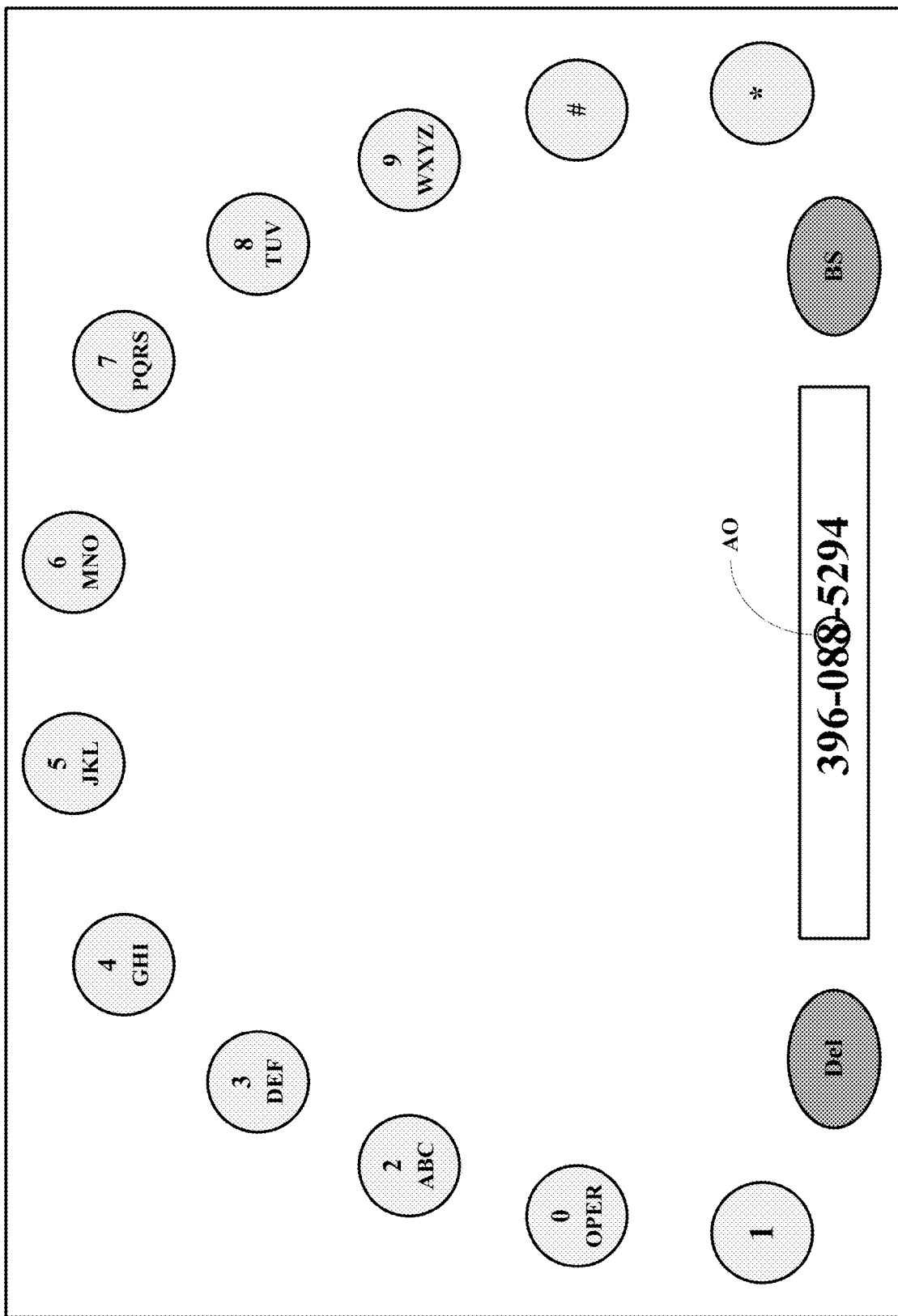
Figure 6O:
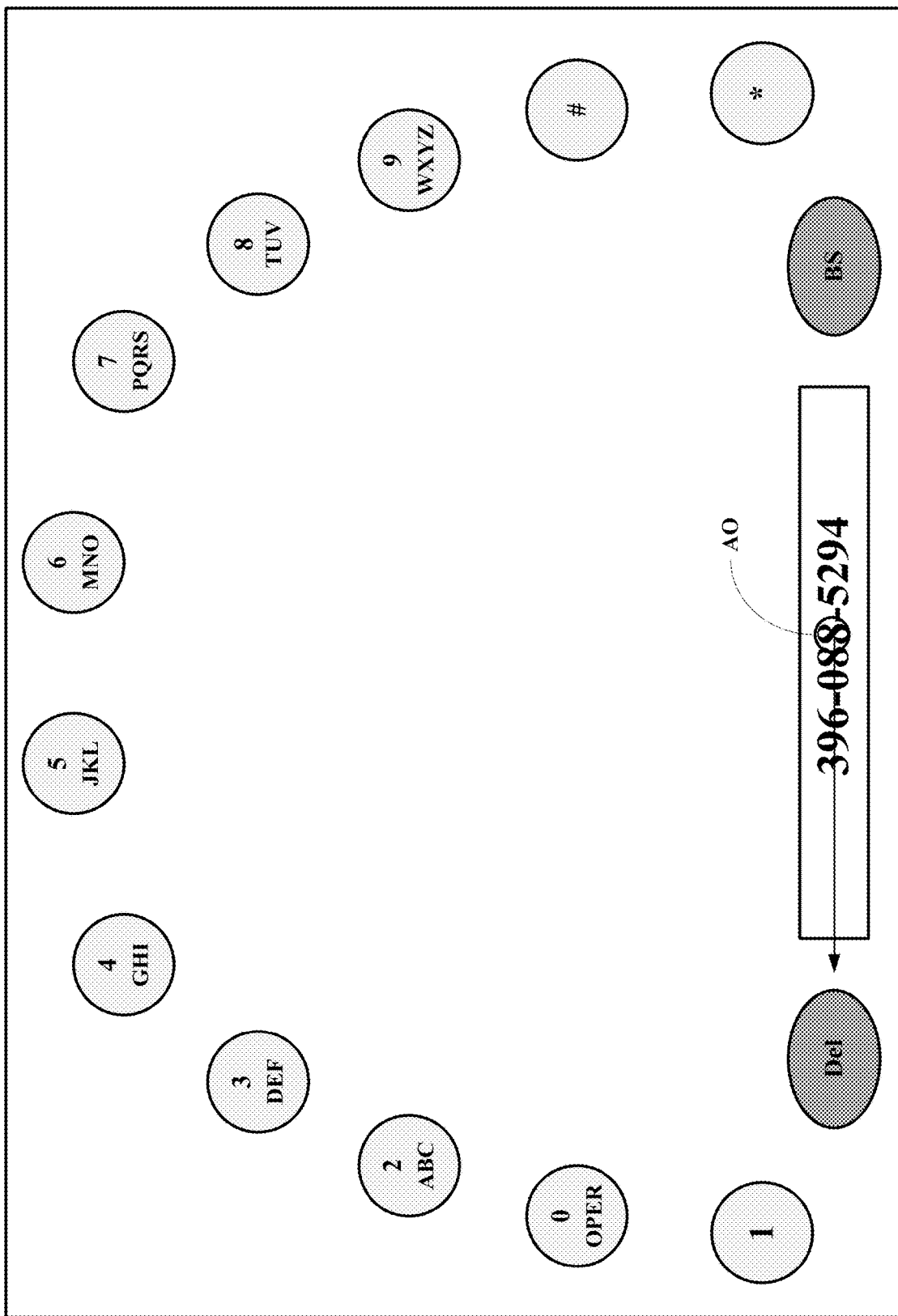
Figure 6P:
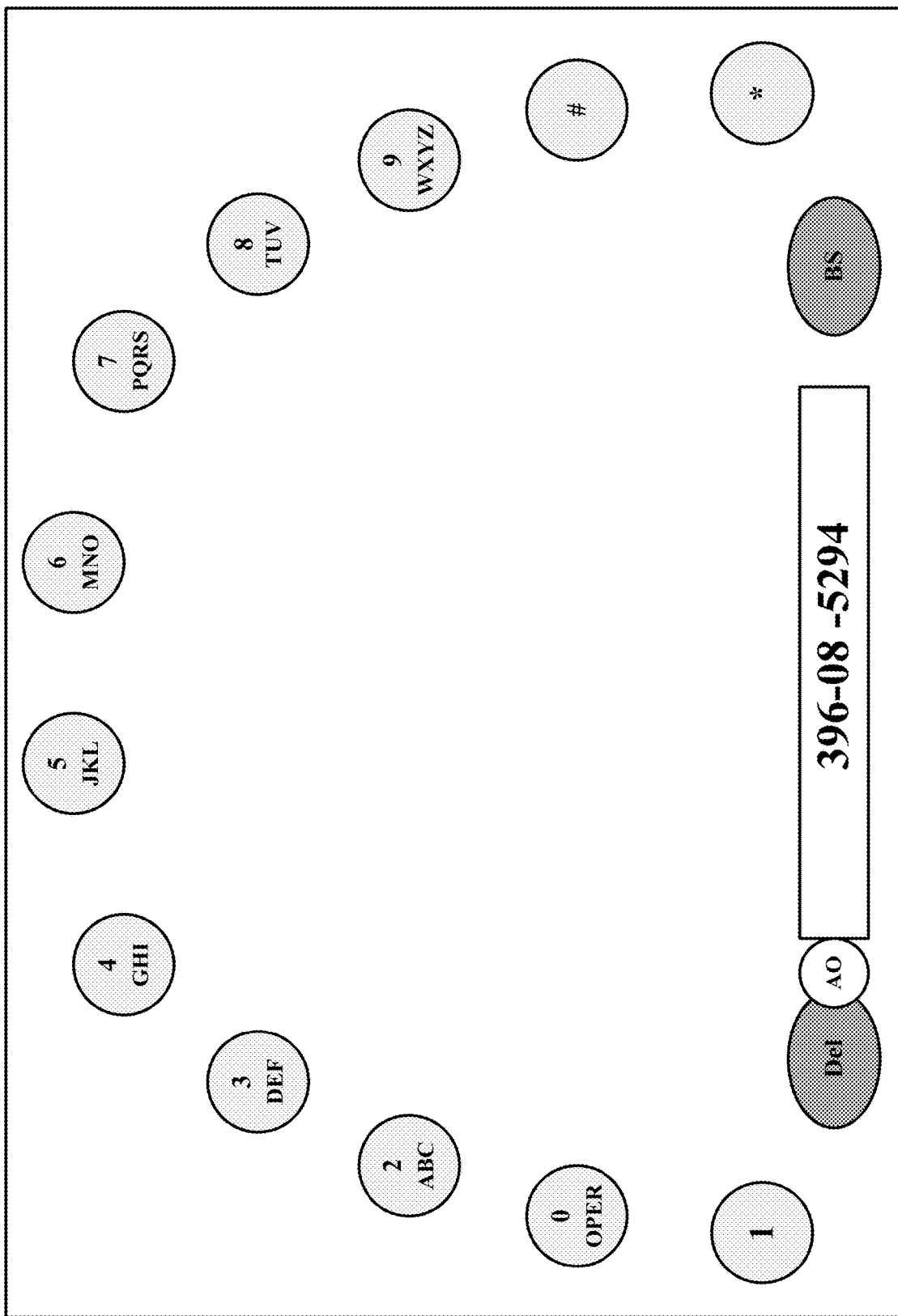
Figure 6Q:
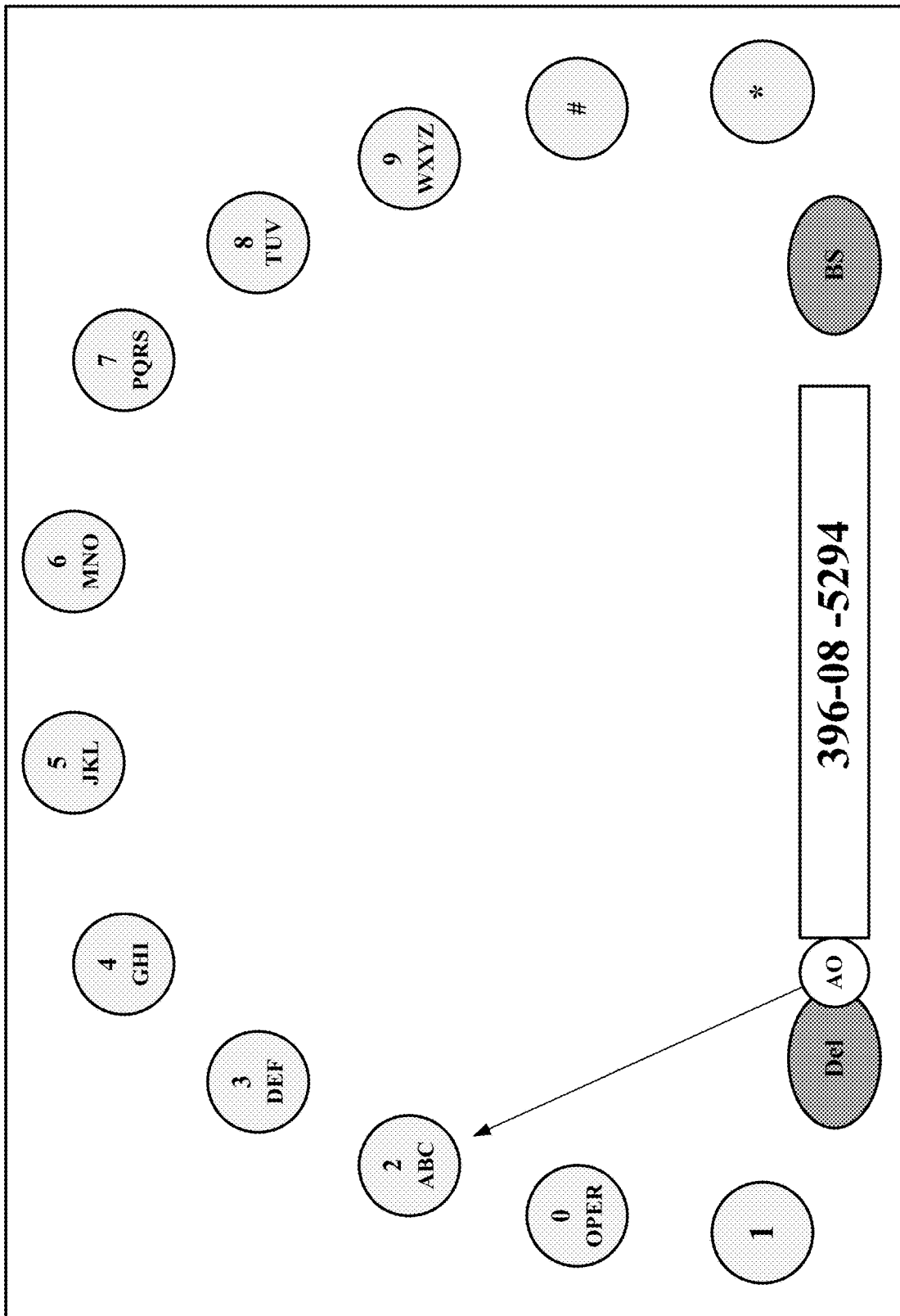
Figure 6R:
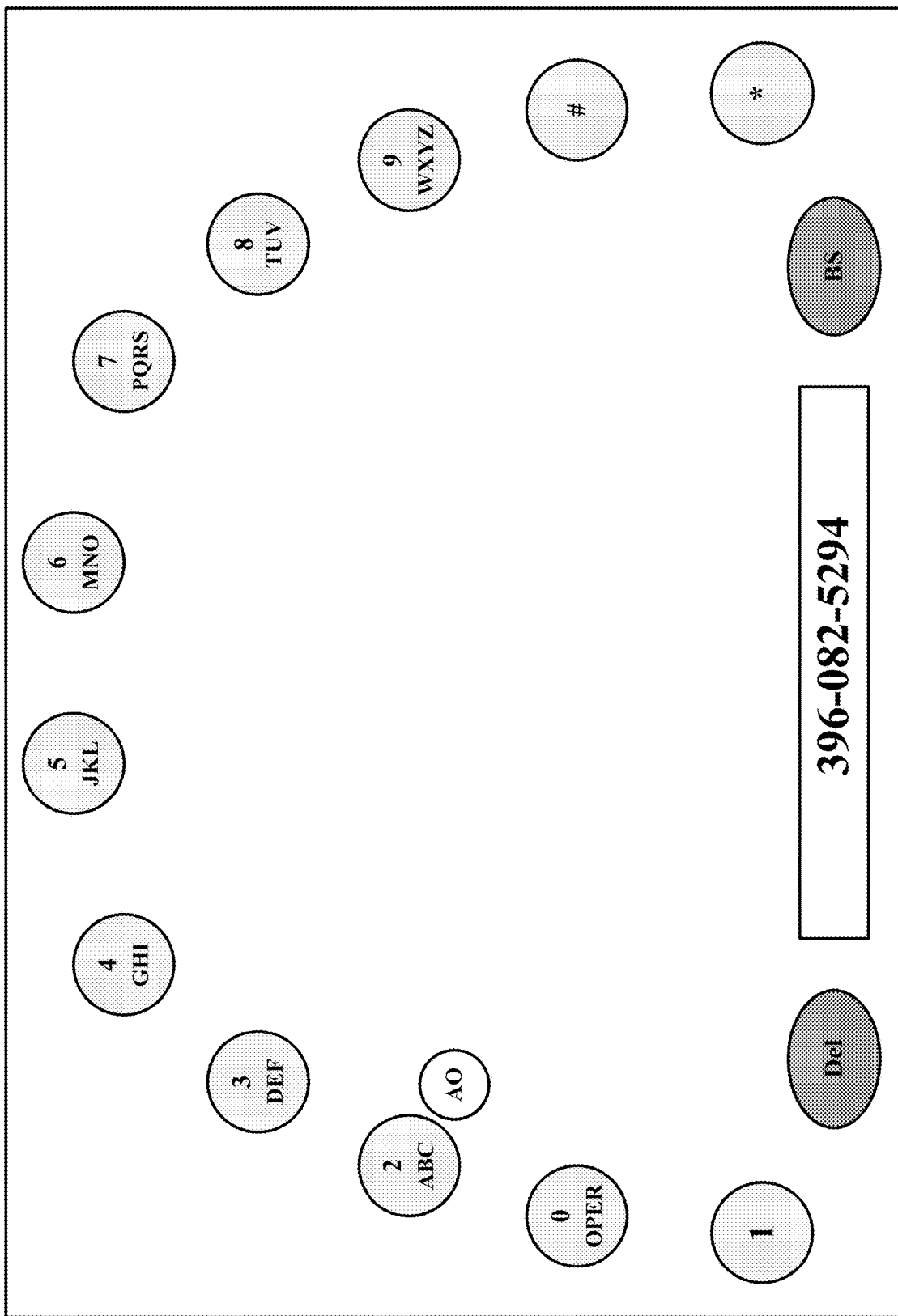

Referring now to FIGS. 6B-K, a series of movement of the active object AO is shown that results in the selection of a specific phone number. In FIGS. 6A-G and FIGS. 6I-K, selection are made by moving the active object AO from one number to another. FIG. 6H, depict a number selection by a time hold in the active area of the phone object 8. It should be recognized, that the selection format could equally well have used attraction of selectable phone objects toward the active object during the selection process. Additionally, the phone objects could be arranged in a different order or configuration. Additionally, for blind uses, the system could say the number as it is selected and if the configuration is fixed, then the user would be able to move the active object around the display with audio messages indicating the selectable object and their relative disposition.

Referring now to FIGS. 6L-R, the system is show for the deletion of selected numbers number. Looking at FIGS. 6L-M, two examples of using the backspace object BS are shown. In the first example, slow movement of the active object AO towards the backspace object BS results in the deletion of one number at a time. Holding the active object AO within the active zone of the backspace object BS, the system will continue to delete number by number until no numbers remain. In the second examples, rapid movement of the active object AO towards the backspace object BS results in the deletion of multiple numbers in the first instance. Holding the active object AO within the active zone of the backspace object BS, the system will continue to delete numbers in blocks until no numbers remain. Alternatively, if the motion is rapid and jerky, the system would delete could delete the entire number. Looking at FIGS. 6N-R, the use of a deletion object is shown. The active object is moved into the number display area to a number to be deleted, motion toward the delete object Del deletes the number. Then movement of the active object toward a new phone number object corrects the number. It should be recognized that this same backspace and deletion procedure can be used for any selection mechanism involving objects to be selected in order and displayed in a display object. If the display object is comprises of text, the motion of towards the backspace object BS will be used to delete works or collections of object one at a time, groups at a time or the entire object list at one time depending totally on the speed, acceleration, smoothness, jerkiness, or other attributes of the motion.

CLOSING PARAGRAPH

All references cited herein are incorporated by reference for all purposes in accord with statues, rules and regulations of the United States Patent Laws, Rules, and Regulations. Although the invention has been disclosed with reference to its preferred embodiments, from reading this description those of skill in the art may appreciate changes and modification that may be made which do not depart from the scope and spirit of the invention as described above and claimed hereafter.

I claim:

1. A apparatus comprising:
an electronic system including at least one input device, at least one motion sensing device, and at least one user feedback device, coupled with at least one processor, the at least one processor configured to:
output, to the at least one user feedback device, a selection object and a large plurality of selectable objects in a 3D environment;
sense a first motion having one or more first motion properties;
move the selection object in accord with the first motion and attract a plurality of aligned selectable objects or a default collection of selection objects towards the selection object, wherein the aligned selectable objects comprise selectable objects aligned with or substantially aligned with the one or more first motion properties and the default collection of selectable objects comprise selectable objects pre-selected based on the one or more first motion properties;
during or after the move and attract, (a) repel all other selectable objects away from the selection object, (b) fade all of the other selectable objects; or (c) any combination thereof;
sense a second motion having one or more second motion properties; and
sequentially or simultaneously, perform an action for each of the aligned selectable objects or the default collection selectable objects based, at least in part, on the second motion, wherein:
when an aligned or default selectable object comprises a list, menu, or group of subobjects, then scroll through the list, the menu, or the group of subobjects,
when an aligned or default selectable object comprises an actionable object, then activate or launch the actionable object,
when an aligned or default selectable object selectable object comprises an adjustable attribute, then adjust a value of an adjustable attribute,
wherein the selectable objects and subobjects comprise a list, a menu, one or more groups, one or more icons, one or more electrical devices, one or more software systems, one or more software products, or any combination thereof,
wherein one or more of the selectable objects and subobjects include one or more adjustable attributes, and
wherein the motion comprises movement of a human, an animal, a human body part, an animal body part, or object under the control of the human or animal sensed by the at least one motion sensing device.

2. The apparatus of claim 1, wherein the at least one processor is further configured to:
confirm each action, via an input from an input device, which may be the same or different from the at least one motion sensing device, comprising a motion of a second body part, a hold, an eye movement, a clap, a snap, a click, an audio noise or sound, a touch or tap, or any combination thereof.

3. The apparatus of claim 1 or 2, wherein the at least one processor is further configured to:
during or after the move and attract, change one or more characteristics of each of the aligned or default selectable objects,
wherein the characteristics include highlighting, size, color, shade, shape, line thickness, blinking, animation, or any combination thereof.

4. The apparatus of claim 1, 2, or 3, wherein the at least one processor is further configured to:
  during or after the move and attract, center the selection object and the aligned or default selectable objects within the 3D environment.

5. The apparatus of claim 1, 2, 3, or 4, wherein the at least one processor is further configured to:
  during or after the move and attract, center the selection object and the aligned or default selectable objects in a well shaped CG construct within the 3D environment, wherein the selection object located at the center of the well and the aligned or default selectable objects are distributed about the selection object in the well.

6. The apparatus of claim 5, the at least one processor is further configured to:
  as the aligned or default selectable objects and the selection object get closer to each other, (a) a rate of attraction of the aligned or default selectable objects towards the selection object increases, (b) a rate of change of characteristics of the aligned or default selectable objects increases, (c) the centering of the aligned or default selectable objects and the selection object continues, or (d) any combination thereof.

7. The apparatus of claim 1, 2, 3, 4, 5, or 6, wherein the at least one processor is further configured to:
  output, to the at least one user feedback device:
    the moving of the selection object,
    the attracting of the aligned or the default selectable objects,
    the sequential or simultaneous performance of the actions,
    the repelling of the other selectable objects,
    the fading of the other selectable objects,
    the centering of the selection objects and the aligned or the default selectable objects, or any combination thereof.

8. The apparatus of claim 1, wherein:
  the first and second motion properties include direction, velocity, acceleration, changes in direction, changes in velocity, changes in acceleration, or any combination thereof,
  the one or more first motion properties and one or more of the second motion properties exceeds at least one motion threshold criteria; and
  each sensed motion comprises movement of a body, a body part, an article under control of a body or a body part sensed by the at least one motion sensing device.

9. The apparatus of claim 1, wherein:
  the at least one motion sensing device comprises digital cameras, optical scanners, optical roller ball devices, joy sticks, touch pads, inductive pads, capacitive pads, holographic devices, laser tracking devices, thermal devices, acoustic devices, devices for tracking body or body part movement, EMF sensors, wave form sensors, arrays any of these motion sensing devices, or combinations thereof;
  the at least one user feedback device comprises a display device, a visual device, an audio device, an audiovisual device, a tactile or touch device, a hot or cold device, a smell or odor device, a taste or flavor device, or any combination thereof; and
  the selectable objects comprise real objects, virtual objects, or combinations thereof.

10. The apparatus of claim 1, wherein:
  the at least one processor, the at least one input device, the at least one motion sensing device, and the at least one user feedback device, or any combination thereof are integrated into a mobile device or a stationary device,
  the mobile device comprises a notebook computer, a tablet, a cell phone, a robot, or a remote control device, and
  the stationary device comprises a computer.

11. A method, implemented on an electronic system including at least one input device, at least one motion sensing device, and at least one user feedback device, coupled with at least one processor, comprising:
  outputting, to the at least one user feedback device, a selection object and a large plurality of selectable objects in a 3D environment;
  sensing a first motion having one or more first motion properties;
  moving the selection object in accord with the first motion and attracting a plurality of aligned selectable objects or a default collection of selection objects towards the selection object, wherein the aligned selectable objects comprise selectable objects aligned with or substantially aligned with the one or more first motion properties and the default collection of selectable objects comprise selectable objects pre-selected based on the one or more first motion properties;
  during or after the move and attract, (a) repelling all other selectable objects away from the selection object, (b) fading all of the other selectable objects; or (c) any combination thereof;
  sensing a second motion having one or more second motion properties; and
  sequentially or simultaneously, performing an action for each of the aligned or default selectable objects based, at least in part, on the second motion, wherein:
    when an aligned or default selectable object comprises a list, menu, or group of subobjects, then scrolling through the list, the menu, or the group of subobjects,
    when an aligned or default selectable object comprises an actionable object, activating or launching the actionable object,
    when an aligned selectable object or a default selectable object comprises an adjustable attribute, adjusting a value of an adjustable attribute,
  wherein the selectable objects and subobjects comprise a list, a menu, one or more groups, one or more icons, one or more electrical devices, one or more software systems, one or more software products, or any combination thereof,
  wherein one or more of the selectable objects and subobjects include one or more adjustable attributes, and
  wherein the motion comprises movement of a human, an animal, a human body part, an animal body part, or object under the control of the human or animal sensed by the at least one motion sensing device.

12. The method of claim 11, further comprising:
  confirming each action, via an input from an input device, which may be the same or different from the at least one motion sensing device, comprising a motion of a second body part, a hold, an eye movement, a clap, a snap, a click, an audio noise or sound, a touch or tap, or any combination thereof.

13. The method of claim 11 or 12, further comprising:
  during or after the move and attract, changing one or more characteristics of each of the aligned or default selectable objects,
  wherein the characteristics include highlighting, size, color, shade, shape, line thickness, blinking, animation, or any combination thereof.

14. The method of claim 11, 12, or 13, further comprising:
    during or after the move and attract, centering the selection object and the aligned or default selectable objects within the 3D environment.

15. The method of claim 11, 12, 13, or 14, further comprising:
    during or after the move and attract, centering the selection object and the aligned or default selectable objects in a well shaped CG construct within the 3D environment,
    wherein the selection object located at the center of the well and the aligned or default selectable objects are distributed about the selection object in the well.

16. The method of claim 11, 12, 13, 14, or 15, further comprising:
    as the aligned or default selectable objects and the selection object get closer to each other, (a) a rate of the attracting of the aligned or default selectable objects towards the selection object increases, (b) a rate of the changing of characteristics of the aligned or default selectable objects increases, (c) the centering of the aligned or default selectable objects and the selection object continues, or (d) any combination thereof.

17. The method of claim 11, 12, 13, 14, 15, or 16, further comprising:
    outputting, to the at least one user feedback device:
        the moving of the selection object,
        the attracting of the aligned or the default selectable objects,
        the sequential or simultaneous performance of the actions,
        the repelling of the other selectable objects,
        the fading of the other selectable objects,
        the centering of the selection objects and the aligned or the default selectable objects, or any combination thereof.

18. The method of claim 11, wherein:
    the first and second motion properties include direction, velocity, acceleration, changes in direction, changes in velocity, changes in acceleration, or any combination thereof,
    the one or more first motion properties and one or more of the second motion properties exceeds at least one motion threshold criteria, and
    each sensed motion comprises movement of a body, a body part, an article under control of a body or a body part sensed by the at least one motion sensing device.

19. The method of claim 11, wherein:
    the at least one motion sensing device comprises digital cameras, optical scanners, optical roller ball devices, joy sticks, touch pads, inductive pads, capacitive pads, holographic devices, laser tracking devices, thermal devices, acoustic devices, devices for tracking body or body part movement, EMF sensors, wave form sensors, arrays any of these motion sensing devices, or combinations thereof;
    the at least one user feedback device comprises a display device, a visual device, an audio device, an audiovisual device, a tactile or touch device, a hot or cold device, a smell or odor device, a taste or flavor device, or any combination thereof; and
    the selectable objects comprise real objects, virtual objects, or combinations thereof.

20. The method of claim 11, wherein:
    the at least one processor, the at least one input device, the at least one motion sensing device, and the at least one user feedback device, or any combination thereof are integrated into a mobile device or a stationary device,
    the mobile device comprises a notebook computer, a tablet, a cell phone, a robot, or a remote control device, and
    the stationary device comprises a computer.

* * * * *